US010175665B2

(12) United States Patent
Mandle et al.

(10) Patent No.: US 10,175,665 B2
(45) Date of Patent: Jan. 8, 2019

(54) MANAGEMENT OF AN ELECTRONIC SYSTEM FOR FAULT DETECTION

(71) Applicant: SONY CORPORATION, Tokyo (JP)

(72) Inventors: Gary Mandle, Los Altos, CA (US); Ali Etezadi-Amoli, San Jose, CA (US); John Geiger, Parkridge, NJ (US)

(73) Assignee: SONY CORPORATION, Tokyo (JP)

( * ) Notice: Subject to any disclaimer, the term of this patent is extended or adjusted under 35 U.S.C. 154(b) by 520 days.

(21) Appl. No.: 14/600,378

(22) Filed: Jan. 20, 2015

(65) Prior Publication Data

US 2016/0209818 A1    Jul. 21, 2016

(51) Int. Cl.
*G05B 15/02* (2006.01)
*G05B 19/04* (2006.01)
*G05B 19/048* (2006.01)
*G05B 19/406* (2006.01)
*G05B 19/408* (2006.01)

(52) U.S. Cl.
CPC ............. *G05B 15/02* (2013.01); *G05B 19/04* (2013.01); *G05B 19/048* (2013.01); *G05B 19/406* (2013.01); *G05B 19/408* (2013.01)

(58) Field of Classification Search
CPC ...... G05B 15/02; G05B 19/04; G05B 19/048; G05B 19/406; G05B 19/408; G05B 23/0205; G05B 23/0216; G05B 23/0221; G05B 23/0229; G05B 23/0235; G05B 23/0272; G05B 23/0283
See application file for complete search history.

(56) References Cited

U.S. PATENT DOCUMENTS

| | | | |
|---|---|---|---|
| 8,294,568 B2 | 10/2012 | Barrett | |
| 8,665,784 B2 | 3/2014 | Kang et al. | |
| 2011/0125419 A1* | 5/2011 | Bechhoefer | F03D 7/047 702/34 |
| 2011/0178977 A1* | 7/2011 | Drees | G05B 15/02 706/52 |
| 2012/0316913 A1 | 12/2012 | Reyes | |
| 2014/0142727 A1* | 5/2014 | Giering | G05B 15/02 700/79 |
| 2014/0195844 A1* | 7/2014 | Laval | G06F 11/3062 713/340 |
| 2015/0185713 A1* | 7/2015 | Glickfield | H04W 4/005 700/44 |

FOREIGN PATENT DOCUMENTS

CN    1417961 A    5/2003

OTHER PUBLICATIONS

Kuang-Yow Lian, et al., "Mobile Monitoring and Embedded Control System for Factory Environment", Sensors vol. 13, Published Dec. 17, 2013, pp. 17379-17413.

* cited by examiner

*Primary Examiner* — Ronald D Hartman, Jr.
(74) *Attorney, Agent, or Firm* — Chip Law Group

(57) ABSTRACT

Various aspects of a method and system for management of an electronic system are disclosed herein. The method includes detection of a plurality of electronic modules configured in a discoverable mode. The plurality of electronic modules is associated with one or more electronic sub-systems of the electronic system. The method further includes reception of a first set of data from the plurality of electronic modules. The method further includes dynamic prediction of a set of actions based on the received first set of data and second set of data. The second set of data corresponds to a previously executed set of actions.

25 Claims, 31 Drawing Sheets

MANAGEMENT OF AN ELECTRONIC SYSTEM FOR FAULT DETECTION

FIELD

Various embodiments of the disclosure relate to management of an electronic system. More specifically, various embodiments of the disclosure relate to management of an electronic system based on data received from electronic modules installed within various electronic sub-systems.

BACKGROUND

Advancements in the fields of video systems, audio systems, control systems, and/or network system management, based on different protocols, have introduced various methods to manage a complex electronic system. Such management may include analysis of data associated with various sub-systems of the complex electronic system to detect a fault or a failure. The management of the complex electronic system may further include diagnosis of the sub-systems (when a fault or a failure is detected), and/or corrective actions for the diagnosed fault or failure. The complex electronic system may be managed by various electronic units, such as a monitoring device, dedicated to the sub-systems of the complex electronic system.

In certain scenarios, such electronic units are non-portable units that may be operable to measure and analyze the data from a centralized location. However, it may not be possible to move such electronic units to the physical location of the sub-system where a technical fault occurs. Further, in such scenarios, multiple decentralized non-portable electronic units with overlapping functionalities may be installed in the complex electronic system that may increase the cost due to such multiple installations. Furthermore, it may be possible that due to fixed locations of the decentralized non-portable electronic units installed in the complex electronic system, the monitoring system may be less flexible.

In other scenarios, the electronic units are portable units that may be moved to the physical location of the sub-system to measure and analyze the data. However, in such scenarios, the portable electronic units may offer limited capabilities in terms of the measurement and analytics of the data associated with the sub-systems of the complex electronic system. Also, one or more connections in the sub-systems may be required to be disconnected in order to insert the portable electronic unit that may not be practical. Further, in such scenarios, the portable electronic units may comprise different interfaces for different connections.

In yet other scenarios, such electronic units are operable to monitor information technology (IT) software and hardware. However, in such scenarios, the electronic units are restricted to simple network management protocol (SNMP)-compliant equipment with custom interfaces. Further, in such scenarios, there may be limited signal visibility, signal quality, and other environmental conditions.

Thus, it may be desirable by a user that the cost of management, monitoring, and troubleshooting of the faulty sub-systems of the complex electronic system is less expensive. It may be further desirable by the user to measure and analyze the data associated with the various sub-systems of the complex electronic system when operational. It may be further desirable by the user that the measured data is processed and analyzed at a centralized, and/or a localized location to enhance the performance of the complex electronic system by providing appropriate troubleshooting solutions and extensive analysis reports. It may be further desirable to allow multiple remote locations to process and analyze the same fault by usage of simple and low cost diagnostic tool(s).

Further limitations and disadvantages of conventional and traditional approaches will become apparent to one of skill in the art, through comparison of described systems with some aspects of the present disclosure, as set forth in the remainder of the present application and with reference to the drawings.

SUMMARY

A method and a system for management of an electronic system are provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
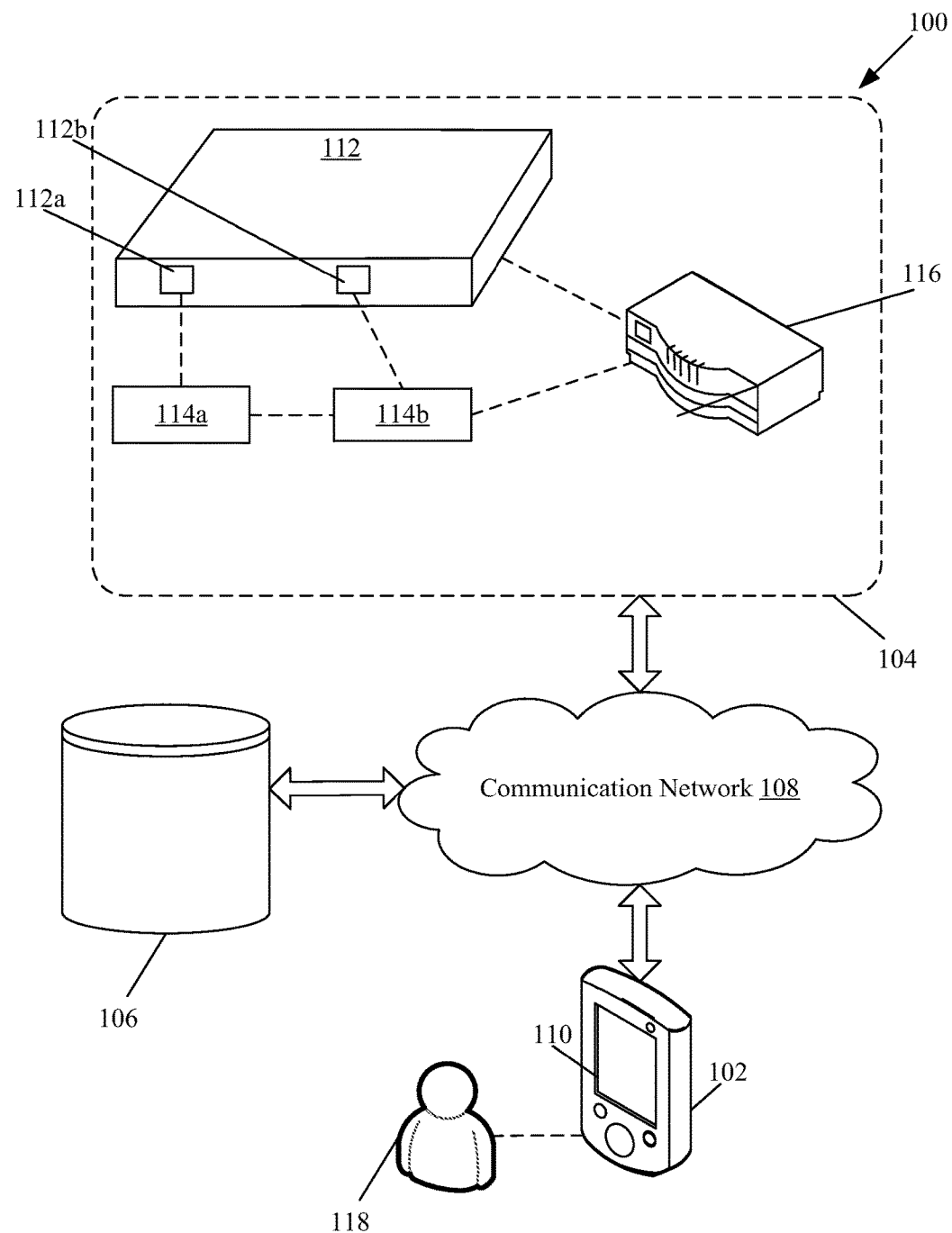
FIG. 1 is a block diagram that illustrates a network environment to implement the disclosed method and system for management of an electronic system, in accordance with an embodiment of the disclosure.

Various implementations may be found in a method and/or system for management of an electronic system. Exemplary aspects of the disclosure may comprise a method for management of the electronic system. The method may comprise detection of a plurality of electronic modules configured in a discoverable mode. The plurality of electronic modules may be associated with one or more electronic sub-systems of the electronic system. A first set of data from the plurality of electronic modules may be received. Based on the received first set of data and a second set of data, a set of actions may be dynamically predicted. The second set of data may correspond to a previously executed set of actions.

The electronic device may be one of a laptop, a desktop computer, a server, a tablet computer, a smartphone, and/or a personal digital assistant (PDA) device. The plurality of electronic modules may comprise one or more of a signal measurement module, a signal detection module, and/or a control module.

In accordance with an embodiment, key information that corresponds to each of the electronic modules in the discoverable mode may be periodically broadcasted. The key information may comprise one or more of a bar code, a quick response (QR) code, an optical character recognition (OCR) tag, an internet protocol (IP) address, electronic module type information, hardware version information, and/or firmware version information, associated with each of the plurality of electronic modules.

In accordance with an embodiment, the first set of data and the second set of data may correspond to one or more service parameters. The one or more service parameters may further correspond to the one or more electronic sub-systems. The one or more service parameters may comprise, but are not limited to, an eye pattern display, a serial data interface (SDI), payload data, a sample frequency, user data, a cyclic redundancy code (CRC) flag, a camera head main voltage, a camera head main current, a fiber optic power, a temperature value, a simple network management protocol (SNMP) data, one or more network packets, and/or environmental measurement data. The one or more service parameters may be selected to retrieve a set of attributes from the one or more electronic modules. The set of attributes may comprise a data value, a frequency, an amplitude, and/or a phase associated with the one or more service parameters. The first set of data and second set of data may further correspond to one or more comments, one or more labels, diagnostic information, and/or configuration setting associated with one or more electronic sub-systems that may be retrieved from one or more pre-stored and/or online user manuals.

In accordance with an embodiment, one or more of a list of the detected plurality of electronic modules, payload data related to the one or more service parameters, a display associated with the one or more electronic sub-systems, a universal resource locator (URL) of the one or more pre-stored and/or online user manuals, a set of diagrams associated with the one or more electronic sub-systems, and/or an option to measure the first set of data associated with the one or more electronic sub-systems may be displayed on a pre-defined region of a user interface (UI).

In accordance with an embodiment, a threshold value that may correspond to the one or more service parameters may be defined. The defined threshold value may be based on operational information associated with the one or more electronic sub-systems. The operational information may be retrieved from the one or more pre-stored and/or online user manuals. In accordance with an embodiment, one or more recommendations may be provided to a user based on the dynamically predicted set of actions. The one or more recommendations may comprise a sequence of one or more steps to implement an optimized configuration setting and/or a test pattern that may be implemented at the one or more electronic sub-systems.

In accordance with an embodiment, the plurality of electronic modules may be configured to measure the first set of data associated with each of the one or more electronic sub-systems. An option to purchase one or more new electronic modules, and/or one or more new software modules associated with the plurality of electronic modules may be provided. In accordance with an embodiment, the first set of data associated with each of the plurality of electronic modules may be analyzed. The analyzed first set of data may be presented on a UI, based on a user selection of one or more service parameters associated with the first set of data.

In accordance with an embodiment, one or more of a label, a comment, and/or data, may be uploaded to the detected plurality of electronic modules. The uploaded comment may comprise a set of details that may correspond to a fault occurred in the one or more electronic sub-systems. The uploaded comment may further comprise another set of actions performed to resolve the occurred fault.

In accordance with an embodiment, the prediction of the set of actions may be based on a flowchart provided by a user. The flowchart may comprise a set of alarms and/or control actions. The physical location of one or more electronic sub-systems may be tracked based on one or more of a unique value associated with the one or more electronic sub-systems, a strength of a signal transmitted by the one or more electronic sub-systems, and/or a delay in reception of the signal transmitted by the one or more electronic sub-systems. In accordance with an embodiment, each of the plurality of electronic modules may be synchronized with respect to each other.

FIG. 1 is a block diagram that illustrates an electronic system, in accordance with an embodiment of the disclosure. With reference to FIG. 1, there is shown an electronic system 100. The electronic system 100 may include an electronic device 102, an electronic sub-system 104, an electronic module rack 112, a data warehouse 106, and a communication network 108. The electronic device 102 may include a display screen 110. The electronic sub-system 104 may include an electronic module rack 112, plurality of electronic modules 114, such as a first electronic module 114a and a second electronic module 114b, and a networking device 116. The electronic module rack 112 may further comprise a plurality of slots, such as a first slot 112a and a second slot 112b. The electronic device 102 may be associated with one or more users, such as a user 118. The electronic device 102 may be communicatively coupled with the electronic sub-system 104 and data warehouse 106, via the communication network 108. The electronic system 100 may be implemented as a cloud and/or a mesh network.

The electronic device 102 may comprise suitable logic, circuitry, interfaces, and/or code that may be operable to receive user input from the user 118, via the display screen 110. In accordance with an embodiment, the electronic device 102 may be operable to detect the plurality of electronic modules 114, when within a pre-determined proximity area. In accordance with an embodiment, the electronic device 102 may be operable to detect the plurality of electronic modules 114 from a remote location. The electronic device 102 may be operable to display the detected plurality of electronic modules 114, via the display screen 110. The electronic device 102 may be further operable to display data measured by the plurality of electronic modules 114. The electronic device 102 may be further operable to receive data from information technology (IT) systems (not shown) via simple network management protocol (SNMP). The electronic device 102 may be further operable to combine the data measured by the plurality of electronic modules 114, the data received via SNMP protocol, and other such data. Examples of the electronic device 102 may include, but are not limited to, a television, a tablet computer, a smartphone, and/or a personal digital assistant (PDA) device.

The electronic sub-system 104 may comprise suitable components, hardware, logic, circuitry, interfaces, and/or code that may be a portion of the electronic system 100. The electronic sub-system 104 may include various electronic components, such as the electronic module rack 112, the plurality of electronic modules 114, and the networking device 116, communicatively coupled with each other. The electronic sub-system 104 may further comprise other electronic components, such as a video broadcast server, a recording unit, and/or the like. The various electronic components in the electronic sub-system 104 may be communicatively coupled with each other, via another communication network, similar to the communication network 108.

The data warehouse 106 may comprise suitable storage space, logic, circuitry, interfaces, and/or code that may be operable to store the measured data received from the plurality of electronic modules 114. The data warehouse 106 may be further operable to store other data, such as comments, labels, diagnostic information, and/or configuration settings, associated with the plurality of electronic modules 114. The data warehouse 106 may be implemented by use of several technologies that are well known to those skilled in the art.

The communication network 108 may include a medium through which the electronic device 102 may communicate with the plurality of electronic modules 114. The plurality of electronic modules 114 may be hosted by the electronic module rack 112 and/or one or more servers, such a server associated with the data warehouse 106. Examples of the communication network 108 may include, but are not limited to, the Internet, a Near Field Communication (NFC) network, a cloud network, a Wireless Fidelity (Wi-Fi) network, a Wireless Local Area Network (WLAN), a Local Area Network (LAN), a telephone line (POTS), and/or a Metropolitan Area Network (MAN). Various devices in the electronic system 100 may be operable to connect to the communication network 108, in accordance with various wired and wireless communication protocols. Examples of such wired and wireless communication protocols may include, but are not limited to, Transmission Control Protocol and Internet Protocol (TCP/IP), User Datagram Protocol (UDP), Hypertext Transfer Protocol (HTTP), File Transfer Protocol (FTP), Zigbee, EDGE, infrared (IR), IEEE 802.11, 802.16, cellular communication protocols, and/or Bluetooth (BT) communication protocols.

The display screen 110 may comprise suitable logic, circuitry, interfaces, and/or code that may be operable to render a user interface (UI). The display screen 110 may be further operable to render one or more features and/or applications of the electronic device 102. The display screen 110 may be realized through several known technologies such as but not limited to, Liquid Crystal Display (LCD) display, Light Emitting Diode (LED) display, and/or Organic LED (OLED) display technology.

The electronic module rack 112 may comprise suitable logic, circuitry, interfaces, and/or code operable to provide a central consolidation of hot-swappable plurality of electronic modules 114. The electronic module rack 112 may be operable to provide the plurality of electronic modules 114 with a shared network connection and/or power connection. The electronic module rack 112 may be mounted on a metal or plastic enclosure. The electronic module rack 112 may be fastened to the enclosure with screws. The electronic module rack 112 may further comprise a plurality of slots, such as the first slot 112a and the second slot 112b. Each of the plurality of slots, such as the first slot 112a and the second slot 112b, may be operable to host one of the plurality of electronic modules 114, such as the first electronic module 114a and the second electronic module 114b, respectively. The electronic module rack 112 may comprise one or more options to switch on and/or off one or more of the plurality of electronic modules 114. The electronic module rack 112 may be powered by an external power source (not shown). The electronic module rack 112 may be implemented by use of several technologies that are well known to those skilled in the art.

The plurality of electronic modules 114 may comprise suitable logic, circuitry, interfaces, and/or code may be operable to detect an event or a change in one or more characteristics related to the one or more electronic components of the one or more electronic sub-systems, such as the electronic sub-system 104. The plurality of electronic modules may comprise one or more of a signal measurement module, a signal detection module, and/or a control module. The plurality of electronic modules 114 may be installed in a distributed manner in one or more areas in each of the one or more electronic sub-systems. Such a distributed placement may allow a user and/or an administrator to troubleshoot technical faults and/or failures that may interrupt the operation of the one or more electronic sub-systems within the electronic system 100. Examples of the signal measurement module and the signal detection module may include, but are not limited to, a digital video sensor module, a digital audio sensor module, an optical fiber module, an Ethernet module, an environment sensor module, a power detection module, a proximity sensor module, a high-definition multimedia interface (HDMI) module, a display module, and/or an accessory power module.

The networking device 116 may comprise suitable logic, circuitry, interfaces, and/or code that may be operable to exchange data packets between the electronic sub-system 104 and the electronic device 102, via the communication network 108. The networking device 116 of the electronic sub-system 104 may be connected to two or more data lines from other electronic sub-systems and/or the electronic device 102. The networking device 116 may be operable to store a routing table and/or a routing policy in a local buffer (not shown). The routing table and/or a routing policy may be retrieved from the local buffer when a data packet is transmitted and/or received to/from the communication network 108. Examples of the networking device 116 may include a router switch, a wireless router, and/or the like.

In operation, an application may be executed at the electronic device 102 that may provide a UI, which may be rendered at the display screen 110 of the electronic device 102. The application may be executed via one or more operating systems, such as Windows®, Android™, iOS™, and/or the like.

In accordance with an embodiment, the electronic device 102 may be connected to one or more electronic sub-systems, such as the electronic sub-system 104, via the communication network 108. Such a connection may be established when the one or more electronic sub-systems are detected within a pre-determined proximity range with respect to the electronic device 102. In accordance with an embodiment, the electronic device 102 may be connected to the electronic sub-system 104, via a wide area network (WAN) or a cloud based network. The plurality of electronic modules 114, associated with the electronic sub-system 104, may be displayed on the UI, rendered at the display screen 110. The plurality of electronic modules 114, associated with one or more electronic components of each of one or more electronic sub-systems, may also be displayed on the UI. In accordance with an embodiment, the user 118 may select one or more electronic modules from the plurality of electronic modules, via the UI.

In accordance with an embodiment, similar electronic modules from the one or more electronic sub-systems may be displayed on the UI. Thus, the user 118 may not be able to identify which desired electronic module is associated with which electronic sub-system. In such a case, a connection may be established between the electronic device 102 and the electronic sub-system that includes the desired electronic module, via an NFC protocol. In accordance with an embodiment, the connection between the electronic device 102 and the desired electronic module based on an electronic identification associated with the desired electronic module. In such a case, the electronic identification may be performed based on a Quick Response (QR) code, a barcode, and/or the other such electronic identification mark, known in the art.

In accordance with an embodiment, a desired electronic module may be out of coverage area of the electronic device 102, and thus, may not be displayed at the UI. In such a case, a request may be generated at the electronic device 102 to identify a set of electronic modules that may be within the coverage area (or range) of the electronic device 102. Based on the request, the identified set of electronic modules may communicate with each other, via the communication network 108, such as a Wi-Fi network. Such a communication may make use of a mesh network to locate the desired electronic module.

In accordance with an embodiment, the plurality of electronic modules 114, from the electronic sub-system 104 may be configured to operate in a discoverable mode. Each of the plurality of electronic modules 114 may be operable to periodically broadcast key information when in the discoverable mode. The key information may include a unique module ID, an internet protocol (IP) address, a type of module, a hardware version, a firmware version, and/or the like. The detection of the plurality of electronic modules 114 may be based on the broadcasted key information. The detection of the plurality of electronic modules 114 may be further derived from parameters that may be based on a service description language (SDL). The SDL may comprise information that may correspond to one or more functions performed by the plurality of electronic modules 114, the type of input parameters for the plurality of electronic modules 114, the type of output parameters of the plurality of electronic modules 114, and/or text description of the functionalities of the plurality of electronic modules 114. In accordance with an embodiment, the connection may be based on manual selection of the plurality of electronic modules 114 displayed at the UI. Once the connection is established, the UI may be rendered on the display screen 110 in a user-defined format.

In accordance with an embodiment, the plurality of electronic modules 114 may be configured to operate in synchronization with each other. The synchronization of the plurality of electronic modules 114 may be based on an internal clock associated with the electronic module rack 112, in the electronic sub-system 104. The synchronization of the plurality of electronic modules 114 may be based on timing information received from an external resource. In an exemplary scenario, the plurality of electronic modules 114 may be arranged in the electronic sub-system 104. The electronic sub-system 104 may operate in accordance with one of a mesh network pattern, a bus network pattern, and/or a star network pattern. In another exemplary scenario, the plurality of electronic modules 114 may be mounted in the electronic module rack 112.

In accordance with an embodiment, each of the plurality of electronic modules 114 may be included in different electronic sub-systems of the electronic system 100. In accordance with another embodiment, each of the plurality of electronic modules 114 may be included in the same electronic sub-system 104 of the electronic system 100.

In accordance with an embodiment, the plurality of electronic modules 114 may be operable to detect a first set of data from the one or more electronic components installed in the electronic sub-system 104. The first set of data may correspond to one or more service parameters of one or more electronic components of the electronic sub-system 104. The one or more service parameters may include an eye pattern display, a Serial Data Interface (SDI) payload data, a sample frequency, a user data, a Cyclic Redundancy Code (CRC) flag, a camera head main voltage, a camera head main current, a fiber optic power, a temperature value, a Simple Network Management Protocol (SNMP) data, one or more network packets, a humidity value, and/or environmental measurement data related to one or more electronic components of the electronic sub-system 104. The environmental data may include humidity value, temperature value, number and direction of vibrations, and/or the like. The first set of data may include one or more comments, one or more labels, diagnostic information, and/or configuration settings associated with one or more electronic components of the electronic sub-system 104. The plurality of electronic modules 114 may be operable to transmit the detected first set of data to the electronic device 102, via the networking device 116 and the communication network 108. The plurality of electronic modules 114 may be further operable to store the detected first set of data in the data warehouse 106, and/or a local memory. The plurality of electronic modules 114 may be operable to transmit the detected first set of data to the electronic device 102. In accordance with an embodiment, the first set of data may deviate from desired threshold values that may correspond to respective one or more electronic components of the electronic sub-system 104.

The electronic device 102 may be operable to receive the first set of data from the plurality of electronic modules 114 of the electronic sub-system 104. The electronic device 102 may be further operable to receive a second set of data from the data warehouse 106, via the communication network 108. The second set of data may correspond to a previously executed set of actions performed when a similar fault occurred in the past. Based on the first set of data and the second set of data, the electronic device 102 may be operable to predict a set of actions when the first set of data deviates from the desired threshold values. Based on the predicted set of actions, one or more recommendations may be transmitted to the plurality of electronic modules 114.

In accordance with an embodiment, the plurality of electronic modules 114 may be operable to perform a set of actions based on the received one or more recommendations. The plurality of electronic modules 114 may be further operable to store the performed set of actions in local memories associated with each of the plurality of electronic modules 114, and/or in the data warehouse 106. The plurality of electronic modules 114 may be operable to define the threshold values that correspond to the received first set of data. The threshold values may be defined based on operational information associated with one or more electronic components of the electronic sub-system 104. The plurality of electronic modules 114 may be operable to retrieve the operational information from one or more pre-stored and/or online manuals that may correspond to the one or more electronic components of the electronic sub-system 104. In accordance with an embodiment, the plurality of electronic modules 114 may be operable to perform the set of actions based on the defined threshold values associated with the received first set of data. In accordance with an embodiment, the plurality of electronic modules 114 may be operable to perform the set of actions based on a flowchart, and/or a workflow provided by the user 118. In accordance with an embodiment, the user 118 may be a service engineer. In accordance with an embodiment, the user 118 may be a system administrator. In accordance with an embodiment, the user 118 may create one or more flowcharts and offer the one or more flowcharts as part of maintenance service subscription of the one or more electronic components of the electronic sub-system 104. In accordance with an embodiment, the flowchart and/or the workflow may comprise a set of alarms, and/or control actions.

In accordance with an embodiment, the plurality of electronic modules 114 may comprise a global positioning system (GPS) sensor that may be operable to track the physical location of one or more electronic components of the electronic sub-system 104. In such a case, the GPS sensor may be operable to periodically transmit the location of one or more electronic components of the electronic sub-system 104 to the electronic device 102. In accordance with an embodiment, the plurality of electronic modules 114 may be operable to transmit the location to the electronic device 102, when a change is detected in the location of the one or more electronic components of the electronic sub-system 104. In accordance with an embodiment, the plurality of electronic modules 114 may be operable to transmit an associated location information to the electronic device 102 based on a radio frequency (RF) based technology. Various examples of the RF based technology may include, but are not limited to, iBeacon™, cellular triangulation, and/or a Wi-Fi network. In accordance with an embodiment, the electronic module 102 may be operable to triangulate the location(s) of the plurality of electronic modules 114 based on one or more of a strength of the received RF signal, a delay in receiving the RF signal, and/or other information included in the received RF signal. Based on the triangulated location(s), relative position and/or movement of the plurality of electronic modules 114 may be tracked.

Figure 2:
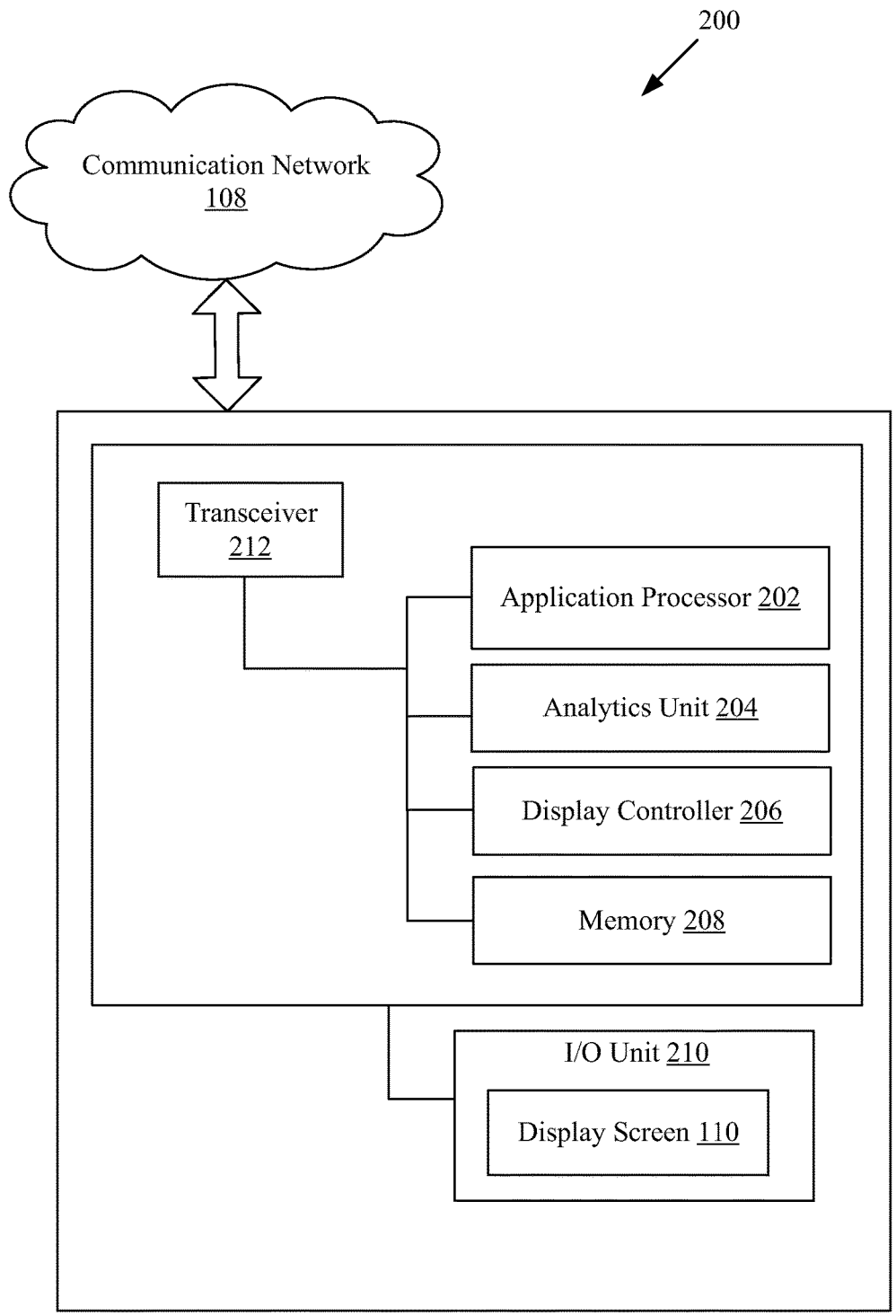
FIG. 2 is a block diagram that illustrates an exemplary electronic device, in accordance with an embodiment of the disclosure.

FIG. 2 is a block diagram 200 that illustrates an exemplary electronic device, in accordance with an embodiment of the disclosure. FIG. 2 is explained in conjunction with elements from FIG. 1. With reference to FIG. 2, there is shown the electronic device 102. The electronic device 102 may comprise one or more circuits or processors, such as an application processor 202, an analytics unit 204, and/or a display controller 206. The electronic device 102 may further comprise a memory 208 and one or more input/output (I/O) devices, such as an I/O unit 210. The I/O unit 210 may comprise the display screen 110. The application processor 202 may be communicatively coupled to the analytics unit 204, the display controller 206, the memory 208, and the I/O unit 210. In accordance with an embodiment, the electronic device 102 may further include a transceiver 212. The transceiver 212 may be operable to communicate with one or more servers, and/or electronic modules, such as the plurality of electronic modules 114, via the communication network 108 (as shown in FIG. 1). In such an embodiment, the transceiver may be communicatively connected to the application processor 202, the analytics unit 204, the display controller 206, the memory 208, and the I/O unit 210.

The application processor 202 may comprise suitable logic, circuitry, interfaces, and/or code that may be operable to execute a set of instructions stored in the memory 208. The application processor 202 may be operable to receive a first set of data from the plurality of electronic modules 114, such as plurality of electronic modules 114. The application processor 202 may be further operable to transmit the determined one or more recommendations to the plurality of electronic modules 114, based on the dynamically predicted set of actions. The application processor 202 may be implemented based on a number of processor technologies known in the art. Examples of the application processor 202 may be an X86-based processor, a Reduced Instruction Set Computing (RISC) processor, an Application-Specific Integrated Circuit (ASIC) processor, a Complex Instruction Set Computing (CISC) processor, and/or other processors.

The analytics unit 204 may comprise suitable logic, circuitry, interfaces, and/or code that may be operable to analyze the first set of data received from the application processor 202. The analytics unit 204 may be operable to analyze the data based on various predictive analysis algorithms, such as a regression algorithm, a machine learningbased algorithm, a neural network-based algorithm, and/or the like. The predictive analysis algorithms may be retrieved from the memory 208. The analytics unit 204 may be further operable to dynamically predict a set of actions based on the first set of data and a second set of data. The analytics unit 204 may be further operable to determine one or more recommendations for the plurality of electronic modules 114 based on the dynamically predicted set of actions.

The display controller 206 may comprise suitable logic, circuitry, interfaces, and/or code that may be operable to control the presentation of the data on the display screen 110, associated with the electronic device 102. The display controller 206 may be operable to format the data before the data is presented on the display screen 110. The display controller 206 may be further operable to designate different regions of the display screen 110 to present the data that correspond to different service parameters. The display controller 206 may be implemented based on various display technologies known in the art.

The memory 208 may comprise suitable logic, circuitry, and/or interfaces that may be operable to store a machine code and/or a computer program with at least one code section executable by the application processor 202. The memory 208 may be further operable to store the first set of data received from the plurality of electronic modules 114. The memory 208 may be further operable to store one or more recommendations, and/or dynamically predicted set of actions, determined by the analytics unit 204. The memory 208 may be further operable to store one or more algorithms, such as a backpropagation technique, and/or the like. Examples of implementation of the memory 208 may include, but are not limited to, Random Access Memory (RAM), Read Only Memory (ROM), Hard Disk Drive (HDD), and/or a Secure Digital (SD) card.

The I/O unit 210 may comprise suitable logic, circuitry, interfaces, and/or code that may be operable to receive an input from the user, or provide an output to the user. The I/O unit 210 may comprise various input and output devices that may be operable to communicate with the application processor 202. The I/O unit may comprise a display screen 110. Examples of the I/O unit 210 may include, but are not limited to, a keyboard, a mouse, a touch screen, a touch pad, a microphone, a camera, a motion sensor, a light sensor, and/or a docking station. Examples of the display screen 110 may include, but are not limited to, Liquid Crystal Display (LCD) display, Light Emitting Diode (LED) display, and/or an Organic LED (OLED) display technology.

The transceiver 212 may comprise suitable logic, circuitry, interfaces, and/or code that may be operable to communicate with the plurality of electronic modules 114, via the communication network 108. The transceiver 212 may implement known technologies to support wired or wireless communication of the electronic device 102 with the communication network 108. The transceiver 212 may include, but is not limited to, an antenna, a frequency modulation (FM) transceiver, a radio frequency (RF) transceiver, one or more amplifiers, a tuner, one or more oscillators, a digital signal processor, a coder-decoder (CODEC) chipset, a subscriber identity module (SIM) card, and/or a local buffer. The transceiver 212 may communicate via wireless communication with networks, such as the Internet, an Intranet and/or a wireless network, such as a cellular telephone network, a wireless local area network (LAN) and/or a metropolitan area network (MAN). The wireless communication may use any of a plurality of communication standards, protocols and technologies, such as Global System for Mobile Communications (GSM), Enhanced Data GSM Environment (EDGE), wideband code division multiple access (W-CDMA), code division multiple access (CDMA), time division multiple access (TDMA), Long Term Evolution (LTE), Bluetooth, Wireless Fidelity (Wi-Fi) (e.120g., IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS).

In operation, the application processor 202 may be operable to monitor one or more electronic components of one or more electronic sub-systems, such as the electronic sub-system 104. In accordance with an embodiment, the application processor 202 may be operable to detect the plurality of electronic modules 114, associated with the electronic sub-system 104. In accordance with an embodiment, the plurality of electronic modules 114 may be configured in a discoverable mode. The application processor 202 may be operable to create a connection with plurality of electronic modules 114, based on a user input received by the I/O unit 210. In accordance with an embodiment, the application processor 202 may be operable to establish such a connection when the one or more electronic sub-systems are within a pre-determined proximity range with respect to the electronic device 102. The I/O unit 210 may be operable to receive the user input via the display screen 110. In accordance with an embodiment, the user input may include, but is not limited to, a single touch input, a multi-touch input, a gesture, and/or a voice-based input.

In accordance with an embodiment, the application processor 202 may be operable to establish a connection with the plurality of electronic modules 114, based on periodically broadcasted key information that corresponds to an electronic module. In accordance with an embodiment, the periodically broadcasted key information may comprise a bar code, a QR code, an optical character recognition (OCR) tag, an internet protocol (IP) address, electronic module type information, hardware version information, and/or firmware version information, associated with the plurality of electronic modules 114. In accordance with an embodiment, the connection may be further established based on a short-range network, such as NFC. Notwithstanding, the disclosure may not be so limited, the connection to the plurality of electronic modules 114 may be based on other wired, and/or wireless technologies known in the art, without limiting the scope of the disclosure.

In accordance with an embodiment, the application processor 202 may be operable to receive the first set of data from the plurality of electronic modules 114, via the communication network 108. The first data may be received periodically or automatically, at an instance when a technical fault occurs in the electronic sub-system 104. The application processor 202 may be operable to store the received first set of data that may correspond to the plurality of electronic modules 114, in the memory 208. The application processor 202 may be further operable to retrieve the second set of data from the data warehouse 106. The second set of data may correspond to a previously executed set of actions performed when similar technical fault occurred in one or more electronic components of the electronic sub-system 104. The application processor 202 may be operable to transmit both the first set of data and the second set of data to the analytics unit 204.

The analytics unit 204 may be operable to receive the first set of data and the second set of data that corresponds to the plurality of electronic modules 114, from the application processor 202. The analytics unit 204 may be further operable to retrieve one or more algorithms stored in the memory 208, to analyze the received first set of data. Based on the analysis of the first set of data and the second set of data, the analytics unit 204 may be operable to predict a set of actions. The predicted set of actions may be communicated to the application processor 202. The application processor 202 may be operable to store the predicted set of actions in the memory 208. Based on the predicted set of actions, the application processor 202 may be operable to determine one or more recommendations for the electronic sub-system 104 where the technical fault occurred. The application processor 202 may be operable to communicate the recommendations to the plurality of electronic modules 114 to the transceiver 212. The transceiver 212 may be further operable to transmit the one or more recommendations to the plurality of electronic modules 114, via the communication network 108. In accordance with an embodiment, the one or more recommendations may include a sequence of one or more steps to implement an optimized configuration setting, a troubleshooting support, and/or a test pattern for one or more electronic components of the electronic sub-system 104. In accordance with an embodiment, the application processor 202 may be further operable to store the one or more recommendations that correspond to the technical fault, in a service log file stored in the data warehouse 106.

In accordance with an embodiment, the display controller 206 may be operable to retrieve the first set of data from the memory 208. The display controller 206 may be further operable to format the first set of data for presentation on the display screen 110. The format may include, but is not limited to, highlighted portions of the data, selection of a font of the data to be presented, and/or specification of orientation of the data to be presented on the display screen 110. The display controller 206 may be further operable to determine the region of the display screen 110, on which the first set of data may be displayed. The display controller 206 may be further operable to present a set of UI objects on the display screen 110.

In accordance with an embodiment, the set of UI objects may correspond to a set of operations that may be performed based on the displayed first set of data. The display controller 206 may be further operable to combine the first set of data received from the plurality of electronic modules 114, data received from IT hardware and/or software via SNMP, and other such electronic modules from other such electronic sub-systems. The combined first set of data may be presented in a single graphical representation on the display screen 110. In such a case, the first set of data may be combined based on a date and/or a timestamp.

In accordance with an embodiment, the application processor 202 may be operable to provide an option for the user 118 to create a flowchart and/or a workflow. The flowchart and/or workflow may correspond to the one or more electronic components of the electronic sub-system 104. In accordance with an embodiment, the flowchart and/or the workflow may comprise a set of alarms and/or actions to be performed based on the state of the electronic system 100. In accordance with an embodiment, the prediction of the set of actions may be based on the created flowchart. In accordance with an embodiment, the plurality of electronic modules 114 may be operable to directly execute a set of actions based on the workflow. In such a case, the application processor 202 may be operable to transmit the created workflow to the plurality of electronic modules 114. The plurality of electronic modules 114 may store the received workflow in the local buffers for future references.

In accordance with an embodiment, the application processor 202 may be operable to provide an option to upload and/or download one or more labels and/or one or more comments, via the display screen 110. The labels and/or one or more comments may be associated with the plurality of electronic modules 114. In accordance with an embodiment, the one or more comments may correspond to a set of details of a fault that may occur in one or more electronic components of the electronic sub-system 104. The one or more comments may further correspond to another set of actions. In accordance with an embodiment, the other set of actions may include the set of actions predicted by the application processor 202 that is performed to resolve the fault. In accordance with an embodiment, the other set of actions may include one or more actions (to resolve the fault) not predicted by the application processor 202. In an exemplary scenario, the one or more actions may be manually provided by the user 118, without an assistance from the application processor 202, to resolve the fault. In accordance with an embodiment, the application processor 202 may be further operable to store the second set of data retrieved from the data warehouse 106, in the memory 208. The application processor 202 may be further operable to provide an option on the display screen 110, to purchase one or more new electronic modules, and/or one or more new software modules associated with plurality of electronic modules 114.

In accordance with an embodiment, the application processor 202 may be operable to provide an option to select one or more service parameters associated with the received first set of data, displayed on the display screen 110. The selection of one or more service parameters may be done to retrieve a set of attributes that comprises a data value, a frequency, amplitude, and/or a phase associated with one or more service parameters. In accordance with an embodiment, the display controller 206 may be operable to specify the region of the display screen 110 in which the set of attributes may be displayed. The I/O unit 210 may be operable to output the set of attributes received from the application processor 202. The output may be a visual presentation on the specified region of the display screen 110 that may correspond to the set of attributes. The output may be an audio output that may correspond to the set of attributes.

In accordance with an embodiment, the application processor 202 may be operable to provide a list of the detected electronic modules, on the display screen 110. The displayed list may comprise user selectable UI objects that may correspond to the electronic modules displayed in the list. The application processor 202 may be further operable to display one or more payload data that may correspond to one or more service parameters associated with the plurality of electronic modules 114. The application processor 202 may be further operable to display an option to retrieve an online user manual that may correspond to the one or more electronic components of the electronic sub-system 104. The online user manual may include the operating specifications and/or configuration parameters associated with the list of the detected electronic modules that may be displayed on the display screen 110. The one or more electronic components may be associated with the plurality of electronic modules 114 of the electronic sub-system 104. In accordance with an embodiment, the application processor 202 may be operable to retrieve the user manual stored in the memory 208. In accordance with an embodiment, a universal resource locator (URL) that corresponds to the online manual may be selected to retrieve the user manual stored in a remote memory. In accordance with an embodiment, the application processor 202 may be further operable to display an option to establish a text, a voice, and/or a video chat connection with an operator, such as a live person stationed at a remote location. In accordance with an embodiment, the application processor 202 may be further operable to share the payload data with the remote operator for review and analysis. The application processor 202 may be further operable to receive instructions from the remote operator, based on the reviewed and analyzed one or more payload data. In accordance with an embodiment, the remote operator may communicatively connect to the plurality of electronic modules 114, via the application processor 202, to operate and/or monitor the plurality of electronic modules 114. The application processor 202 may be further operable to communicate a set of steps to the plurality of electronic modules 114 based on the received instructions. The application processor 202 may be further operable to display the received instructions on the display screen 110.

In accordance with an embodiment, the application processor 202 may be operable to retrieve one or more system diagrams that may correspond to one or more electronic components associated with the plurality of electronic modules 114. The display controller 206 may be operable to provide a zoom option to zoom-in or zoom-out one or more system diagrams to full screen, based on a gesture. The display controller 206 may be further operable to overlay the zoomed-in or zoomed-out system diagrams on another portion of the display screen 110. The display controller 206 may be operable to zoom-in and/or zoom-out the system diagrams based on a pinch gesture performed on the display screen 110. In accordance with an embodiment, the display controller 206 may be operable to perform automatic zoom-in and/or zoom-out operation based on the payload data corresponding to a technical fault associated with the plurality of electronic modules 114.

In accordance with an embodiment, the application processor 202 may be operable to define one or more threshold values that may correspond to the one or more service parameters of the one or more electronic components. The defined threshold values may be based on operational information associated with the one or more electronic components of the electronic sub-system 104. In accordance with an embodiment, the operational information may be retrieved from one or more pre-stored and/or online user manuals. In accordance with an embodiment, the application processor 202 and/or the analytics unit 204 may be operable to predict the set of actions, based on the defined threshold values.

In accordance with an embodiment, the application processor 202 may be operable to receive location information that may correspond to the one or more electronic components of the electronic sub-system 104. Such location information may be received from a location module, such as a GPS sensor, associated with one or more electronic components of the electronic sub-system 104. The application processor 202 may be operable to communicate the location information to the analytics unit 204. The analytics unit 204 may be operable to predict a set of actions based on the received location information.

Figure 3A:
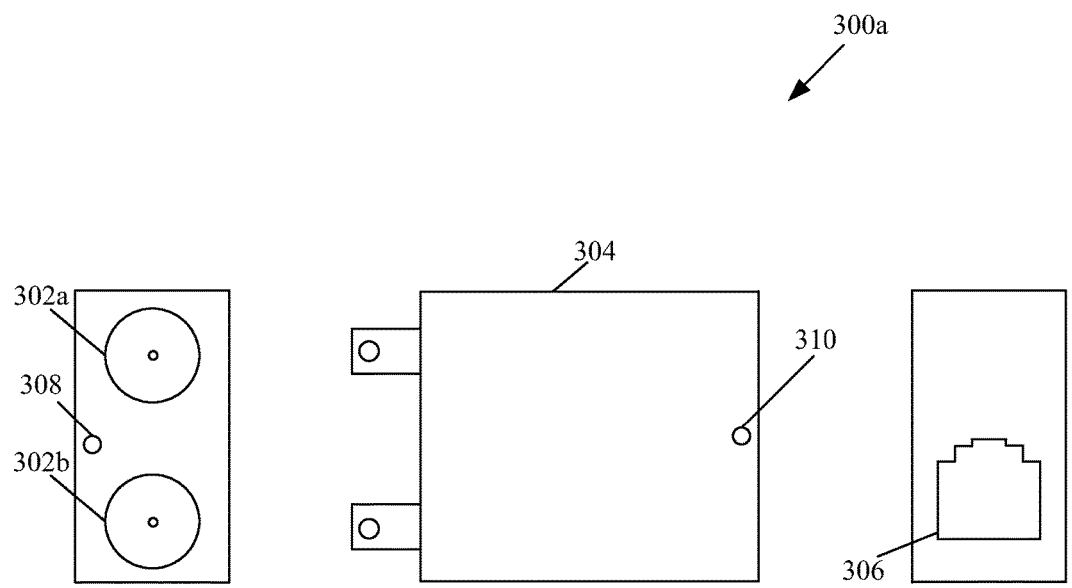
FIGS. 3A and 3B illustrate a first exemplary electronic module to implement the disclosed method and system for management of an electronic system, in accordance with an embodiment of the disclosure.
Figure 3B:
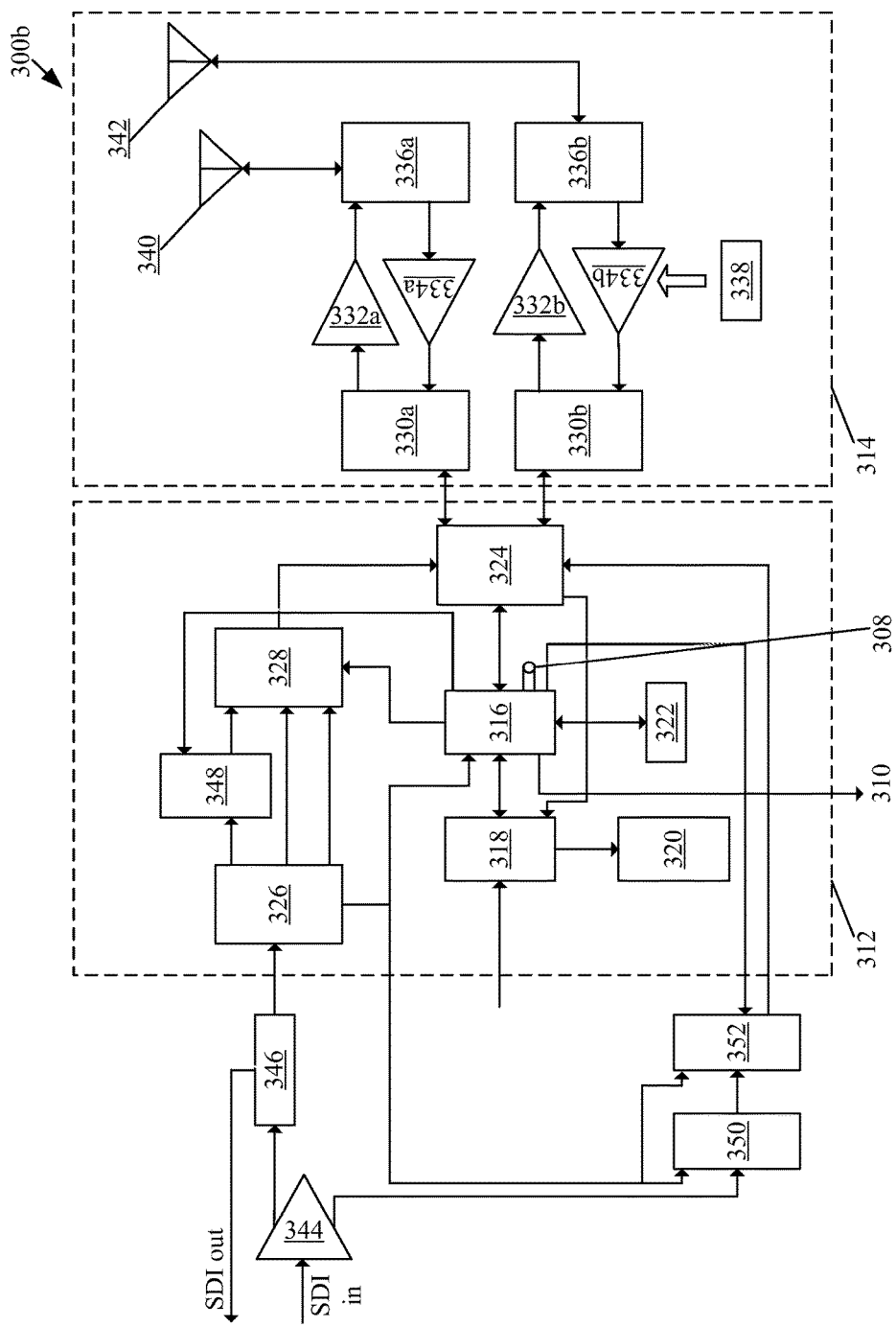

FIGS. 3A and 3B illustrate a first exemplary electronic module to implement the disclosed method and system for management of an electronic system, in accordance with an embodiment of the disclosure. FIGS. 3A and 3B are described in conjunction with elements of FIG. 1 and FIG. 2. FIG. 3A is an exemplary structural configuration diagram 300a that may correspond to the first electronic module, such as a digital video monitor 300 (not shown).

With reference to FIG. 3A, there is shown the first exemplary electronic module operable to be connected to one or more electronic components of the electronic sub-system 104, such as a digital video recorder. The digital video monitor 300 may be operable to monitor the digital video captured by the digital video recorder.

With reference to FIG. 3A, the digital video monitor 300 may comprise Bayonet Neill-Concelman (BNC) connectors 302a and 302b, a cabinet 304, an Ethernet port 306, a lamp 308, and a hardware reset button 310. The digital video monitor 300 may be operable to be connected to the digital video recorder via the BNC connectors 302a and 302b. The digital video monitor 300 may be communicatively coupled to the electronic device 102, and/or other electronic module, via the Ethernet port 306. The Ethernet port 306 may be operable to provide a path and/or a control for the video data to be sent as wired information.

The BNC connector 302a may correspond to an input port. The BNC connector 302b may correspond to an output port. The BNC connectors 302a and 302b may be placed at one end of the digital video monitor 300. The cabinet 304 may comprise suitable logic, circuitry, interfaces, and/or code that may be operable to monitor the digital video. The Ethernet port 306 may be provided to monitor the data transmitted through the BNC connectors 302a and 302b. Notwithstanding, the disclosure may not be so limited, in accordance with an embodiment, the arrangement of the elements of the digital video monitor 300 may be different from the disclosed arrangement, without limiting the scope of the disclosure.

The lamp 308 may be a Light Emitting Diode (LED) configured to provide the status of the digital video monitor 300. The lamp 308 may be operable to indicate the status of the digital video monitor 300, based on emission of light among a set of three colors. The set of colors may comprise a red color, a yellow color, and/or a green color. The green-colored light may correspond to a correct state of operation of the digital video monitor 300. The correct state of operation may correspond to a successful detection of a digital video signal by the digital video monitor 300. The yellow-colored light may correspond to a test mode of operation of the digital video monitor 300. The red-colored light may correspond to an incorrect state of operation of the digital video monitor 300. A flashing red-colored light may correspond to an alarm that may signal an incorrect state of operation. In accordance with an embodiment, the incorrect state of operation may correspond to a loss of the digital video signal by the digital video monitor 300.

In accordance with an embodiment, the digital video monitor 300 may be operable to retrieve horizontal and vertical scans associated with the digital video signal. The digital video monitor 300 may be further operable to perform a red, a green, and a blue (RGB) parade and/or an audio de-embedding for level measurement. The digital video monitor 300 may be further operable to perform voltage and/or timing measurements. The digital video monitor 300 may be further operable to perform a waveform line selection, a waveform zoom operation, and/or an RGB display selection, based on a command issued by the electronic device 102. The digital video monitor 300 may be further operable to transmit data to the electronic device 102, such as a histogram display, an eye pattern display, and/or an SDI payload ID data. The hardware reset button 310 may be provided on the cabinet 304 to reset the configuration of the digital video monitor 300. Notwithstanding, the disclosure may not be so limited, and the digital video monitor 300 may be communicatively coupled to other electronic modules, and/or network elements, via the Ethernet port 306 and/or other wireless technologies known in the art, without limiting the scope of the disclosure.

FIG. 3B is a block diagram that illustrates the first exemplary electronic module operable to be connected to one or more electronic components of an electronic subsystem, in accordance with an embodiment of the disclosure. FIG. 3B is explained in conjunction with elements from FIGS. 1, 2 and 3A. With reference to FIG. 3B, there is a block diagram 300b. The block diagram 300b includes the digital video monitor 300 (as shown in FIG. 3A). The digital video monitor 300 may comprise a core section 312 and a transceiver section 314. The core section 312 may comprise a first set of operational blocks, such as a central processing unit (CPU) 316, an Ethernet block 318, a power supply 320, a module memory 322, an encoder 324, field programmable gate array (FPGA) 326, and/or a multiplexer 328. The CPU 316 may comprise the lamp 308 (as shown in FIG. 3A) and/or the hardware reset button 310 (as shown in FIG. 3A).

The transceiver section 314 may comprise a second set of operational blocks, such as digital front-end blocks 330a and 330b. The transceiver section 314 may further comprise transmission amplifiers 332a and 332b. The transceiver section 314 may further comprise reception de-amplifiers 334a and 334b. The transceiver section 314 may further comprise duplexers 336a and 336b. The transceiver section 314 may further comprise a dip switch 338 operable to provide a signal to switch between two operational modes, such as a Wi-Fi operational mode and a Bluetooth operational mode. The transceiver section 314 may further comprise one or more antennae, such as a Wi-Fi antenna 340, and/or a Bluetooth antenna 342. The digital video monitor 300 may further comprise a distribution amplifier 344, a de-serializer 346, a video scaler 348, an eye pattern detection block 350, and/or an analog-to-digital conversion block 352.

The first set of operational blocks in the core section 312 may be communicatively coupled to the second set of operational blocks in the transceiver section 314. In accordance with an embodiment, the first set of operational blocks in the core section 312 may be communicatively coupled to the distribution amplifier 344, the de-serializer 346, the video scaler 348, the eye pattern detection block 350, and/or the analog-to-digital conversion block 352, as shown in FIG. 3B.

In operation, the digital video signal that corresponds to the digital video recorder may be provided as an input via the distribution amplifier 344. The digital video signal may comprise video data, audio data, and/or payload data that may correspond to a known standard, such as an SMPTE S425 standard, a S292 standard, and/or the like. In accordance with an embodiment, the distribution amplifier 344 may be operable to split the digital video signal into two separate digital video signals, such as a first digital video signal and a second digital video signal. The de-serializer 346 may be operable to decode the first digital video signal as parallel data. The de-serializer 346 may be further operable to transmit the decoded first digital video signal to the FPGA 326. The FPGA 326 may be operable to generate a timing clock to synchronize the operational blocks communicatively coupled to the FPGA 326. The FPGA 326 may be further operable to separate the first digital video signal into the video data, the audio data, and/or the payload data.

In accordance with an embodiment, the video data associated with the first digital video signal may be transmitted as parallel data to the video scaler 348. The video scaler 348 may become operational based on a command issued by the CPU 316. In accordance with an embodiment, the command may be issued based on an input received by the CPU 316 from the electronic device 102. In accordance with an embodiment, the CPU 316 may be operable to receive video data, via the Ethernet block 318. The received video data may be stored in the module memory 322. The video scaler 348 may be operable to reduce the size of an image associated with the video data. In accordance with an embodiment, the reduced image may be transmitted back to the electronic device 102. In accordance with an embodiment, the operation of the video scaler 348 may be bypassed when the input received by the CPU 316 corresponds to a command to measure a service parameter associated with the video data. The command may be received via the encoder 324. In accordance with an embodiment, the encoder 324 may be operable to receive the data from the electronic device 102, via the Wi-Fi antenna 340 or the Bluetooth antenna 342.

In accordance with an embodiment, the video data, the audio data, and the payload data may be transmitted to the multiplexer 328. The multiplexer 328 may be operable to buffer the received data. The multiplexer 328 may be further operable to align the received data for further transmission to the transceiver section 314, via the encoder 324. In accordance with an embodiment, the CPU 316 may be operable to monitor the clock timing signal received from the FPGA 326 and time the digital video data transmission in serial packets.

In accordance with an embodiment, the second digital video data may be transmitted to the eye pattern detection block 350, and/or the analog-to-digital conversion block 352. The eye pattern detection block 350 may be operable to take a snapshot of the serial data eye patterns. The digital representation of the snapshot of the eye pattern may be transmitted to the electronic device 102, via the encoder 324, when the CPU receives a command to display the eye pattern on the display screen 110. The output of the encoder 324 may be transmitted to the transceiver section 314. In the transceiver section 314, the received digital video data may be amplified by the transmission amplifiers 332a and/or 322b. In accordance with an embodiment, the amplified digital video data may be transmitted to the electronic device 102, via the Wi-Fi antenna 340, and/or the Bluetooth antenna 342.

In accordance with an embodiment, the CPU 316 may be operable to provide the status of the digital video monitor 300 based on the lamp 308. In accordance with an embodiment, the CPU 316 may be operable to notify the status of the digital video monitor 300 based on emission of light from the lamp 308. The emitted light may correspond to a set of three colors, as explained in FIG. 3A. In accordance with an embodiment, the CPU 316 may be operable to issue a command for the lamp 308 to emit the green light to indicate a correct state of operation of the digital video monitor 300. The correct state of operation may correspond to a successful detection of a digital video signal by the digital video monitor 300. In accordance with an embodiment, the CPU 316 may be operable to issue a command for the lamp 308 to emit the yellow light to indicate that the digital video monitor 300 is operated in a test mode. In accordance with an embodiment, the CPU 316 may be operable to issue a command for the lamp 308 to emit the red light to indicate that the digital video monitor 300 is operating in an incorrect state. The incorrect state of operation may correspond to a loss of the digital video signal by the digital video monitor 300. In accordance with an embodiment, the emission of red light by the lamp 308 may correspond to an alarm associated with the digital video monitor 300.

Figure 4A:
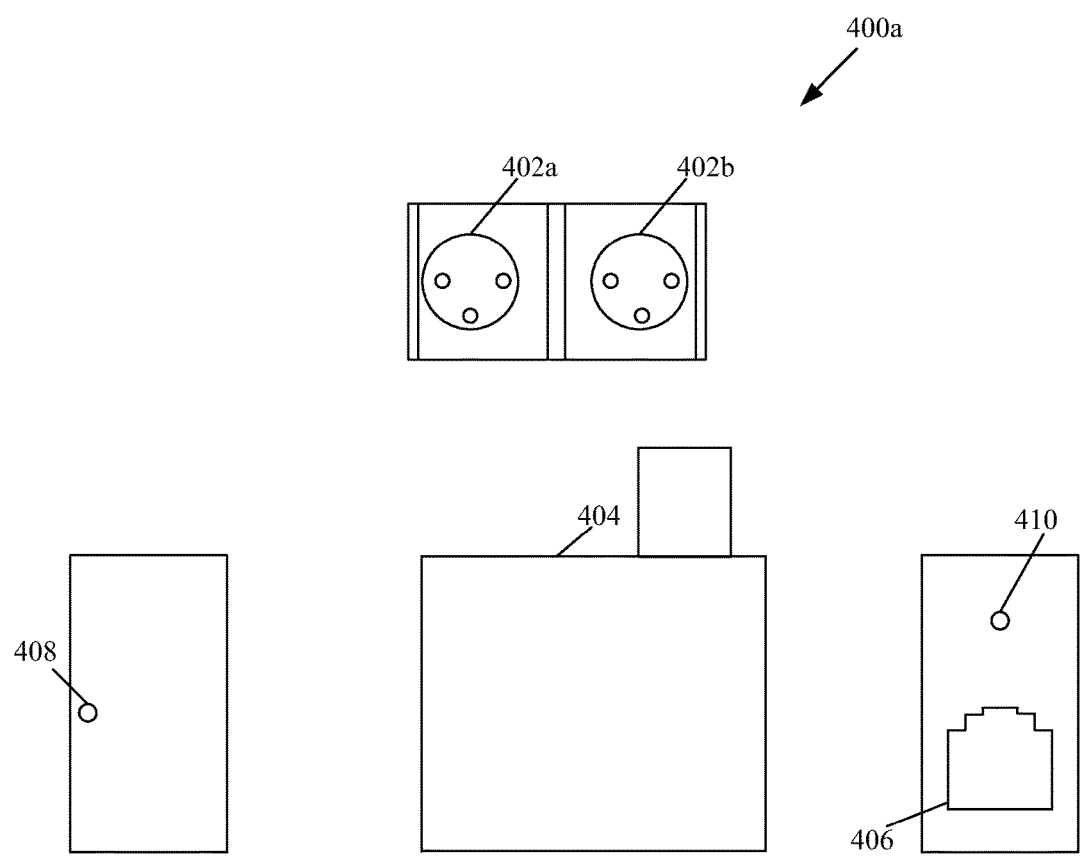
FIGS. 4A and 4B illustrate a second exemplary electronic module to implement the disclosed method and system for management of an electronic system, in accordance with an embodiment of the disclosure.
Figure 4B:
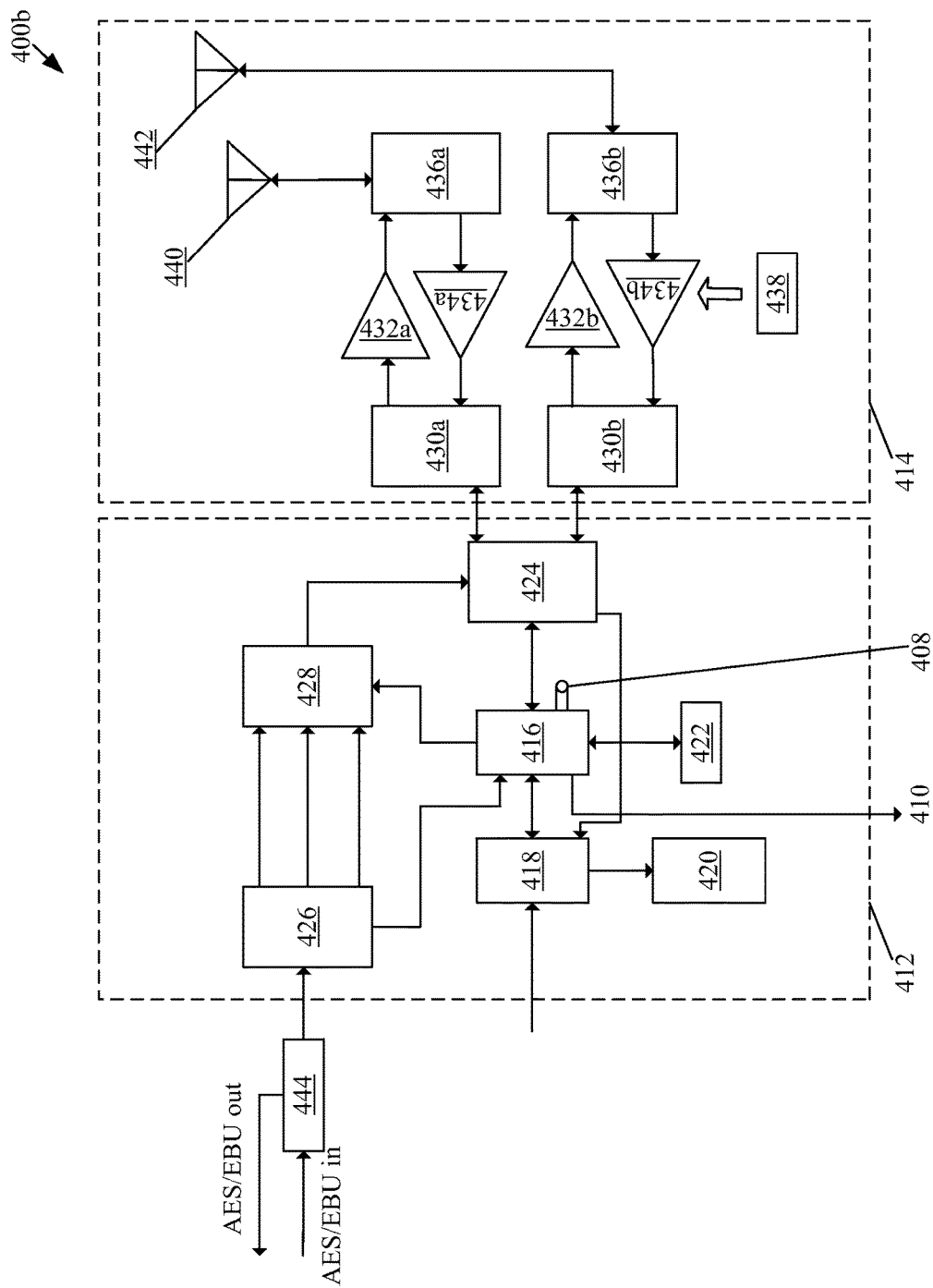

FIGS. 4A and 4B illustrate a second exemplary electronic module to implement the disclosed method and system for management of an electronic system, in accordance with an embodiment of the disclosure. FIGS. 4A and 4B are described in conjunction with elements of FIGS. 1 to 3B. FIG. 4A is an exemplary structural configuration diagram 400a of the second exemplary electronic module, such as a digital audio monitor 400 (not shown).

With reference to FIG. 4A, the digital audio monitor 400 may be connected to one or more electronic components of the electronic sub-system 104, such as a digital audio recorder, installed in an audio broadcast center. The digital audio monitor 400 may be operable to receive and monitor the digital audio captured by the digital audio recorder.

With reference to FIG. 4A, the digital audio monitor 400 may comprise XLR connectors 402a and 402b, a cabinet 404, an Ethernet port 406, a lamp 408, and a hardware reset button 410. The digital audio monitor 400 may be operable to be connected to the digital audio recorder via the XLR connectors 402a and 402b, arranged at the top of the cabinet 404. The digital audio monitor 400 may be communicatively coupled to the electronic device 102, and/or other electronic module, via the Ethernet port 406. The Ethernet port 406 may be operable to provide a path and/or a control for the audio data to be sent as wired information.

The XLR connector 402a may correspond to an input port. The XLR connector 402b may correspond to an output port. The XLR connectors 402a and 402b may be placed at one end of the digital audio monitor 400. The cabinet 404 may comprise suitable logic, circuitry, interfaces, and/or code that may be operable to monitor the digital audio. The Ethernet port 406 may be operable to monitor the audio data transmitted through the XLR connectors 402a and 402b. The lamp 408 may be a Light Emitting Diode (LED) arranged at the front portion of the cabinet 404. In accordance with an embodiment, lamp 408 may correspond to the lamp 308 (as shown in FIG. 3A) which may track and notify the status of the digital audio monitor 400, based on an emission of colored light. Notwithstanding, the disclosure may not be so limited, in accordance with an embodiment, the arrangement of the elements of the digital audio monitor 400 may be different from the disclosed arrangement, without limiting the scope of the disclosure.

In accordance with an embodiment, the digital audio monitor 400 may be operable to measure an audio sample count (16 bit, 20 bit, or 24 bit), associated with a digital audio signal. The digital audio monitor 400 may be further operable to measure sample frequency that corresponds to the digital audio signal. The digital audio monitor 400 may be further operable to determine a cyclic redundancy code (CRC) error flag. The digital audio monitor 400 may be further operable to measure audio level associated with all the 16 channels of the digital audio signal. The hardware reset button 410 may be provided on the cabinet 404 to reset the configuration of the digital audio monitor 400. Notwithstanding, the disclosure may not be so limited, and the digital audio monitor 400 may be communicatively coupled to other electronic modules, and/or network elements, via the Ethernet port 406 and/or other wireless technologies known in the art, without limiting the scope of the disclosure.

FIG. 4B is a block diagram that illustrates the second exemplary electronic module operable to be connected to the one or more electronic components of the electronic sub-system 104, in accordance with an embodiment of the disclosure. FIG. 4B is explained in conjunction with elements from FIGS. 1 to 4A. With reference to FIG. 4B, there is shown a block diagram 400b of the digital audio monitor 400 (as described in FIG. 4A). The digital audio monitor 400 may comprise a core section 412 and a transceiver section 414.

The core section 412 may comprise a first set of operational blocks, such as a central processing unit (CPU) 416, an Ethernet block 418, a power supply 420, a module memory 422, an encoder 424, field programmable gate array (FPGA) 426, and/or a multiplexer 428. The CPU 416 may further comprise the lamp 408 (as shown in FIG. 4A) and/or the hardware reset button 410 (as shown in FIG. 4A). The transceiver section 414 may comprise a second set of operational blocks, such as digital front-end blocks 430a and 430b, transmission amplifiers 432a and 432b, reception de-amplifiers 434a and 434b, duplexers 436a and 436b, a dip switch 438, and one or more antennae, such as a Wi-Fi antenna 440, and/or a Bluetooth antenna 442. The digital audio monitor 400 may further comprise a de-serializer 444. The functionality of each of the first set of operational blocks in the core section 412 may correspond to the functionality of the similar operational blocks in the core section 312 (as shown in FIG. 3B). Further, the functionality of each of the second set of operational blocks in the transceiver section 414 may correspond to the functionality of the similar operational blocks in the transceiver section 314 (as shown in FIG. 3B). The first set of operational blocks in the core section 412 may be communicatively coupled to the second set of operational blocks in the transceiver section 414. In accordance with an embodiment, FPGA 426 in the core section 412 may be communicatively coupled to the de-serializer 444.

In operation, the digital audio signal that corresponds to the digital audio recorder may be provided as an input to the de-serializer 444. The digital audio signal may correspond to a known standard, such as an Audio Engineering Society (AES), European Broadcasting Union (EBU) standard, International Electrotechnical Commission's (IEC) 60958 standard, and/or the like. In accordance with an embodiment, the digital audio monitor 400 may be operable to be connected to a digital video recorder, via BNC connectors or the XLR connectors 402a and 402b. The de-serializer 444 may be operable to decode the digital audio signal and transmit the decoded digital audio signal to the FPGA 426. The FPGA 426 may be operable to generate a timing clock to synchronize the blocks communicatively coupled to the FPGA 426. The FPGA 426 may be further operable to extract essence data "E", validity flag "V", and/or user data "U" from the decoded digital audio signal.

In accordance with an embodiment, the essence data "E", the validity flag "V", and/or the user data "U" may be transmitted as parallel data to the multiplexer 428. The multiplexer 428 may be operable to buffer the received essence data "E", the validity flag "V", and/or the user data "U". The multiplexer 428 may be further operable to generate a multiplexed "EVU Data" for further transmission to the transceiver section 414, via the encoder 424. In accordance with an embodiment, the CPU 416 may be operable to provide an "EVU Switch" signal to the multiplexer 428 for generation of the essence data "E", the validity flag "V", and/or the user data "U". In accordance with an embodiment, the CPU 416 may be further operable to receive audio data, via the Ethernet block 418. The received audio data may be stored in the module memory 422.

In accordance with an embodiment, the output of the encoder 424 may be transmitted to the transmission amplifiers 432a and/or 432b in the transceiver section 414. The transmission amplifiers 432a and/or 432b may be operable to amplify the received "EVU Data". In accordance with an embodiment, the amplified "EVU Data" may be transmitted to the electronic device 102, via the Wi-Fi antenna 440 and/or the Bluetooth antenna 442. In accordance with an embodiment, the CPU 416 may be operable to provide the status of the digital audio monitor 400 via the lamp 408.

Figure 5A:
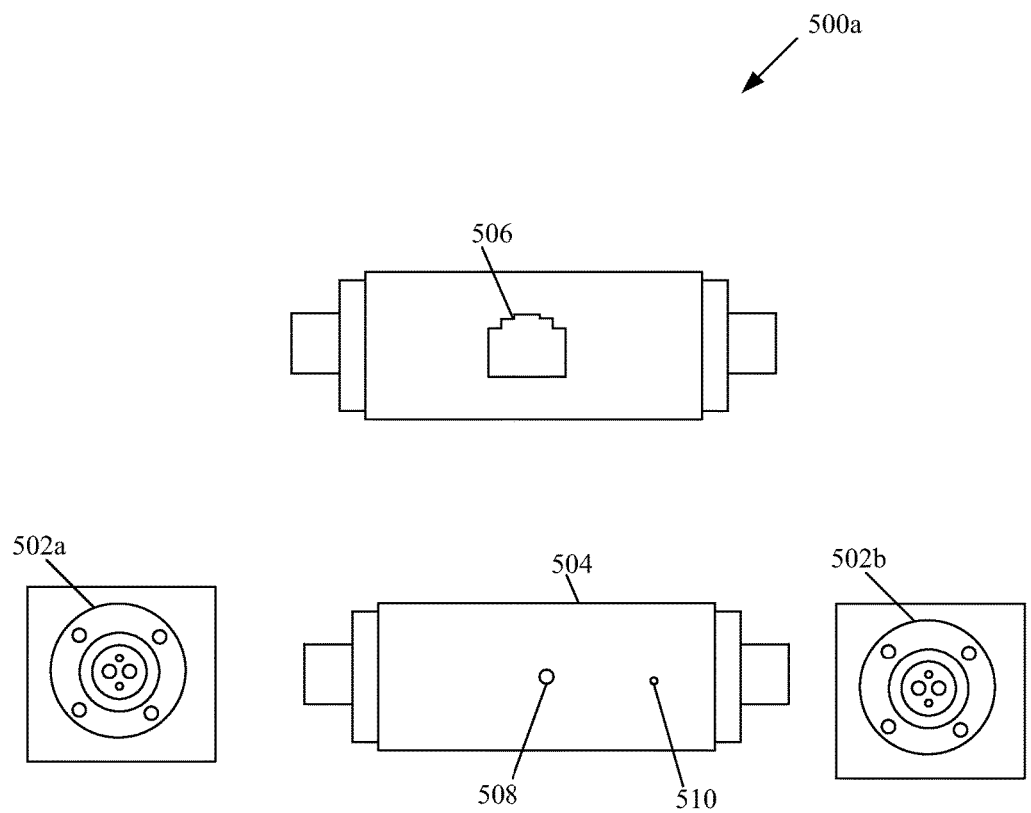
FIGS. 5A and 5B illustrate a third exemplary electronic module to implement the disclosed method and system for management of an electronic system, in accordance with an embodiment of the disclosure.
Figure 5B:
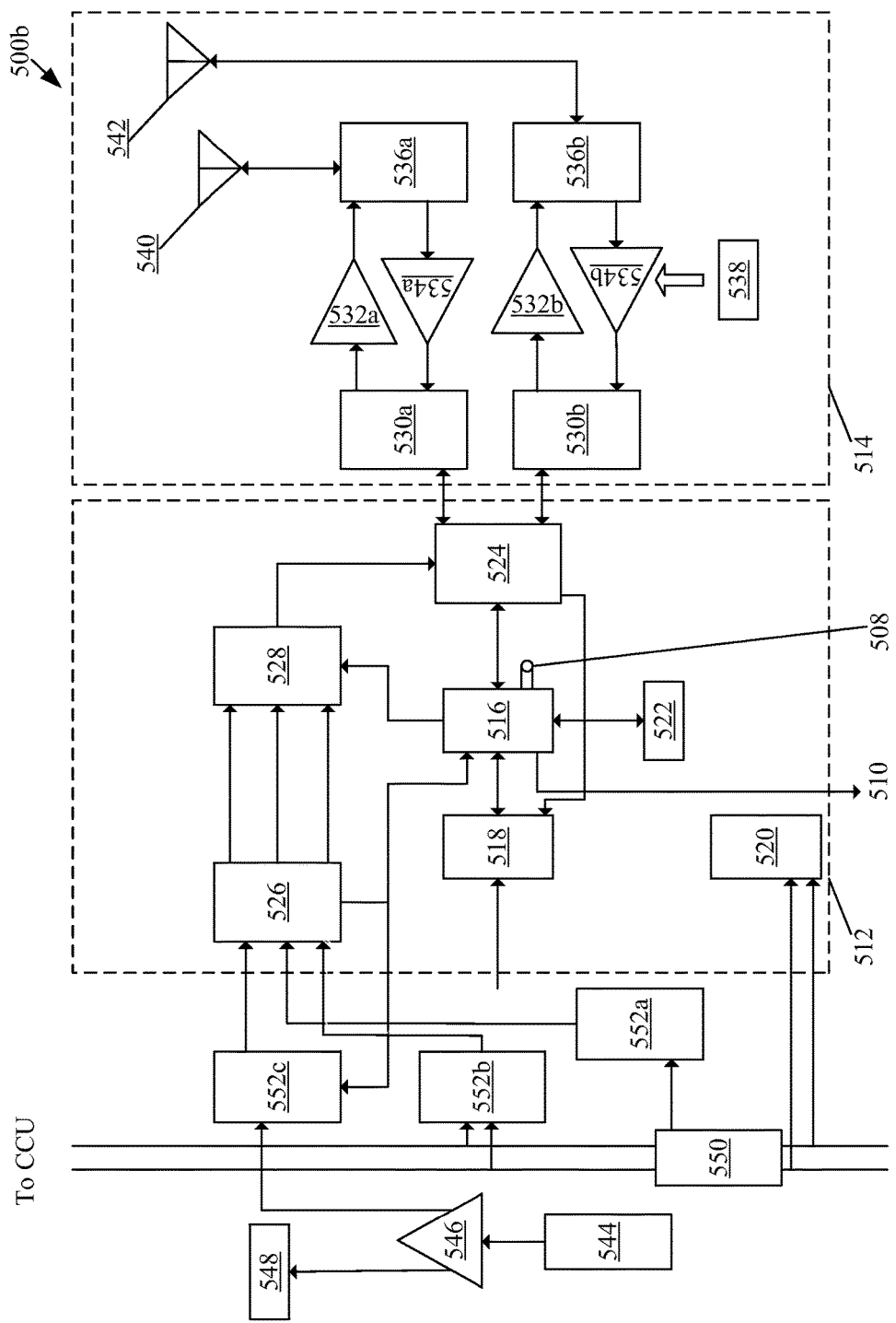

FIGS. 5A and 5B illustrate a third exemplary electronic module to implement the disclosed method and system for management of an electronic system, in accordance with an embodiment of the disclosure. FIGS. 5A and 5B are described in conjunction with elements of FIGS. 1 to 4B. FIG. 5A is an exemplary structural configuration diagram 500a of the third exemplary electronic module, such as an SMPTE fiber monitor 500 (not shown).

With reference to FIG. 5A, the SMPTE fiber monitor 500 may be connected to one or more electronic components of the electronic sub-system 104, such as a digital video recorder, based on a fiber optic cable and/or other wired connection. The SMPTE fiber monitor 500 may be operable to monitor the optical fiber data that corresponds to the digital video recorder.

With reference to FIG. 5A, the SMPTE fiber monitor 500 may comprise connectors 502a and 502b, a cabinet 504, an Ethernet port 506, a lamp 508, and a hardware reset button 510. The SMPTE fiber monitor 500 may be operable to be connected to the digital video recorder, such as a camera, via the connectors 502a and 502b arranged at the opposite ends of the cabinet 504. The SMPTE fiber monitor 500 may be communicatively coupled to the electronic device 102, and/or other electronic module, via the Ethernet port 506. The Ethernet port 506 may be operable to provide a path and/or a control for the optical fiber data to be sent as wired information.

The connector 502a may correspond to an input port. The connector 502b may correspond to an output port. The cabinet 504 may comprise suitable logic, circuitry, interfaces, and/or code that may be operable to monitor the optical fiber data. The Ethernet port 506 may be provided to monitor the optical fiber data transmitted through the connectors 502a and 502b. The lamp 508 may be a Light Emitting Diode (LED) arranged at a front portion of the cabinet 504. The lamp 508 may be configured to provide the status of the SMPTE fiber monitor 500. The functionality of the lamp 508 may be similar to the functionality of the lamp 308 used for the digital video monitor 300, as shown in FIG. 3A. The lamp 508 may be operable to track and notify the status of the SMPTE fiber monitor 500 based on emission of light. Notwithstanding, the disclosure may not be so limited, in accordance with an embodiment, the arrangement of the elements of the SMPTE fiber monitor 500 may be different from the disclosed arrangement, without limiting the scope of the disclosure.

In accordance with an embodiment, the SMPTE fiber monitor 500 may be operable to measure a power level, a camera head main voltage, and/or a camera head main current, associated with an optical fiber signal of the digital video recorder. The hardware reset button 510 may be provided on the cabinet 504 to reset the configuration of the SMPTE fiber monitor 500. Further, control line(s) may be provided with the connectors 502a and 502b to allow monitoring of transmitted signals from a camera control unit (CCU) and a camera head unit (CHU), when a protocol that corresponds to a specific camera model is available. Notwithstanding, the disclosure may not be so limited, and the SMPTE fiber monitor 500 may be communicatively coupled to other electronic modules, and/or network elements, via the Ethernet port 506 and/or other wireless technologies known in the art, without limiting the scope of the disclosure.

FIG. 5B is a block diagram that illustrates the third exemplary electronic module operable to be connected to the one or more electronic components of the electronic sub-system 104, in accordance with an embodiment of the disclosure. FIG. 5B is explained in conjunction with elements from FIGS. 1 to 5A. With reference to FIG. 5B, there is shown a block diagram 500b. The block diagram 500b includes the SMPTE fiber monitor 500 (as shown in FIG. 5A). The SMPTE fiber monitor 500 may comprise a core section 512 and a transceiver section 514.

The core section 512 may comprise a first set of operational blocks, such as a central processing unit (CPU) 516, an Ethernet block 518, a power supply 520, a module memory 522, an encoder 524, a field programmable gate array (FPGA) 526, and/or a multiplexer 528. The CPU 516 may comprise the lamp 508 (as shown in FIG. 5A) and/or the hardware reset button 510 (as shown in FIG. 5A). The transceiver section 514 may comprise a second set of operational blocks, such as digital front-end blocks 530a and 530b, transmission amplifiers 532a and 532b, reception de-amplifiers 534a and 534b, duplexers 536a and 536b, a dip switch 538, and one or more antennae, such as a Wi-Fi antenna 540, and/or a Bluetooth antenna 542. The SMPTE fiber monitor 500 may further comprise a fiber detector 544, a distribution amplifier 546, a fiber transmitter 548, a current bridge 550, and/or three analog-to-digital convertors 552a, 552b, and 552c. The functionality of each of the first set of operational blocks in the core section 512 may correspond to the functionality of the similar operational blocks in the core section 312 (as shown in FIG. 3B). Further, the functionality of each of the second set of operational blocks in the transceiver section 514 may correspond to the functionality of the similar operational blocks in the transceiver section 314 (as shown in FIG. 3B).

The first set of operational blocks in the core section 512 may be communicatively coupled to the second set of operational blocks in the transceiver section 514. In accordance with an embodiment, the FPGA 526 in the core section 512 may be communicatively coupled to the analog-to-digital convertors 552a, 552b, and 552c. The analog-to-digital convertor 552a may be communicatively coupled to the current bridge 550. The current bridge 550 may be operable to monitor the main current that corresponds to a fiber optic signal transmission between the CCU, and the CHU. The analog-to-digital convertor 552b may be communicatively coupled to a primary path and a backup path of transmission between the CCU and the CHU. The analog-to-digital convertor 552c may be operable to receive an input signal from a distribution amplifier 546. The distribution amplifier 546 may be further communicatively coupled with the fiber detector 544, and/or the fiber transmitter 548.

In operation, the distribution amplifier 546 may be configured to receive the fiber optic signal detected by the fiber detector 544. The distribution amplifier 546 may be operable to split the received optical fiber signal into two separate signals, such as a first fiber optic signal and a second fiber optic signal. The first fiber optic signal may be transmitted to the fiber transmitter 548 to continue the transmission of the fiber optic signal. The second fiber optic signal may be transmitted to the analog-to-digital convertor 552c for optical fiber power data measurement. The analog-to-digital convertor 552a may be operable to convert the main current that corresponds to a fiber optic signal transmission between the CCU and the CHU, to a digital signal. The analog-todigital convertor 552b may be operable to convert the main current that corresponds to a primary path and a backup path of transmission between the CCU and the CHU, to a digital signal.

In accordance with an embodiment, the output from the three analog-to-digital convertor 552a, 552b, and 552c may be transmitted to the FPGA 526. The FPGA 526 may be operable to generate a timing clock to synchronize the blocks communicatively coupled to the FPGA 526. The FPGA 526 may be further operable to extract optical fiber power data "O", voltage data "V", and/or current data "C", from the input signal. In accordance with an embodiment, the voltage data "V" is measured on copper wires in a cable that feeds power supply to the CHU.

In accordance with an embodiment, the optical fiber power data "O", the voltage data "V", and/or the current data "C", may be transmitted as parallel data to the multiplexer 528. The multiplexer 528 may be operable to buffer the received data. The multiplexer 528 may be further operable to align the received data for further transmission to the transceiver section 514, via the encoder 524. In accordance with an embodiment, the CPU 516 may be operable to provide an "OVC Switch" signal to the multiplexer 528 for transmission of the optical fiber power data "O", the voltage data "V", and/or the current data "C". In accordance with an embodiment, the CPU 516 may be further operable to receive optical fiber data, via the Ethernet block 518. The received optical fiber data may be stored in the module memory 522.

In accordance with an embodiment, the output of the encoder 524 may be transmitted to the transceiver section 514. In the transceiver section 514, the received optical fiber power data, the voltage data, and/or the current data may be amplified by the transmission amplifiers 532a, and/or 532b. In accordance with an embodiment, the amplified optical fiber power data, the voltage data, and/or the current data may be transmitted based on the Wi-Fi, and/or the Bluetooth network, via the Wi-Fi antenna 540, and/or the Bluetooth antenna 542. The amplified optical fiber power data, the voltage data, and/or the current data may be transmitted based on the Ethernet block 518. In accordance with an embodiment, the CPU 516 may be operable to provide the status of the SMPTE fiber monitor 500 based on the lamp 508.

Figure 6A:
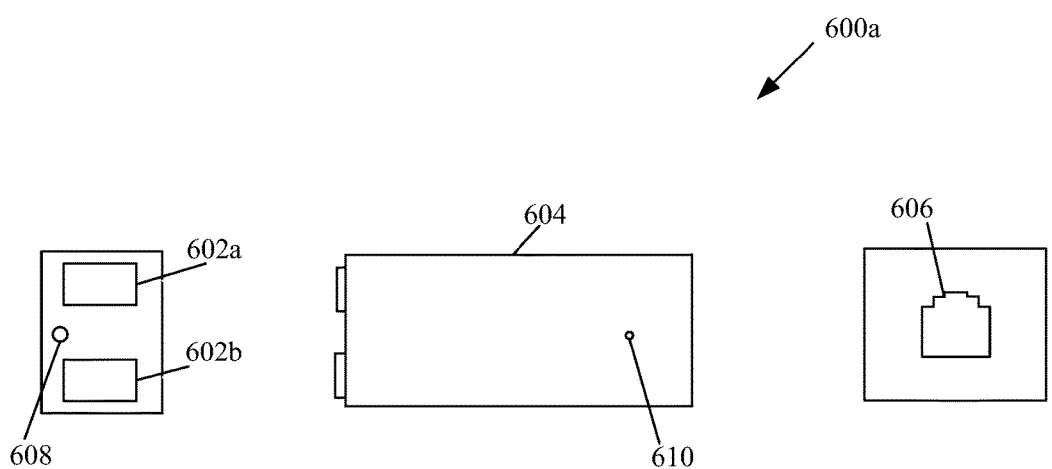
FIGS. 6A and 6B illustrate a fourth exemplary electronic module to implement the disclosed method and system for management of an electronic system, in accordance with an embodiment of the disclosure.
Figure 6B:
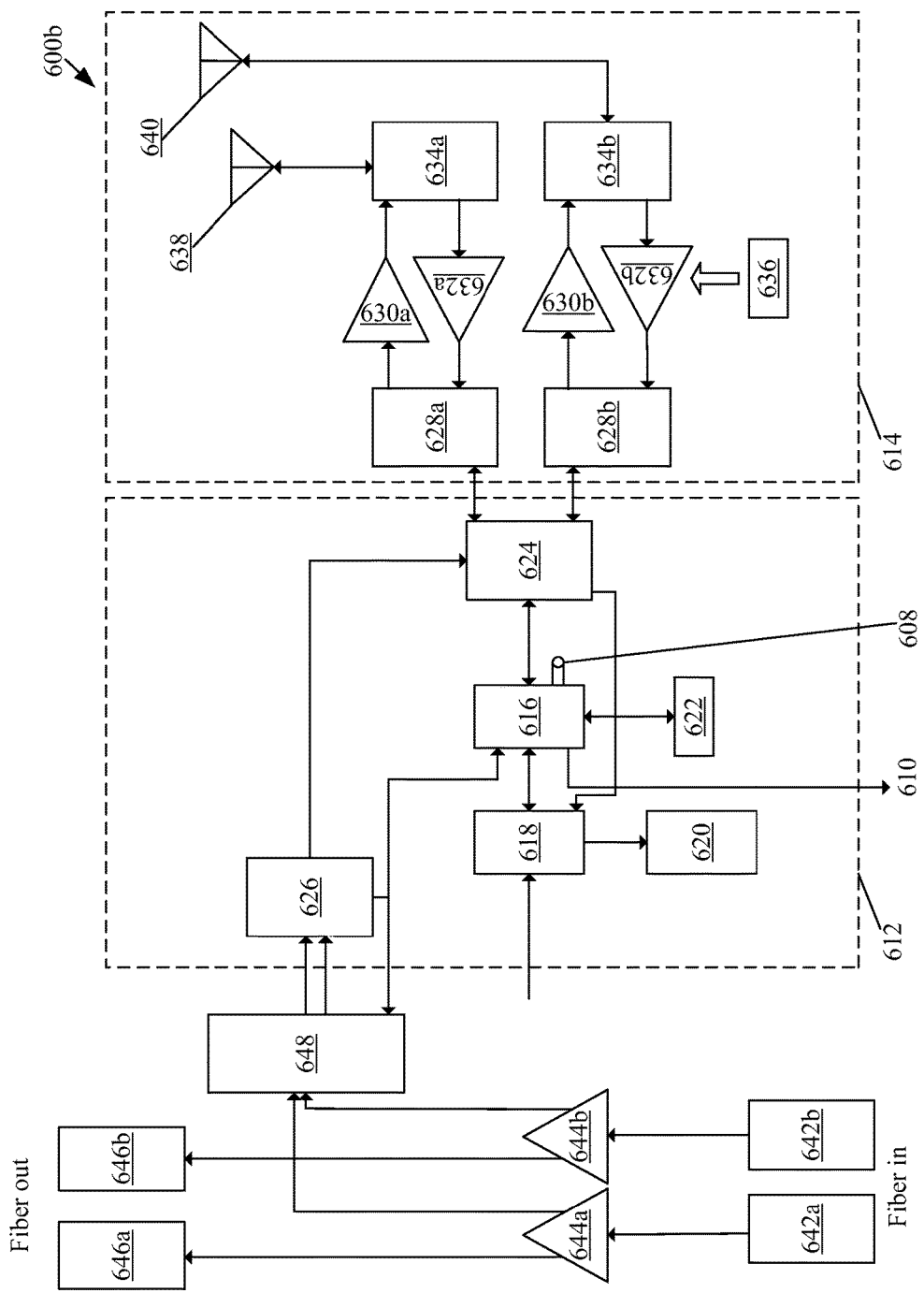

FIGS. 6A and 6B illustrate a fourth exemplary electronic module to implement the disclosed method and system for management of an electronic system, in accordance with an embodiment of the disclosure. FIGS. 6A and 6B are described in conjunction with elements of FIGS. 1 to 5B. FIG. 6A is an exemplary structural configuration diagram 600a of the fourth exemplary electronic module, such as a fiber monitor 600 (not shown).

With reference to FIG. 6A, the fiber monitor 600 may be connected to one or more electronic components of the electronic sub-system 104, such as a digital video recorder, based on a fiber optic cable. The fiber monitor 600 may be operable to monitor the optical fiber data that corresponds to the optical fiber of the digital video recorder. In accordance with an embodiment, the input signal from a digital video recorder may be received via a small form-factor pluggable (SFP) connector, and/or a gigabit interface connector (GBIC).

With reference to FIG. 6A, the fiber monitor 600 may comprise connectors 602a and 602b, a cabinet 604, an Ethernet port 606, a lamp 608, and a hardware reset button 610. The fiber monitor 600 may be operable to be connected to the digital video recorder via the connectors 602a and 602b. The fiber monitor 600 may be communicatively coupled to the electronic device 102, and/or other electronic module, via the Ethernet port 606. The Ethernet port 606 may be operable to provide a path and/or a control for the optical fiber data to be sent as wired information.

In accordance with an embodiment, the connectors 602a and/or 602b may correspond to the SFP or the GBIC connector. The connector 602a may correspond to an input port. The connector 602b may correspond to an output port. The cabinet 604 may comprise suitable logic, circuitry, interfaces, and/or code that may be operable to monitor the optical fiber data. The lamp 608 may be a Light Emitting Diode (LED) arranged adjacent to the plurality of slots to receive the connectors 602a and 602b. The lamp 608 may be configured to provide the status of the fiber monitor 600. The lamp 608 may correspond to the lamp 308 used for the digital video monitor 300 (as shown in FIG. 3A) which may track and notify the status of the fiber monitor 600 based on an emission of colored light. Further, the operation of the lamp 608 may correspond to the operation of the lamp 308. Notwithstanding, the disclosure may not be so limited, in accordance with an embodiment, the arrangement of the elements of the fiber monitor 600 may be different from the disclosed arrangement, without limiting the scope of the disclosure.

In accordance with an embodiment, the fiber monitor 600 may be operable to measure an optical power level associated with an optical fiber signal of the digital video recorder. The hardware reset button 610 may be provided on the cabinet 604 to reset the configuration of the fiber monitor 600. Notwithstanding, the disclosure may not be so limited, and the fiber monitor 600 may be communicatively coupled to other electronic modules, and/or network elements, via the Ethernet port 606 and/or other wireless technologies known in the art, without limiting the scope of the disclosure.

FIG. 6B is a block diagram that illustrates the fourth exemplary electronic module operable to be connected to the one or more electronic components of the electronic sub-system 104, in accordance with an embodiment of the disclosure. FIG. 6B is explained in conjunction with elements from FIGS. 1 to 6A. With reference to FIG. 6B, there is shown a block diagram 600b of the fiber monitor 600 (as described in FIG. 6A). The fiber monitor 600 may comprise a core section 612 and a transceiver section 614.

The core section 612 may comprise a first set of operational blocks, such as a central processing unit (CPU) 616, an Ethernet block 618, a power supply 620, a module memory 622, an encoder 624, and/or field programmable gate array (FPGA) 626. The CPU 616 may further comprise the lamp 608 (as shown in FIG. 6A), and/or the hardware reset button 610 (as shown in FIG. 6A). The transceiver section 614 may comprise a second set of operational blocks, such as digital front-end blocks 628a and 628b, transmission amplifiers 630a and 630b, reception de-amplifiers 632a and 632b, duplexers 634a and 634b, a dip switch 636, one or more antennae, such as a Wi-Fi antenna 638, and/or a Bluetooth antenna 640. The fiber monitor 600 may further comprise fiber detectors 642a and 642b, distribution amplifiers 644a and 644b, fiber transmitters 646a and 646b, and/or an analog-to-digital convertor 648. In accordance with an embodiment, the functionality of each of the second set of operational blocks in the transceiver section 614 may correspond to the functionality of the similar operational blocks in the transceiver section 314 (as shown in FIG. 3b). The functionality of each of the first set of operational blocks in the core section 612 may correspond to the functionality of the similar operational blocks in the core section 312 (as shown in FIG. 3B). Further, the functionality of each of the second set of operational blocks in the transceiver section 614 may correspond to the functionality of the similar operational blocks in the transceiver section 314 (as shown in FIG. 3B).

The first set of operational blocks in the core section 612 may be communicatively coupled to the second set of operational blocks in the transceiver section 614. In accordance with an embodiment, FPGA 626 in the core section 612 may be communicatively coupled to the analog-to-digital convertor 648. The analog-to-digital convertor 648 may be distribution amplifiers 644a and 644b. The distribution amplifiers 644a and 644b may be further communicatively coupled with the fiber detectors 642a and 642b, and/or the fiber transmitter 620a and 620b.

In operation, the distribution amplifiers 644a and 644b may be configured to receive and buffer the fiber optic signal detected by the fiber detectors 642a and 642b. The subsequent mechanism vis-à-vis the distribution amplifiers 644a and 644b, fiber detectors 642a and 642b, and/or the fiber transmitters 646a and 646b may be same as that of distribution amplifier 546, fiber detector 544, and fiber transmitter 548 (as shown in FIG. 5B). Further, with respect to the digitized optical power data, the FPGA 626 may be operable to transmit only the optical power data to the encoder 624. In such a case, the multiplexer 628 that may correspond to the multiplexer 328 (as shown in FIG. 3B), may be removed from the core section 612. In accordance with an embodiment, the CPU 616 may be operable to receive optical fiber data, via the Ethernet block 618. The received optical fiber data may be stored in the module memory 622.

In accordance with an embodiment, the output of the encoder 624 may be transmitted to the transceiver section 614 which may further process the received signal in accordance with the embodiment disclosed for the SMPTE fiber monitor 500. In accordance with an embodiment, the operation of the lamp 608 may correspond to the operation of the lamp 508 (as shown in FIG. 5A) associated with the SMPTE fiber monitor 500.

Figure 7A:
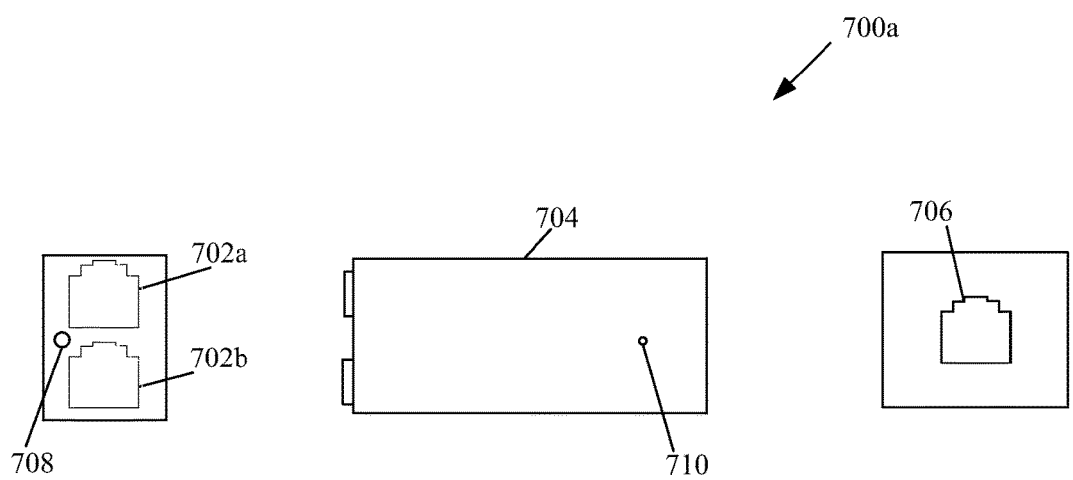
FIGS. 7A and 7B illustrate a fifth exemplary electronic module to implement the disclosed method and system for management of an electronic system, in accordance with an embodiment of the disclosure
Figure 7B:
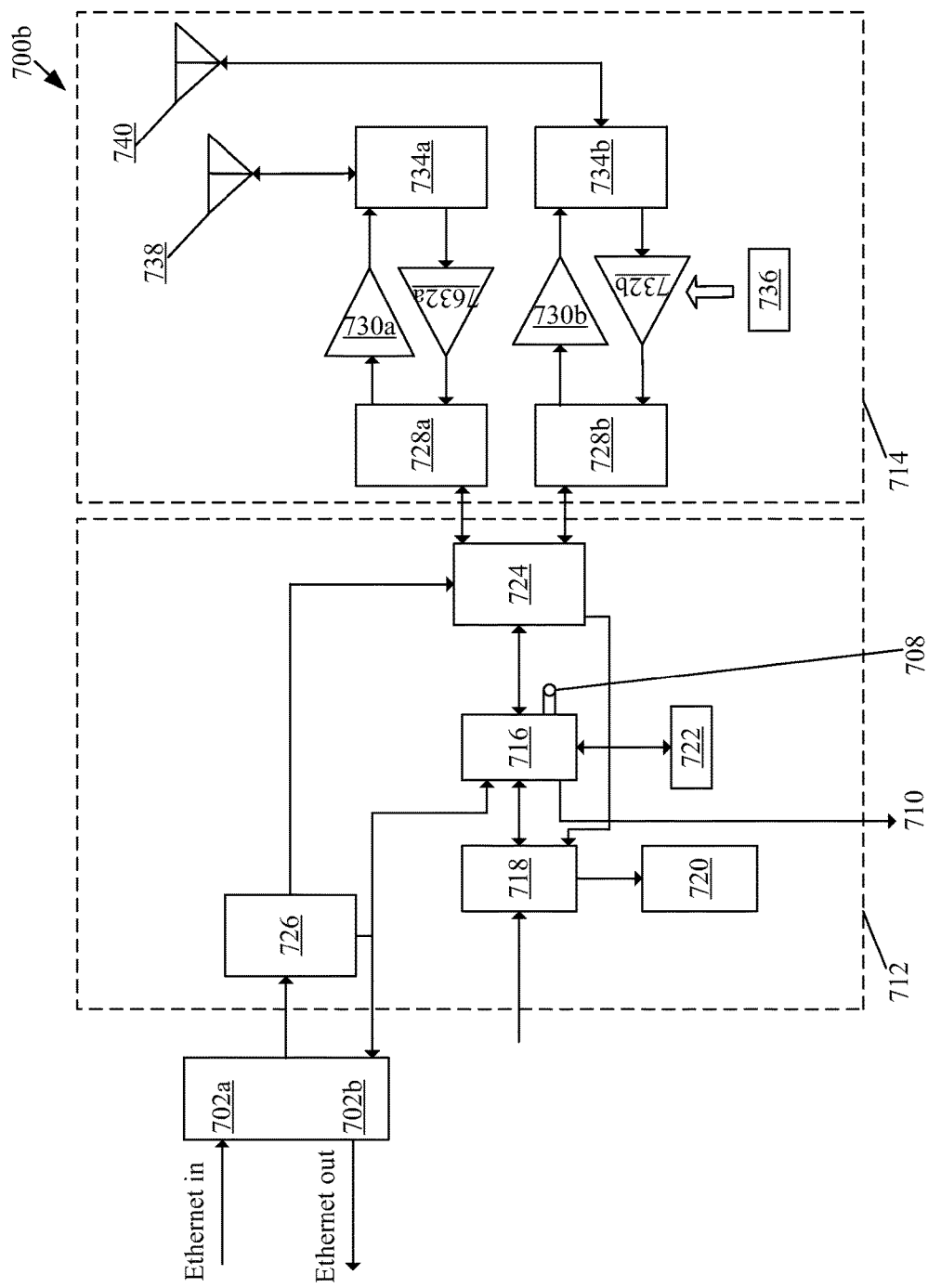

FIGS. 7A and 7B illustrate a fifth exemplary electronic module to implement the disclosed method and system for management of an electronic system, in accordance with an embodiment of the disclosure. FIGS. 7A and 7B are described in conjunction with elements of FIGS. 1 to 6B. FIG. 7A is an exemplary structural configuration diagram 700a of the fifth exemplary electronic module, such as an Ethernet monitor 700 (not shown).

With reference to FIG. 7A, the Ethernet monitor 700 may be connected to one or more electronic components of the electronic sub-system 104 configured to transmit Local Area Network (LAN) data packets based on known IEEE 802 standard, such as RJ-45 standard.

With reference to FIG. 7A, the Ethernet monitor 700 may comprise Ethernet input connector 702a, Ethernet output connector 702b, a cabinet 704, an Ethernet monitoring port 706, the lamp 708, and the hardware reset button 710. The Ethernet monitor 700 may be operable to be connected to an Ethernet network via the Ethernet input connector 702a and Ethernet output connector 702b, arranged at same end of the cabinet 704. The Ethernet input connector 702a and Ethernet output connector 702b may provide the loop through the monitored Ethernet network for measurement of one or more parameters associated with the Ethernet network. The Ethernet monitor 700 may be communicatively coupled to the electronic device 102, and/or other electronic module, via the Ethernet monitoring port 706. The Ethernet monitoring port 706 may be operable to provide a path and/or a control for the Ethernet measurement data to be sent as wired information.

The cabinet 704 may comprise suitable logic, circuitry, interfaces, and/or code that may be operable to monitor the Ethernet data. The Ethernet monitoring port 706 may be provided to monitor the Ethernet data transmitted through the Ethernet input connector 702a and Ethernet output connector 702b. The lamp 708 may be a Light Emitting Diode (LED) arranged adjacent to Ethernet input connector 702a and Ethernet output connector 702b. The lamp 708 may be configured to provide the status of the Ethernet monitor 700. The lamp 708 may correspond to the lamp 308 used for the digital video monitor 300 (as shown in FIG. 3A) which may be, to track and notify the status of the Ethernet monitor 700 based on emission of light. Further, the operation of the lamp 708 may correspond to the operation of the lamp 308. Notwithstanding, the disclosure may not be so limited, in accordance with an embodiment, the arrangement of the elements of the Ethernet monitor 700 may be different from the disclosed arrangement, without limiting the scope of the disclosure.

In accordance with an embodiment, the Ethernet monitor 700 may be operable to capture LAN data packets, determine operational, and/or in-operational ports in a monitored Ethernet network, determine data speed that corresponds to the monitored Ethernet network, determine collisions of data packets, determine occurrences of packet re-transmissions, and/or other measurements pertaining to the monitored Ethernet network. The hardware reset button 710 may be provided on the cabinet 704 to reset the configuration of the Ethernet monitor 700. Notwithstanding, the disclosure may not be so limited, and the Ethernet monitor 700 may be communicatively coupled to other electronic modules, and/or network elements, via the Ethernet monitoring port 706 and/or other wireless technologies known in the art, without limiting the scope of the disclosure.

FIG. 7B is a block diagram that illustrates the fifth exemplary electronic module operable to be connected to the one or more electronic components of the electronic sub-system 104, in accordance with an embodiment of the disclosure. FIG. 7B is explained in conjunction with elements from FIGS. 1 to 7A. With reference to FIG. 7B, there is shown a block diagram 700b of the Ethernet monitor 700 (as described in FIG. 7A). The Ethernet monitor 700 may comprise a core section 712 and a transceiver section 714.

The core section 712 may comprise a first set of operational blocks, such as a central processing unit (CPU) 716, an Ethernet block 718, a power supply 720, a module memory 722, an encoder 724, and/or field programmable gate array (FPGA) 726. In accordance with an embodiment, the FPGA 726 in the core section 712 may be communicatively coupled to Ethernet input connector 702a, and/or the Ethernet output connector 702b. The CPU 716 may further comprise the lamp 708 (as shown in FIG. 7A), and/or a hardware reset button 710 (as shown in FIG. 7A). The transceiver section 714 may comprise a second set of operational blocks, such as digital front-end blocks 728a and 728b, transmission amplifiers 730a and 730b, reception de-amplifiers 732a and 732b, duplexers 734a and 734b, and/or a dip switch 736, one or more antennae, such as a Wi-Fi antenna 738, and/or a Bluetooth antenna 740. The functionality of each of the first set of operational blocks in the core section 712 may correspond to the functionality of the similar operational blocks in the core section 312 (as shown in FIG. 3B). Further, the functionality of each of the second set of operational blocks in the transceiver section 714 may correspond to the functionality of the similar operational blocks in the transceiver section 314 (as shown in FIG. 3B). The first set of operational blocks in the core section 712 may be communicatively coupled to the second set of operational blocks in the transceiver section 714.

In operation, the FPGA 726 in the core section 712 may be operable to receive Ethernet data from the Ethernet input connector 702a. The FPGA 726 may be operable to extract the Ethernet measurement data from the received Ethernet data. The FPGA 726 may be further operable to transmit the Ethernet measurement data to the encoder 724. In accordance with an embodiment, the output of the encoder 724 may be transmitted to the transceiver section 714 which may further process the received Ethernet measurement data in accordance with the embodiment disclosed for the digital video monitor 300 (as shown in FIG. 3B). In accordance with an embodiment, the CPU 716 may be operable to provide the status of the Ethernet monitor 700 based on the lamp 708. In accordance with an embodiment, the CPU 716 may be further operable to receive Ethernet measurement data, via the Ethernet block 718. The CPU 716 may be further operable to store the received Ethernet measurement data in the module memory 722.

Figure 8A:
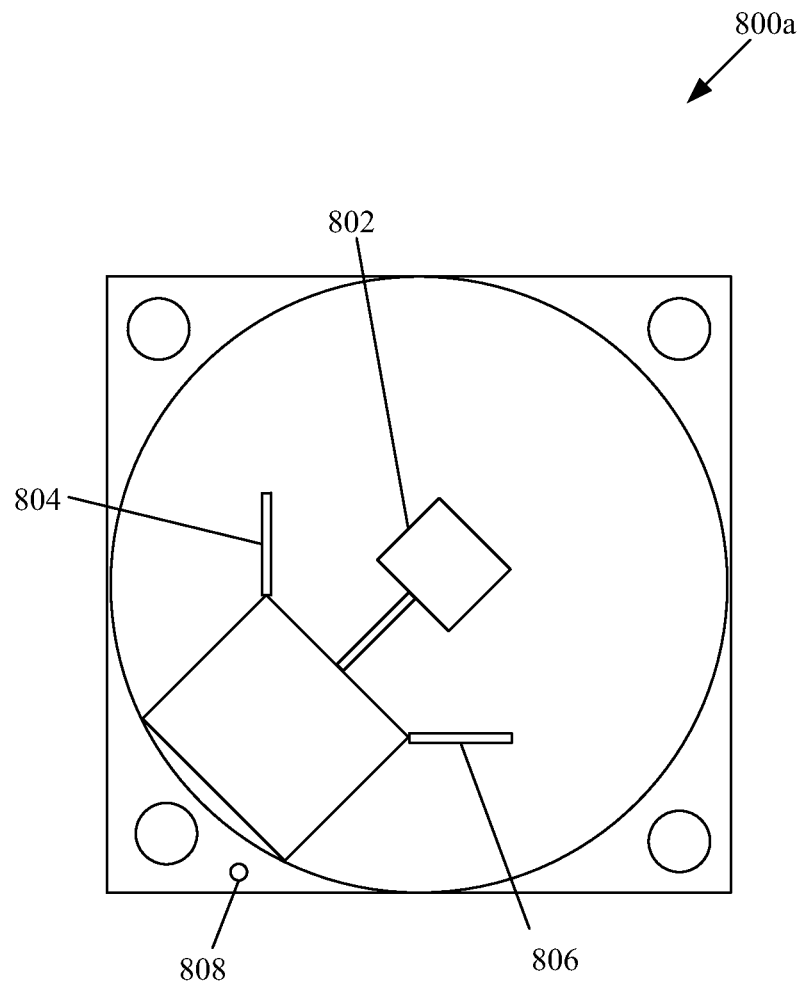
FIGS. 8A and 8B illustrate a sixth exemplary electronic module to implement the disclosed method and system for management of an electronic system, in accordance with an embodiment of the disclosure
Figure 8B:
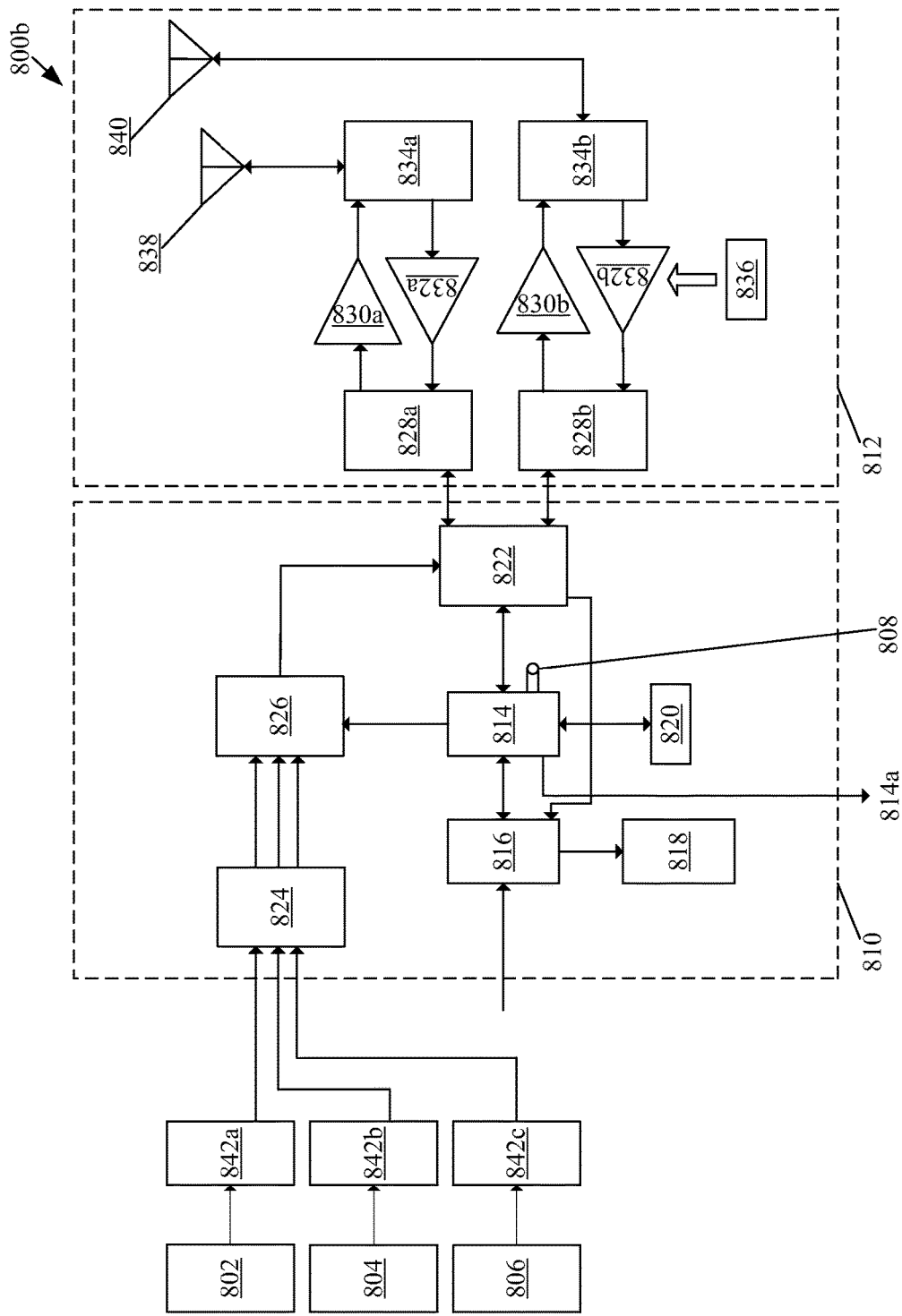

FIGS. 8A and 8B illustrate a sixth exemplary electronic module to implement the disclosed method and system for management of an electronic system, in accordance with an embodiment of the disclosure. FIGS. 8A and 8B are described in conjunction with elements of FIGS. 1 to 7B. FIG. 8A is an exemplary structural configuration diagram 800a of the sixth exemplary electronic module, such as an environment monitor 800 (not shown).

With reference to FIG. 8A, the environment monitor 800 may be connected to one or more electronic components of the electronic sub-system 104. The electronic module may be operable to monitor the environment conditions in the proximity of one or more electronic components of the electronic sub-system 104. The electronic module, such as the environment monitor 800, may be associated with a form factor. In accordance with an embodiment, the form factor may be similar to a form factor of an electric pan fan that may be known to a person skilled in the art. The electronic module may be operable to be mounted on the electric pan fan associated with the one or more electronic components of the electronic sub-system 104.

With reference to FIG. 8A, the environment monitor 800 may comprise one or more sensors, such as a wind velocity sensor 802, a temperature sensor 804, and/or a humidity sensor 806. The environment monitor 800 may further comprise a lamp 808 which may be a Light Emitting Diode (LED).

In accordance with an embodiment, the sensors associated with the environment monitor 800 may be operable to measure the parameters such as the wind speed, the air temperature, and/or the air humidity level in the surrounding environment of an associated electronic component of the electronic sub-system. Based on the measured parameters, the environment monitor 800 may be operable to notify the electronic device 102 when the parameter value becomes greater than a specified threshold. In accordance with an embodiment, the lamp 808 may be configured to provide the status of the environment monitor 800 based on emission of colored light from among the set of three colors, such as a red color, a yellow color, and/or a green color.

FIG. 8B is a block diagram that illustrates the sixth exemplary electronic module operable to be connected to the one or more electronic components of the electronic sub-system 104, in accordance with an embodiment of the disclosure. FIG. 8B is explained in conjunction with elements from FIGS. 1 to 8A. With reference to FIG. 8B, there is shown a block diagram 800b of the environment monitor 800 (as described in FIG. 8A). The environment monitor 800 may comprise a core section 810 and a transceiver section 812.

The core section 810 may comprise a first set of operational blocks, such as a central processing unit (CPU) 814, an Ethernet block 816, a power supply 818, a module memory 820, an encoder 822, field programmable gate array (FPGA) 824, and/or a multiplexer 826. The CPU 814 may comprise the lamp 808 (as shown in FIG. 8A), and/or the hardware reset button 814a to reset the configuration of the environment monitor 800. The transceiver section 812 may comprise a second set of operational blocks, such as digital front-end blocks 828a and 828b, transmission amplifiers 830a and 830b, reception de-amplifiers 832a and 832b, duplexers 834a and 834b, a dip switch 836, one or more antennae, such as a Wi-Fi antenna 838, and/or a Bluetooth antenna 840. The environment monitor 800 may further comprise one or more analog-to-digital convertors 842a, 842b, and/or 842c. The functionality of each of the first set of operational blocks in the core section 810 may correspond to the functionality of the similar operational blocks in the core section 312 (as shown in FIG. 3B). Further, the functionality of each of the second set of operational blocks in the transceiver section 812 may correspond to the functionality of the similar operational blocks in the transceiver section 314 (as shown in FIG. 3B).

The first set of operational blocks in the core section 810 may be communicatively coupled to the second set of operational blocks in the transceiver section 812. In accordance with an embodiment, FPGA 824 in the core section 810 may be communicatively coupled with one or more analog-to-digital convertors 842a, 842b, and/or 842c. The one or more analog-to-digital convertors 842a, 842b, and/or 842c may be further communicatively coupled to the wind velocity sensor 802, the temperature sensor 804, and the humidity sensor 806, respectively. In accordance with an embodiment, a "5 volt" power may be provided to each of the sensors by the power supply 818.

In operation, the measured parameters from each of the sensors may be converted to a digital signal by the analog-to-digital convertors 842a, 842b, and/or 842c. The digitally converted signal that correspond to the environment conditions may be transmitted to the FPGA 824. The FPGA 824 may be operable to extract the data that corresponds to the wind speed "W", the air temperature "T", and/or the air humidity level "H". The wind speed "W", the air temperature "T", and/or the air humidity level "H", may correspond to the surrounding environment of an associated component of the electronic sub-system 104. In accordance with an embodiment, the wind speed "W", the air temperature "T", and/or the air humidity level "H" may be transmitted as parallel data to the multiplexer 826. The multiplexer 826 may be operable to buffer the received data. The multiplexer 826 may be further operable to align the received data for further transmission to the transceiver section 812, via the encoder 822. In accordance with an embodiment, the CPU 814 may be operable to provide a "WTH Switch" signal to the multiplexer 826 for transmission of the wind speed "W", the air temperature "T", and/or the air humidity level "H". In accordance with an embodiment, the CPU 814 may be further operable to receive data, via the Ethernet block 816. The CPU 814 may be further operable to store the received data in the module memory 820.

In accordance with an embodiment, the output of the encoder 822 may be transmitted to the transceiver section 812, which may further process the received signal in accordance with the embodiment disclosed for the digital video monitor 300 (as shown in FIG. 3B). In accordance with an embodiment, based on the measured environment data, the CPU 814 may be operable to provide the status of the environment conditions based on the color of light associated with the lamp 808.

Figure 9A:
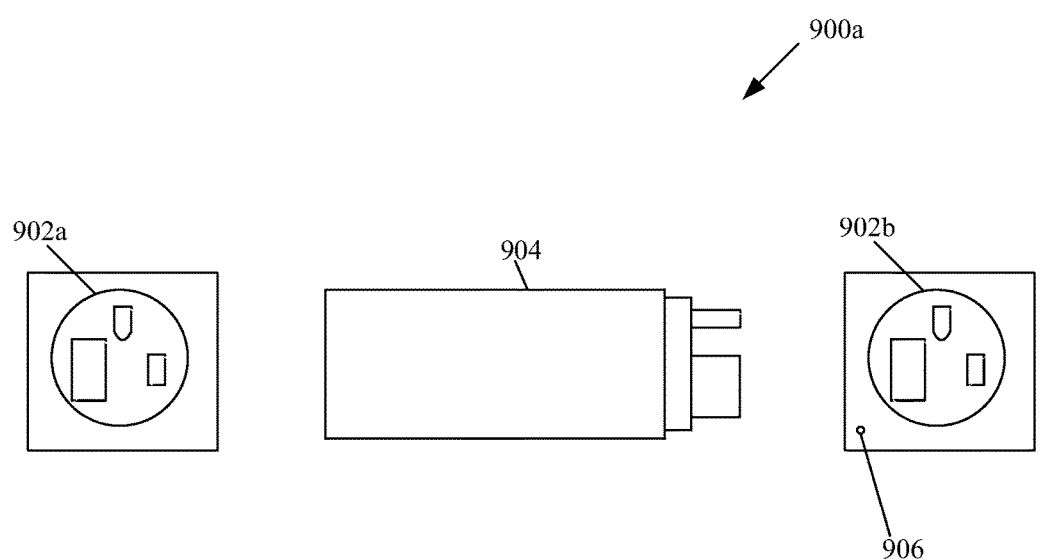
FIGS. 9A and 9B illustrate a seventh exemplary electronic module to implement the disclosed method and system for management of an electronic system, in accordance with an embodiment of the disclosure.
Figure 9B:
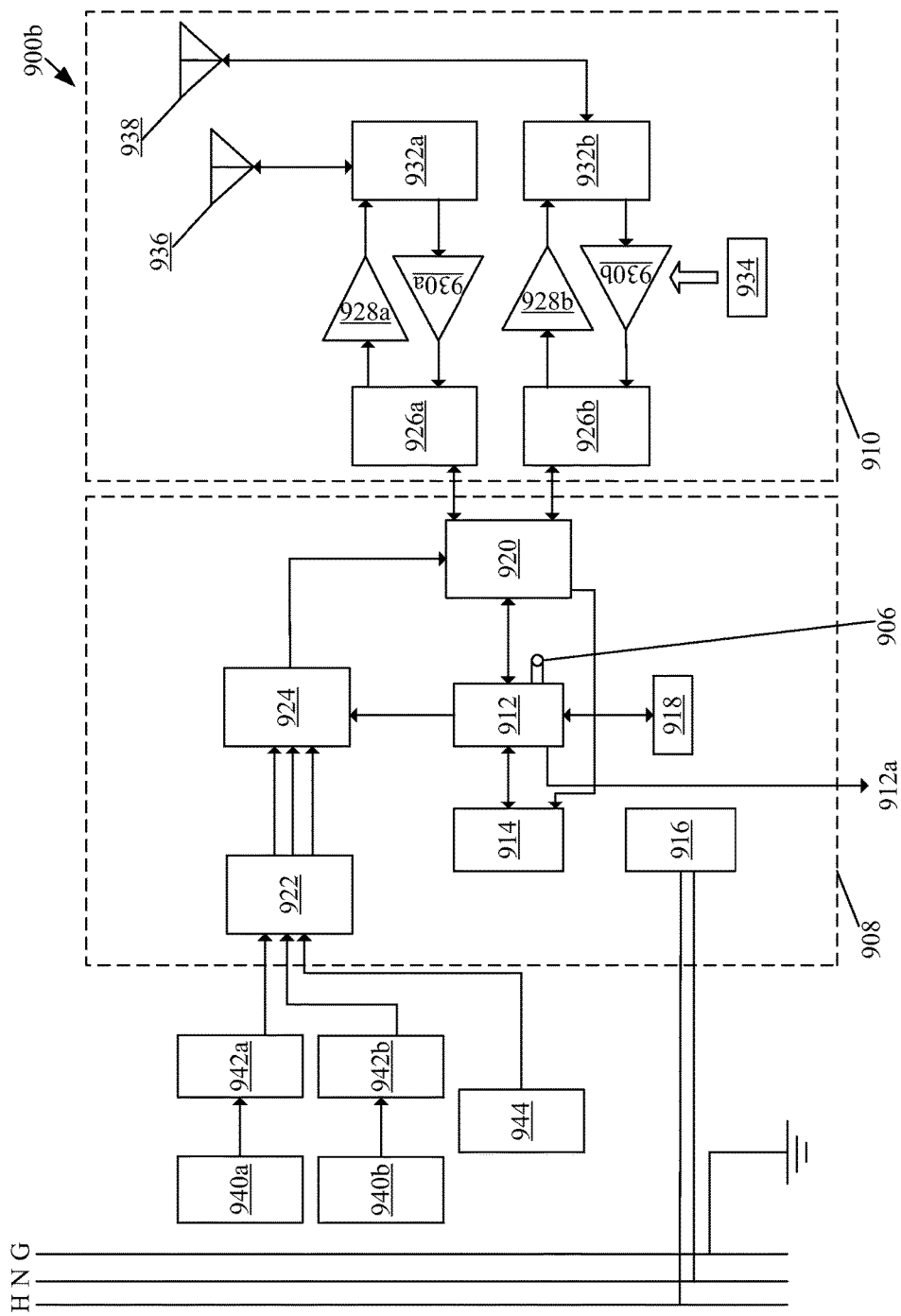

FIGS. 9A and 9B illustrate a seventh exemplary electronic module to implement the disclosed method and system for management of an electronic system, in accordance with an embodiment of the disclosure. FIGS. 9A and 9B are described in conjunction with elements of FIGS. 1 to 8B. FIG. 9A is an exemplary structural configuration diagram 900a of the seventh exemplary electronic module, such as a power monitor 900 (not shown).

With reference to FIG. 9A, the power monitor 900 may be connected to one or more electronic components of the electronic sub-system 104. In accordance with an embodiment, the electronic module may be connected in series with a power connector. The electronic module may be operable to monitor a voltage and/or a current that corresponds to one or more electronic components of the electronic sub-system 104. In accordance with an embodiment, when the power system associated with one or more electronic components of the electronic sub-system is a "3-phase" system, an "A" leg module may be designated as a master leg. The measurements that correspond to phase of the power system may be based on a differential current draw on each leg.

With reference to FIG. 9A, the power monitor 900 may comprise connectors 902a and 902b, a cabinet 904, and a lamp 906. The power monitor 900 may be operable to be connected to the one or more electronic components of the electronic sub-system 104 via the connectors 902a and 902b arranged at the opposite ends of the cabinet 904.

The connector 902a may correspond to an input port. The connector 902b may correspond to an output port. The cabinet 904 may comprise suitable logic, circuitry, interfaces, and/or code that may be operable to monitor the optical fiber data. The lamp 906 may be a Light Emitting Diode (LED) arranged adjacent to the connector 902b. The lamp 906 may be configured to provide the status of the power monitor 900. The lamp 906 may correspond to the lamp 308 used for the digital video monitor 300 (as shown in FIG. 3A) which may be, to track and notify the status of the power monitor 900 based on emission of light. Further, the operation of the lamp 906 may correspond to the operation of the lamp 308. Notwithstanding, the disclosure may not be so limited, in accordance with an embodiment, the arrangement of the elements of the power monitor 900 may be different from the disclosed arrangement, without limiting the scope of the disclosure.

FIG. 9B is a block diagram that illustrates the seventh exemplary electronic module operable to be connected to the one or more electronic components of the electronic sub-system 104, in accordance with an embodiment of the disclosure. FIG. 9B is explained in conjunction with elements from FIGS. 1 to 9A. With reference to FIG. 9B, there is shown a block diagram 900b. The block diagram 900b includes the power monitor 900 (as described in FIG. 9A). The power monitor 900 may comprise a core section 908 and a transceiver section 910.

The core section 908 may comprise a first set of operational blocks, such as a central processing unit (CPU) 912, an Ethernet block 914, a power supply 916, a module memory 918, an encoder 920, field programmable gate array (FPGA) 922, and/or a multiplexer 924. The CPU 912 may the lamp 906 (as shown in FIG. 9A), and/or the hardware reset button 912a operable to reset the configuration of the power monitor 900. The transceiver section 910 may comprise a second set of operational blocks, such as digital front-end blocks 926a and 926b, transmission amplifiers 928a and 928b, reception de-amplifiers 930a and 930b, duplexers 932a and 932b, a dip switch 934, one or more antennae, such as a Wi-Fi antenna 936, and/or a Bluetooth antenna 938. The power monitor 900 may further comprise a current sensor 940a, a voltage sensor 940b, one or more analog-to-digital convertor 942a, 942b, and/or the temperature sensor 944. The functionality of each of the first set of operational blocks in the core section 908 may correspond to the functionality of the similar operational blocks in the core section 312 (as shown in FIG. 3B). Further, the functionality of each of the second set of operational blocks in the transceiver section 910 may correspond to the functionality of the similar operational blocks in the transceiver section 314 (as shown in FIG. 3B).

The first set of operational blocks in the core section 908 may be communicatively coupled to the second set of operational blocks in the transceiver section 910. In accordance with an embodiment, the analog-to-digital convertor 942a may be communicatively coupled to a current sensor 940a. The current sensor 940a may be operable to detect the current that corresponds to the power system associated with the monitored component of the electronic sub-system 104. The analog-to-digital convertor 942b may be communicatively coupled to a voltage sensor 940b. The voltage sensor 940b may be operable to detect the voltage that corresponds to the power system associated with the monitored component of the electronic sub-system 104. In accordance with an embodiment, the temperature sensor 944 may be communicatively coupled to the FPGA 326. The temperature sensor 944 may be operable to detect the environment temperature that corresponds to the monitored component of the electronic sub-system 104. In accordance with an embodiment, the power system may comprise the power lines High "H", neutral "N", and ground "G". In accordance with an embodiment, the power supply 916 in the power monitor 900 may be operable to receive the power from the power system.

In operation, the current sensor 940a, and the voltage sensor 940b may be operable to detect the current and voltage associated with the power system, respectively. The analog-to-digital convertors 942a and 942b may be operable to digitally convert the detected current and voltage, respectively. The digitally converted current and voltage may be transmitted to the FPGA 922. The FPGA 922 may be operable to extract the current data "C", the voltage data "V", and/or the temperature data "T", from the received signals.

In accordance with an embodiment, the current data "C", the voltage data "V", and/or the temperature data "T" may be transmitted as parallel data to the multiplexer 924. The multiplexer 924 may be operable to buffer the received data. The multiplexer 924 may be further operable to align the received data for further transmission to the transceiver section 910, via the encoder 920. In accordance with an embodiment, the CPU 912 may be operable to provide a "VCT Switch" signal to the multiplexer 924 for transmission of the current data "C", the voltage data "V", and/or the temperature data "T". In accordance with an embodiment, the CPU 912 may be further operable to receive the current and voltage data associated with the power system, via the Ethernet block 914. The CPU 912 may be further operable to store the received current and voltage data in the module memory 918.

In accordance with an embodiment, the output of the encoder 920 may be transmitted to the transceiver section 910. In the transceiver section 910, the received current data "C", the voltage data "V", and/or the temperature data "T" may be amplified by the transmission amplifiers 928*a* and 928*b*. In accordance with an embodiment, the amplified current data "C", the amplified voltage data "V", and/or the amplified temperature data "T", may be transmitted based on the Wi-Fi, and/or the Bluetooth network, via the Wi-Fi antenna 936, and/or the Bluetooth antenna 938. The amplified current data "C", the amplified voltage data "V", and/or the amplified temperature data "T", may be transmitted based on the Ethernet block 914. In accordance with an embodiment, the CPU 912 may be operable to provide the status of the power monitor 900 based on the lamp 906.

Figure 10A:
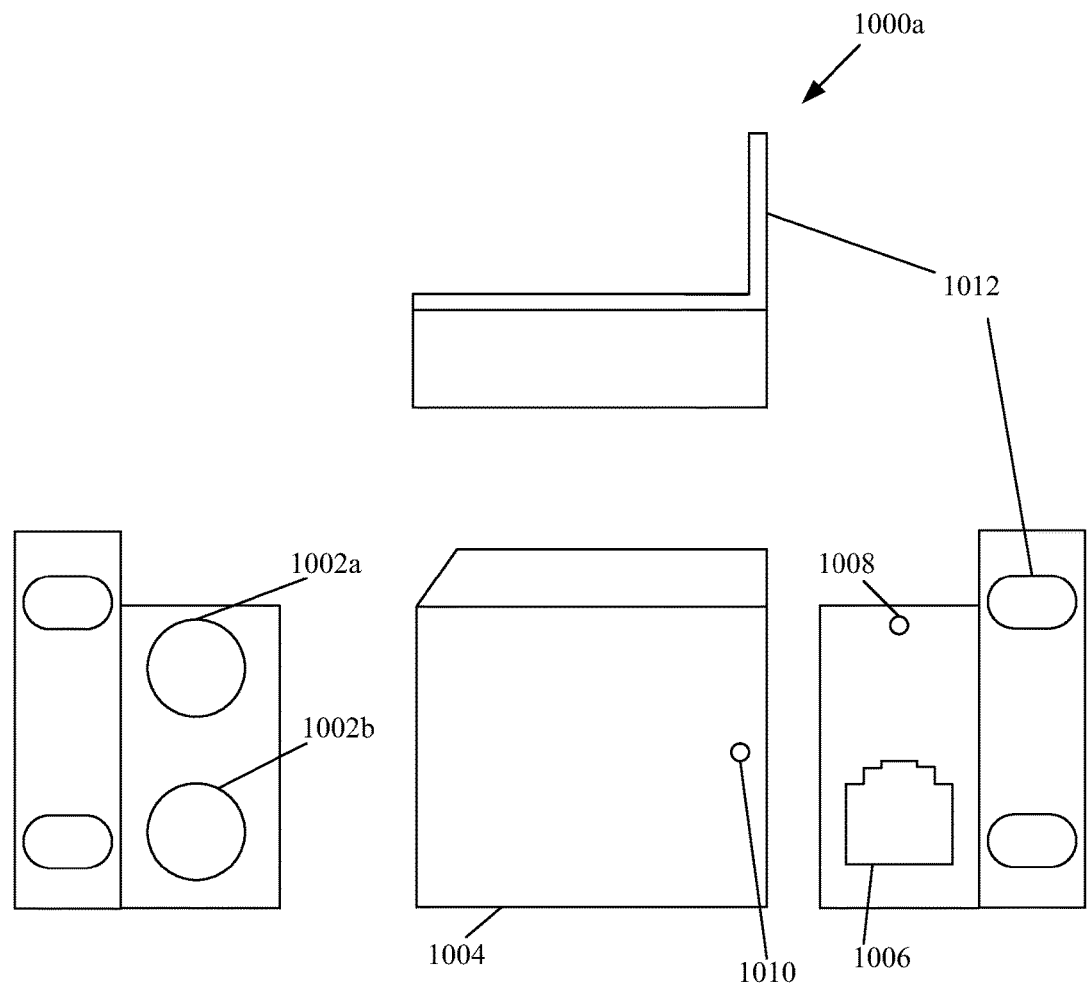
FIGS. 10A and 10B illustrate an eighth exemplary electronic module to implement the disclosed method and system for management of an electronic system, in accordance with an embodiment of the disclosure.
Figure 10B:
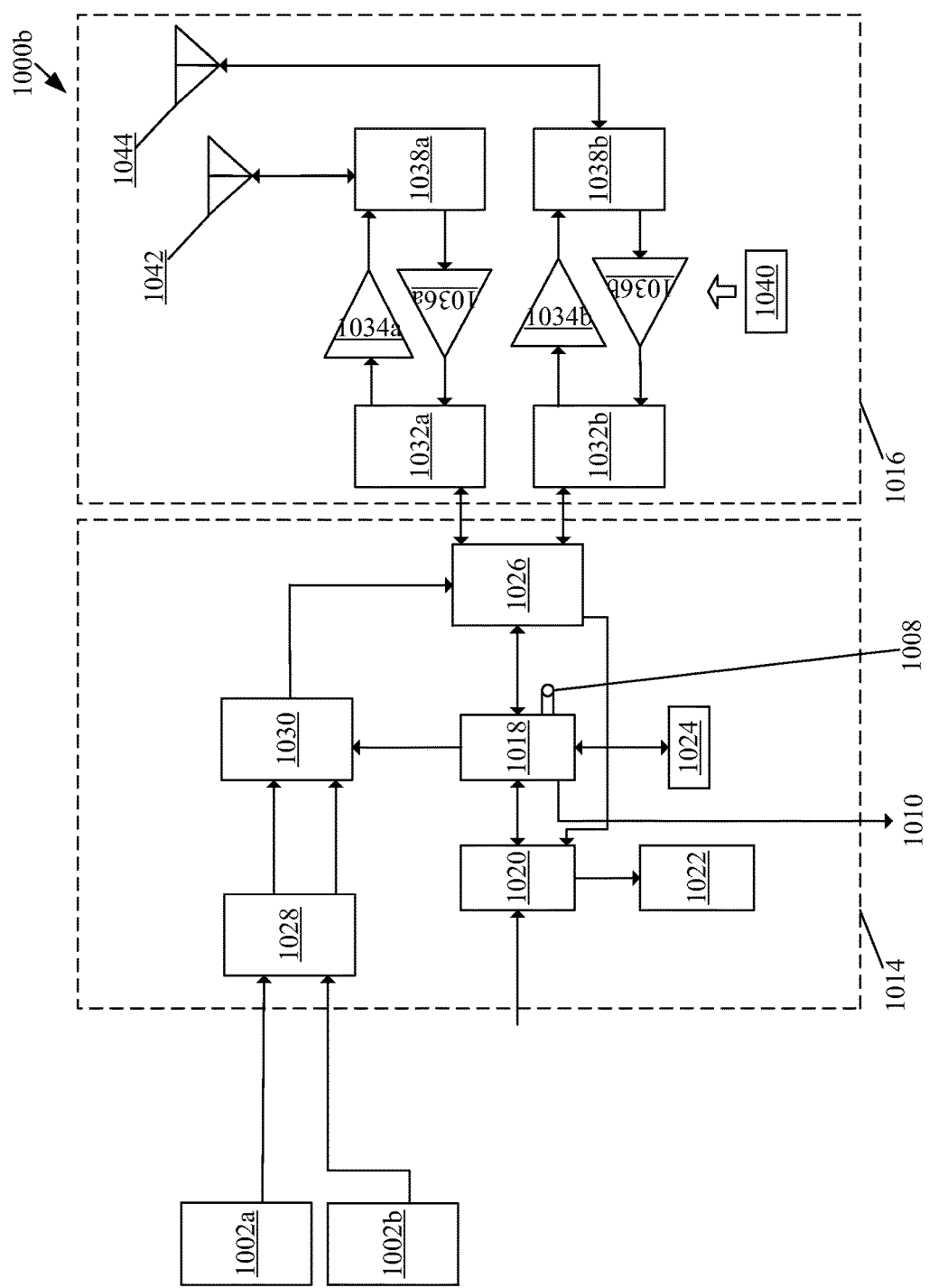

FIGS. 10A and 10B illustrate an eighth exemplary electronic module to implement the disclosed method and system for management of an electronic system, in accordance with an embodiment of the disclosure. FIGS. 10A and 10B are described in conjunction with elements of FIGS. 1 to 9B. FIG. 10A is an exemplary structural configuration diagram 1000*a* of the eighth second exemplary electronic module, such as a proximity module 1000.

With reference to FIG. 10A, the proximity module 1000 may be connected to one or more electronic components of the electronic sub-system 104. The proximity module 1000 may be operable to detect and monitor the presence of an electronic sub-system installed in the proximity of a component of the electronic sub-system 104 that may be associated with the proximity module 1000.

With reference to FIG. 10A, the proximity module 1000 may comprise a proximity sensor 1002*a*, a barcode scanner 1002*b*, a cabinet 1004, an Ethernet port 1006, a lamp 1008, a hardware reset button 1010 and/or a rack mount bracket 1012. In accordance with an embodiment, the proximity sensor 1002*a*, and/or the barcode scanner 1002*b* may be arranged on a front portion of the cabinet 1004. The proximity module 1000 may be communicatively coupled to the electronic device 102, via the Ethernet port 1006, arranged at the back portion of the cabinet 1004. The proximity module 1000 may comprise the lamp 1008 present on or adjacent to the Ethernet port 1006. The proximity module 1000 may further comprise a hardware reset button 1010 present on the side of the cabinet 1004. Notwithstanding, the disclosure may not be so limited, in accordance with an embodiment, the arrangement of the elements of the proximity module 1000 may be different from the disclosed arrangement, without limiting the scope of the disclosure.

In accordance with an embodiment, the proximity module may be operable to be located in the electronic sub-system 104 based on the rack mount bracket 1012. In accordance with an embodiment, the proximity sensor 1002*a* may be operable to detect the presence of a component of the electronic sub-system 104 based on a radio frequency identification (RFID). The barcode scanner 1002*b* may be operable to detect the presence of a component of the electronic sub-system 104 based on a scan of a barcode identifier, and/or a quick response (QR) code label associated with the component of the electronic sub-system 104. The Ethernet port 1006 may be operable to transmit the data comprising the detection of a component of the electronic sub-system 104. In accordance with an embodiment, the proximity module 1000 may be operable to transmit the information that corresponds to the detected component to the electronic device 102. The proximity module 1000 may be further operable to track and notify the status of the component of the electronic sub-system 104 associated with the proximity module 1000. The notification may be based on a trigger transmitted to the electronic device 102 to generate an alarm. In accordance with an embodiment, the notification may correspond to the color of the light emitted by the lamp 308 (as shown in FIG. 3A). In accordance with an embodiment, the tracking of the component of the electronic sub-system 104 may be based on an inventory log file stored in the data warehouse 106.

FIG. 10B is a block diagram that illustrates the eighth exemplary electronic module operable to be connected to the one or more electronic components of the electronic sub-system 104, in accordance with an embodiment of the disclosure. FIG. 10B is explained in conjunction with elements from FIGS. 1 to 10A. With reference to FIG. 10B, there is shown a block diagram 1000*b* of the proximity module 1000 (as described in FIG. 10A). The proximity module 1000 may comprise a core section 1014 and a transceiver section 1016.

The core section 1014 may comprise a first set of operational blocks, such as a central processing unit (CPU) 1018, an Ethernet block 1020, a power supply 1022, a module memory 1024, an encoder 1026, a field programmable gate array (FPGA) 1028, and/or a multiplexer 1030. The CPU 1018 may further comprise the lamp 1008 (as shown in FIG. 10A), and/or the hardware reset button 1010 (as shown in FIG. 10A). The transceiver section 1016 may comprise a second set of operational blocks, such as digital front-end blocks 1032*a* and 1032*b*, transmission amplifiers 1034*a* and 1034*b*, reception de-amplifiers 1036*a* and 1036*b*, duplexers 1038*a* and 1038*b*, a dip switch 1040, one or more antennae, such as a Wi-Fi antenna 1042, and/or a Bluetooth antenna 1044. The functionality of each of the first set of operational blocks in the core section 1014 may correspond to the functionality of the similar operational blocks in the core section 312 (as shown in FIG. 3B). Further, the functionality of each of the second set of operational blocks in the transceiver section 1016 may correspond to the functionality of the similar operational blocks in the transceiver section 314 (as shown in FIG. 3B).

The first set of operational blocks in the core section 1014 may be communicatively coupled to the second set of operational blocks in the transceiver section 1016. In accordance with an embodiment, the FPGA 1028 in the core section 1014 may be communicatively coupled to the proximity sensor 1002*a*, and the barcode scanner 1002*b*.

In operation, the proximity sensor 1002*a* may be operable to transmit a data, and/or an identity of a detected component of the electronic sub-system 104 based on a radio frequency identification (RFID), to the FPGA 1028. The barcode scanner 1002*b* may be operable to transmit a data of a detected component of the electronic sub-system 104 based on a barcode, and/or a QR code label, to the FPGA 1028. The FPGA 1028 may be operable to generate a timing clock to synchronize the blocks communicatively coupled to the FPGA 1028. The FPGA 1028 may be further operable to extract the scanning data "S", and/or the proximity sensor data "P", from the data received from the sensors.

In accordance with an embodiment, the scanning data "S", and/or the proximity sensor data "P", may be transmitted as parallel data to the multiplexer 1030. The multiplexer 1030 may be operable to buffer the received data. The multiplexer 1030 may be further operable to align the received data for further transmission to the transceiver section 1016, via the encoder 1026. In accordance with an embodiment, the CPU 1018 may be operable to provide an "SP Switch" signal to the multiplexer 1030 for transmission of the scanning data "S", and/or the proximity sensor data "P". In accordance with an embodiment, the CPU 1018 may be further operable to receive data that corresponds to the detected components, via the Ethernet block 1020. The CPU 1018 may be further operable to store the received data that corresponds to the detected components in the module memory 1024. In accordance with an embodiment, the CPU 1018 may be further operable to provide the status of the proximity module 1000 based on the lamp 1008.

In accordance with an embodiment, the output of the encoder 1026 may be transmitted to the transceiver section 1016. In the transceiver section 1016, the further processing of the received data, may be performed in a method similar to the processing of data by the transceiver section 314 (as shown in FIG. 3B).

Figure 11A:
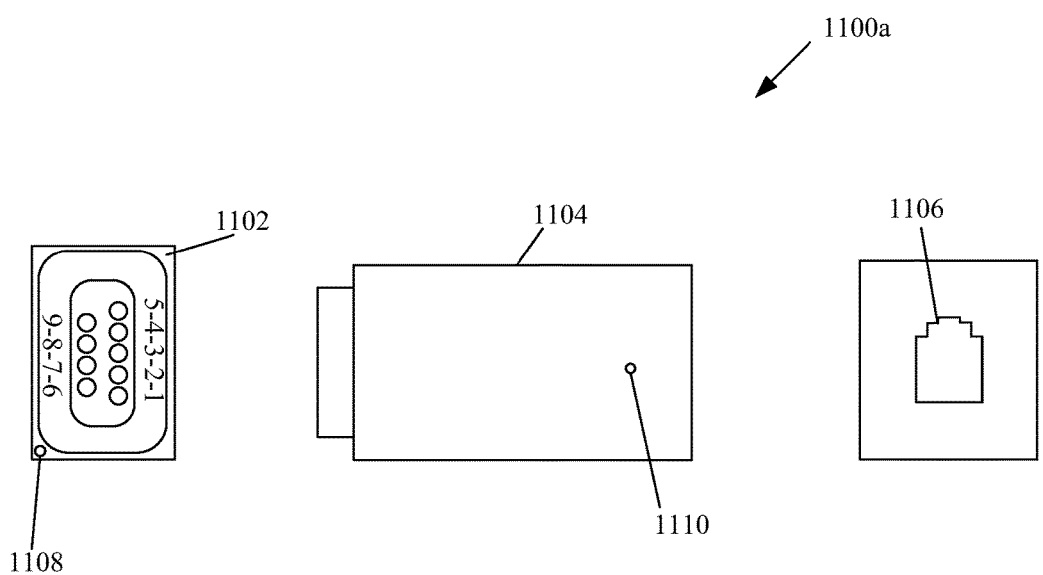
FIGS. 11A and 11B illustrate a ninth exemplary electronic module to implement the disclosed method and system for management of an electronic system, in accordance with an embodiment of the disclosure.
Figure 11B:
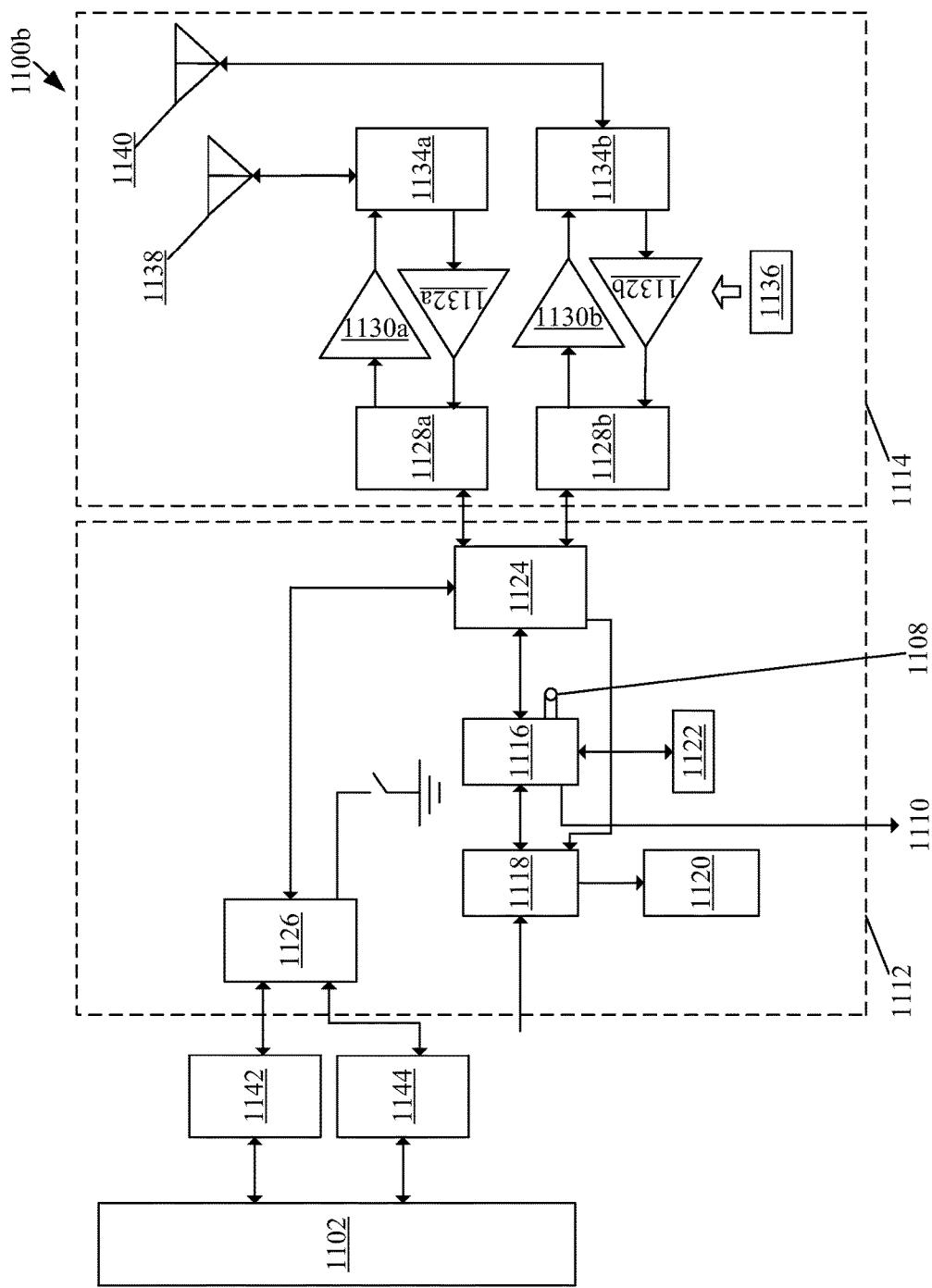

FIGS. 11A and 11B illustrate a ninth exemplary electronic module to implement the disclosed method and system for management of an electronic system, in accordance with an embodiment of the disclosure. FIGS. 11A and 11B are described in conjunction with elements of FIGS. 1 to 10B. FIG. 11A is an exemplary structural configuration diagram 1100a of the ninth second exemplary electronic module, such as a control module 1100 (not shown).

With reference to FIG. 11A, the control module 1100 may be connected to one or more electronic components of the electronic sub-system 104. The control module 1100 may be operable to receive a set of steps to be performed by the control module 1100, from a user present at a remote location. The control module 1100 may be operable to control other devices and/or modules via an interface, such as RS-422 interface. The control module may facilitate an implementation of rules-based control logic on data received from one or more of the plurality of electronic modules 114. For example, when an electronic module "X" measures data "Y", a command "Z" may be issued.

With reference to FIG. 11A, the control module 1100 may comprise a connector 1102, a cabinet 1104, an Ethernet port 1106, a lamp 1108, a hardware reset button 1110. In accordance with an embodiment, the control module 1100 may be communicatively coupled to the electronic device 102, via the Ethernet port 1106, arranged at the back portion of the cabinet 1104. The control module 1100 may comprise the lamp 1108, which may be a Light Emitting Diode (LED) present on or adjacent to the Ethernet port 1106. The lamp 1108 may be configured to provide the status of the control module 1100. The lamp 1108 may correspond to the lamp 308 used for the digital video monitor 300 (as shown in FIG. 3A) which may be, to track and notify the status of the control module 1100 based on emission of light. Further, the operation of the lamp 1108 may correspond to the operation of the lamp 308. The control module 1100 may further comprise a hardware reset button 1110 present adjacent to the connector 1102. Notwithstanding, the disclosure may not be so limited, in accordance with an embodiment, the arrangement of the elements of the control module 1100 may be different from the disclosed arrangement, without limiting the scope of the disclosure.

In accordance with an embodiment, the control module 1100 may be operable to receive a set of steps to be performed by the control module 1100, from a user present at a remote location, via the connector 1102. In accordance with an embodiment, the connector 1102 may be a nine pin D-subminiature (D-Sub) connector. The Ethernet port 1106 may be provided to transmit the data that corresponds to a component of the electronic sub-system 104 monitored by the control module 1100. The Ethernet port 1106 may be further operable to provide a path and/or a set of steps that corresponds to a component of the electronic sub-system 104 monitored by the control module 1100, to be sent as wired information. In accordance with an embodiment, the set of steps may comprise a command to identify a target control module based on a mesh network connectivity between one or more control modules present in the electronic sub-system 104. The set of steps may further comprise a command to activate the identified control module, and/or a component of the electronic sub-system 104. The set of steps may further comprise a command to play, record, rewind, and/or fast forward a data associated with a component of the electronic sub-system 104. The control module 1100 may be further operable to notify the status of the control module 1100 based on color of colored light emitted by the lamp 1108.

FIG. 11B is a block diagram that illustrates the ninth exemplary electronic module operable to be connected to the one or more electronic components of the electronic sub-system 104, in accordance with an embodiment of the disclosure. FIG. 11B is explained in conjunction with elements from FIGS. 1 to 11A. With reference to FIG. 11B, there is shown a block diagram 1100b of the control module 1100 (as described in FIG. 11A). The control module 1100 may comprise a core section 1112 and a transceiver section 1114.

The core section 1112 may comprise a first set of operational blocks, such as a central processing unit (CPU) 1116, an Ethernet block 1118, a power supply 1120, a module memory 1122, an encoder 1124, and/or a field programmable gate array (FPGA) 1126. The CPU 1116 may comprise a lamp, and/or a reset button which correspond to the operation of the lamp 1108 and the hardware reset button 1110 (as shown in FIG. 11A). The transceiver section 1114 may comprise a second set of operational blocks, such as digital front-end blocks 1128a and 1128b, transmission amplifiers 1130a and 1130b, de-amplifiers 1132a and 1132b, duplexers 1134a and 1134b, a dip switch 1136, one or more antennae, such as a Wi-Fi antenna 1138, and/or a Bluetooth antenna 1140. The functionality of each of the first set of operational blocks in the core section 1112 may correspond to the functionality of the similar operational blocks in the core section 312 (as shown in FIG. 3B). Further, the functionality of each of the second set of operational blocks in the transceiver section 1114 may correspond to the functionality of the similar operational blocks in the transceiver section 314 (as shown in FIG. 3B).

The first set of operational blocks in the core section 1112 may be communicatively coupled to the second set of operational blocks in the transceiver section 1114. In accordance with an embodiment, FPGA 1126 in the core section 1112 may be communicatively coupled to the connector 1002.

In operation, the control module 1100 may be operable to receive a set of steps to be performed from a remote user, via the connector 1102. The received set of steps may be transmitted to the FPGA via one or more universal asynchronous transmitter receiver (UART). In accordance with an embodiment, the UART may comprise a RS-422 UART 114, and/or an RS-232 UART 1144. The FPGA may be operable to transmit the received data to the encoder 1124 via the CPU based on a control signal received from the CPU 1116. In accordance with an embodiment, the CPU 1116 may be operable to receive the set of steps, via the Ethernet block 1118. The CPU 1116 may be further operable to store the received set of steps in the module memory 1122.

In accordance with an embodiment, the encoder 1124 may be operable to transmit the received data to the transceiver section 1114. In the transceiver section 1114, the further processing of the received data, may be performed in a method similar to the processing of data by the transceiver section 314 (as shown in FIG. 3B). In accordance with an embodiment, the CPU 1116 may be operable to provide the status of the control module 1100 based on the lamp 1108.

Figure 12A:
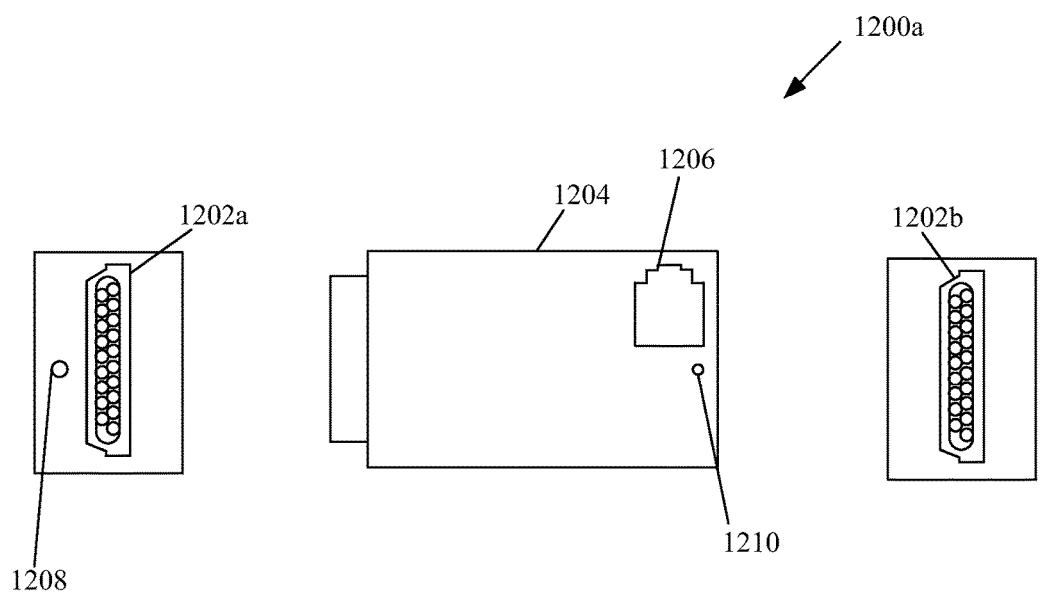
FIGS. 12A and 12B illustrate a tenth exemplary electronic module to implement the disclosed method and system for management of an electronic system, in accordance with an embodiment of the disclosure.
Figure 12B:
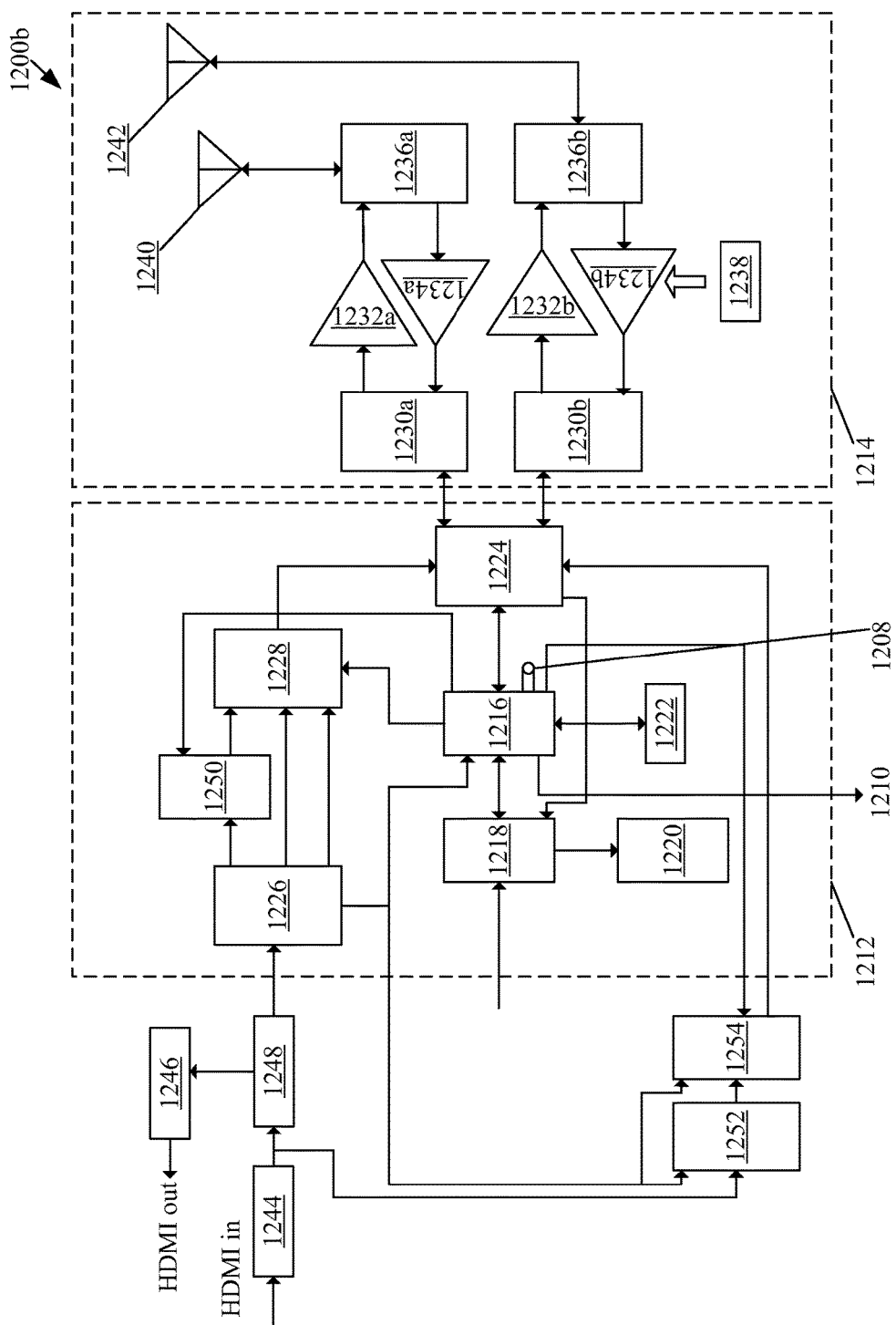

FIGS. 12A and 12B illustrate a tenth exemplary electronic module to implement the disclosed method and system for management of an electronic system, in accordance with an embodiment of the disclosure. FIGS. 12A and 12B are described in conjunction with elements of FIGS. 1 to 11B. FIG. 12A is an exemplary structural configuration diagram 1200a of the tenth exemplary electronic module, such as a High Definition Multimedia Interface (HDMI) module 1200 (not shown).

With reference to FIG. 12A, the HDMI module 1200 may be connected to one or more electronic components of the electronic sub-system 104, such as a digital recorder installed in a broadcast center. The HDMI module 1200 may be operable to receive and monitor the digital multimedia content captured by the digital recorder.

With reference to FIG. 12A, the HDMI module 1200 may comprise connectors 1202a and 1202b, a cabinet 1204, an Ethernet port 1206, the lamp 1208, and the hardware reset button 1210. The HDMI module 1200 may be operable to be connected to the digital recorder via the connectors 1202a and 1202b. The HDMI module 1200 may be communicatively coupled to the electronic device 102, and/or other electronic module, via the Ethernet port 1206. The Ethernet port 1206 may be operable to provide a path and/or a control for the video data to be sent as wired information.

In accordance with an embodiment, the connectors may correspond to a type A HDMI connector, a type B HDMI connector, and/or a type C HDMI connector. In accordance with an embodiment, the connector 1202a may correspond to an HDMI input port, and the connector 1202b may correspond to an HDMI output port. In accordance with an embodiment, the connectors 1202a may be placed at a first end of the HDMI module 1200, and the connector 1202b may be placed at a second end of the HDMI module 1200. The cabinet 1204 may comprise suitable logic, circuitry, interfaces, and/or code that may be operable to monitor the digital multimedia content. The Ethernet port 1206 may be operable to monitor the data transmitted through the connectors 1202a and 1202b. The lamp 1208 may be a Light Emitting Diode (LED) arranged adjacent to the Ethernet port 1206. In accordance with an embodiment, lamp 1208 may correspond to the lamp 308 (as shown in FIG. 3A) which may be, to track and notify the status of the digital audio monitor 400 based on emission of light. Notwithstanding, the disclosure may not be so limited, in accordance with an embodiment, the arrangement of the elements of the HDMI module 1200 may be different from the disclosed arrangement, without limiting the scope of the disclosure.

In accordance with an embodiment, the HDMI module 1200 may be operable to support one or more known protocols, such as a High Bandwidth Digital Content Protection (HDCP) protocol, and/or an Extended Display Identification Data (EDID) protocol. The HDMI module 1200 may be operable to receive a set of control instructions corresponding to one or more components of the electronic sub-system 104, from the electronic device 102. Based on the received set of control instructions, the HDMI module 1200 may be further operable to execute a set of actions, such as switching to an HDMI compatible device that may interpret the received set of control instructions. The other operations of the HDMI module 1200 may correspond to the operations of the digital video monitor 300 (as shown in FIG. 3A).

FIG. 12B is a block diagram that illustrates the tenth exemplary electronic module operable to be connected to the one or more electronic components of the electronic sub-system 104, in accordance with an embodiment of the disclosure. FIG. 12B is explained in conjunction with elements from FIGS. 1 to 12A. With reference to FIG. 12B, there is shown a block diagram 1200b of the HDMI module 1200 (as described in FIG. 12A). The HDMI module 1200 may comprise a core section 1212 and a transceiver section 1214.

The core section 1212 may comprise a first set of operational blocks, such as a central processing unit (CPU) 1216, an Ethernet block 1218, a power supply 1220, a module memory 1222, an encoder 1224, field programmable gate array (FPGA) 1226, and/or a multiplexer 1228. The CPU 1216 may comprise the lamp 1208 and the hardware reset button 1210 (as shown in FIG. 12A). The transceiver section 1214 may comprise a second set of operational blocks, such as digital front-end blocks 1230a and 1230b, transmission amplifiers 1232a and 1232b, de-amplifiers 1234a and 1234b, duplexers 1236a and 1236b, a dip switch 1238, one or more antennae, such as a Wi-Fi antenna 1240, and/or a Bluetooth antenna 1242. The HDMI module 1200 may further comprise an input interface 1244, an output interface 1246, a video scaler 1250, and/or a de-serializer 1248. The HDMI module may further comprise an eye pattern detection block 1252, and/or an analog-to-digital conversion block 1254. The functionality of each of the first set of operational blocks in the core section 1212 may correspond to the functionality of the similar operational blocks in the core section 312 (as shown in FIG. 3B). Further, the functionality of each of the second set of operational blocks in the transceiver section 1214 may correspond to the functionality of the similar operational blocks in the transceiver section 314 (as shown in FIG. 3B).

The first set of operational blocks in the core section 1212 may be communicatively coupled to the second set of operational blocks in the transceiver section 1214. In accordance with an embodiment, FPGA 1226 in the core section 412 may be communicatively coupled to the de-serializer 1248.

In operation, the digital multimedia content that corresponds to the digital recorder may be provided as an input into the de-serializer 1248, via the input interface 1244. In accordance with an embodiment, the input interface 1244 may correspond to the connector 1202a, which may support HDCP, and/or EDID protocol. The output interface 1246 may correspond to the connector 1202b, which may support HDCP, and/or EDID protocol. In accordance with an embodiment, the de-serializer 1248 may be operable to decode the first digital video signal as a parallel data. The further processing of the received digital multimedia content may be based on the processing of the digital video signal by the digital video monitor 300 (as shown in FIG. 3B).

In accordance with an embodiment, the eye pattern detection block 1252, and/or the analog-to-digital conversion block 1254 may correspond to the eye pattern detection block 350, and/or the analog-to-digital conversion block 352 (as shown in FIG. 3B). Further, the operation of the eye pattern detection block 1252, and/or the analog-to-digital conversion block 1254 may correspond to the eye pattern detection block 350, and/or the analog-to-digital conversion block 352 in the digital video monitor 300.

Figure 13A:
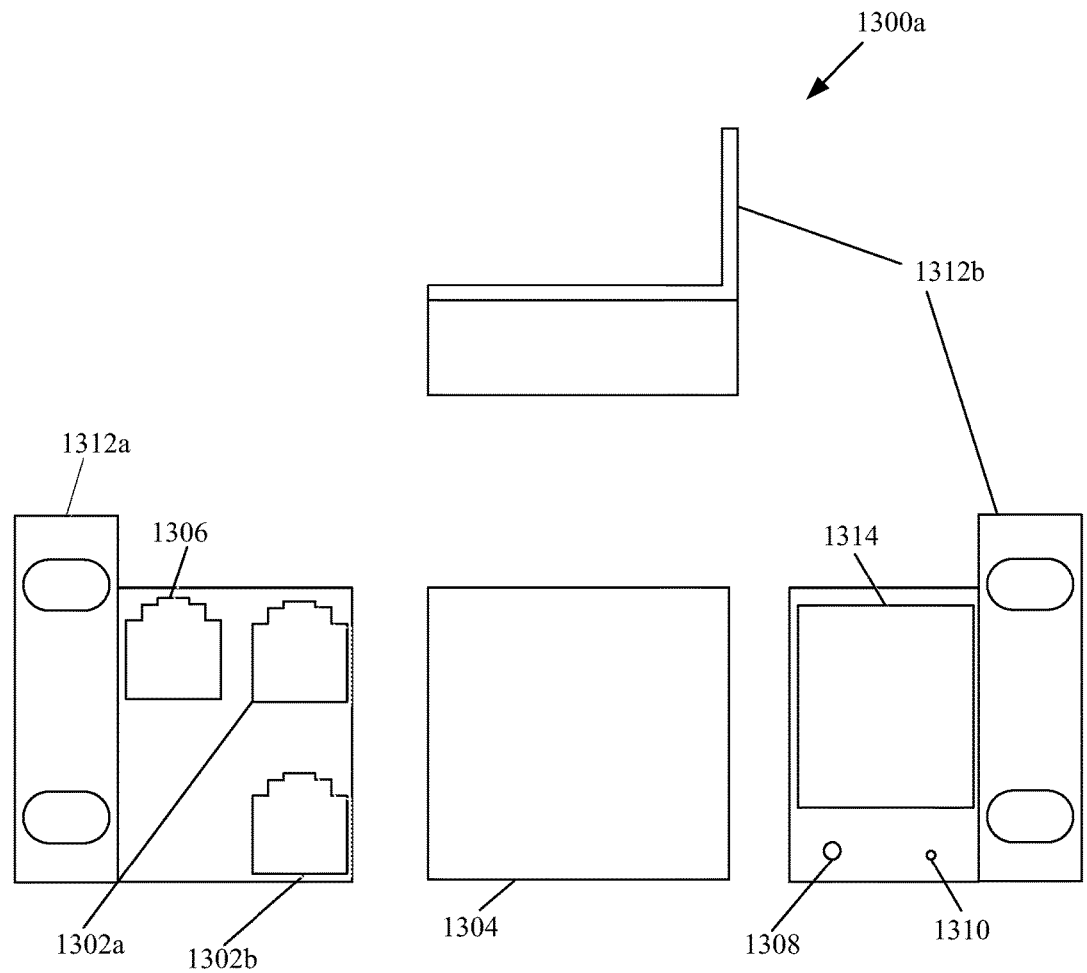
FIGS. 13A and 13B illustrate an eleventh exemplary electronic module to implement the disclosed method and system for management of an electronic system, in accordance with an embodiment of the disclosure.
Figure 13B:
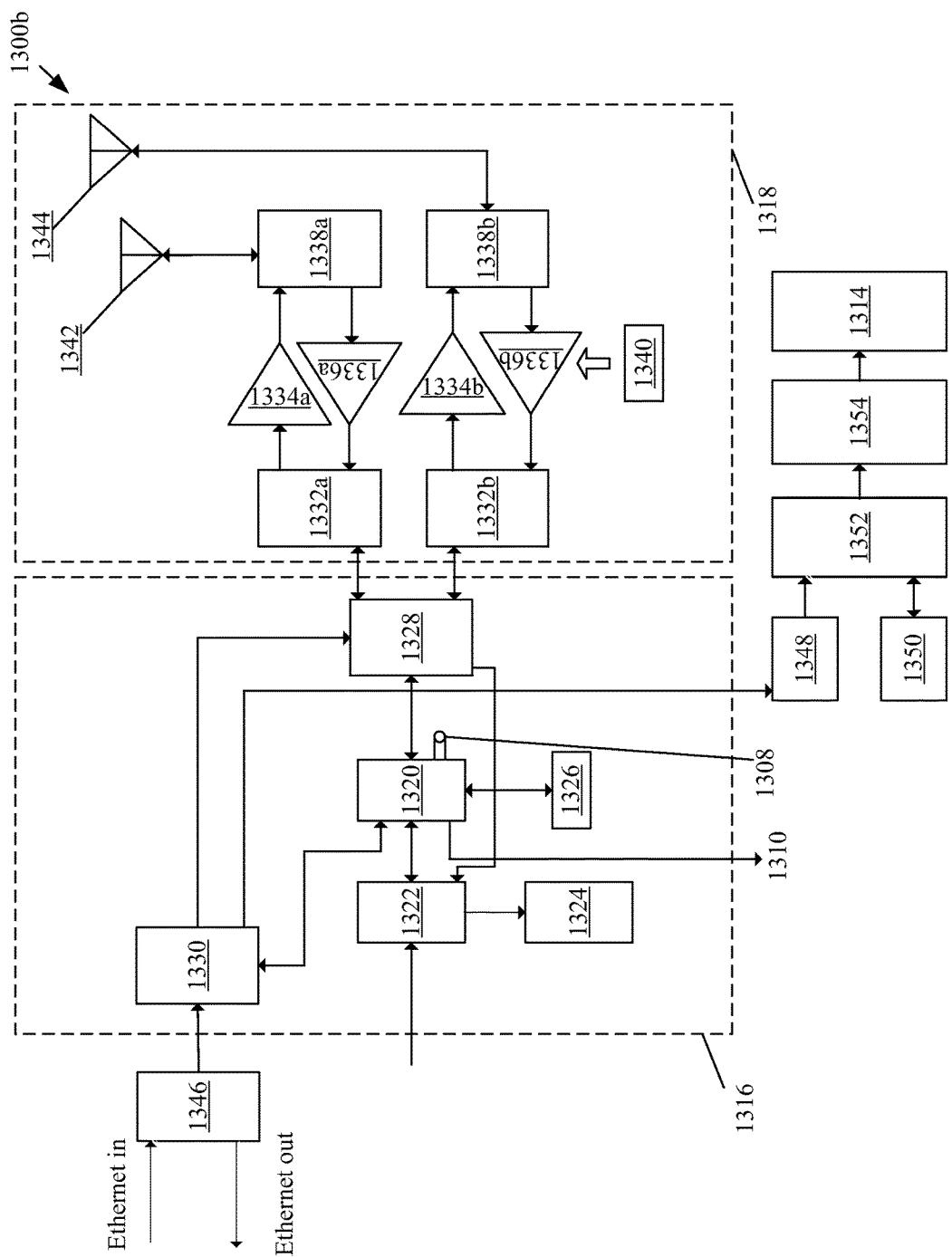

FIGS. 13A and 13B illustrate an eleventh exemplary electronic module to implement the disclosed method and system for management of an electronic system, in accordance with an embodiment of the disclosure. FIGS. 13A and 13B are described in conjunction with elements of FIGS. 1 to 12B. FIG. 13A is an exemplary structural configuration diagram 1300a of the eleventh exemplary electronic module, such as a display module 1300 (not shown).

With reference to FIG. 13A, the display module 1300 may be connected to one or more electronic components of the electronic sub-system 104. The display module 1300 may be operable to display a set data associated with one or more electronic components of the electronic sub-system 104.

With reference to FIG. 13A, the display module 1300 may comprise an input port 1302a, an output port 1302b, a cabinet 1304, a control port 1306, a lamp 1308, a hardware reset button 1310 and/or a rack mount bracket 1312a and 1312b, a module display 1314. In accordance with an embodiment, the input port 1302a, the output port 1302b, the control port 1306 and/or rack mount bracket 1312a may be arranged at a first end of the cabinet 1304. The display module 1300 may be communicatively coupled to the electronic device 102, via the control port 1306. The display module 1300 may comprise the lamp 1308 present adjacent to the Ethernet port 1006. The display module 1300 may further comprise a hardware reset button 1310. In accordance with an embodiment, the lamp 1308, the hardware reset button 1310, the rack mount bracket 1312b, and/or the module display 1314 may be present at the second end of the cabinet 1304. Notwithstanding, the disclosure may not be so limited, in accordance with an embodiment, the arrangement of the elements of the display module 1300 may be different from the disclosed arrangement, without limiting the scope of the disclosure.

In accordance with an embodiment, the display module 1300 may be operable to be connected to one or more electronic components of the electronic sub-system 104 via the input port 1302a and the output port 1302b. The display module 1300 may be further operable to be connected to the electronic device 102, and/or other electronic module, via the control port 1306. In accordance with an embodiment, the input port 1302a, the output port 1302b, and/or the control port 1306 may correspond to Ethernet input, and/or output ports. In accordance with an embodiment, the display module 1300 may be operable to receive the control signals from the electronic device 102. The control signal may comprise a command to display one or more parameters that correspond to one or more electronic components of the electronic sub-system 104. In accordance with an embodiment, control signals may be received via the control port 1306 that may be operable to provide a path and/or a control for the control signals to be sent as wired information. The one or more parameters may comprise a set of service logs, one or more command acknowledgements, and/or one or more alarms, associated with one or more electronic components of the electronic sub-system 104. The one or more parameters may be displayed on the module display 1314. In accordance with an embodiment, the display module 1300 may be further operable to track and notify the status of the display module 1300 based on the color of the light emitted by the lamp 1308. The operation of the lamp 1308 may be based on the operation of the lamp 308 (as shown in FIG. 3A).

FIG. 13B is a block diagram that illustrates the eleventh exemplary electronic module operable to be connected to the one or more electronic components of the electronic sub-system 104, in accordance with an embodiment of the disclosure. FIG. 13B is explained in conjunction with elements from FIGS. 1 to 12A. With reference to FIG. 13B, there is a block diagram 1300b of the display module 1300 (as described in FIG. 13A). The display module 1300 may comprise a core section 1316 and a transceiver section 1318.

The core section 1316 may comprise a first set of operational blocks, such as a central processing unit (CPU) 1320, an Ethernet block 1322, a power supply 1324 which may include a battery, a module memory 1326, an encoder 1328, and/or an field programmable gate array (FPGA) 1330. The CPU 1320 may comprise the lamp 1308 and the hardware reset button 1310 (as shown in FIG. 13A). The transceiver section 1318 may comprise a second set of operational blocks, such as digital front-end blocks 1332a and 1332b, transmission amplifiers 1334a and 1334b, reception de-amplifiers 1336a and 1336b, duplexers 1338a and 1338b, a dip switch 1340, one or more antennae, such as a Wi-Fi antenna 1342, and/or a Bluetooth antenna 1344. The display module 1300 may further comprise an Ethernet block 1346, a host interface 1348, a frame buffer 1350, a graphics engine 1352, and/or a display engine 1354. The functionality of each of the first set of operational blocks in the core section 1316 may correspond to the functionality of the similar operational blocks in the core section 312 (as shown in FIG. 3B). Further, the functionality of each of the second set of operational blocks in the transceiver section 1318 may correspond to the functionality of the similar operational blocks in the transceiver section 314 (as shown in FIG. 3B).

The first set of operational blocks in the core section 1316 may be communicatively coupled to the second set of operational blocks in the transceiver section 1318. In accordance with an embodiment, FPGA 1330 in the core section 1316 may be communicatively coupled to the host interface 1348. The host interface 1348 may be further communicatively coupled to the graphics engine 1352. The graphics engine may be communicatively coupled to a frame buffer 1350 and a display engine 1354.

In operation, the FPGA 1330 may be operable to receive input data that corresponds to one or more electronic components of the electronic sub-system 104. The data may be received from the Ethernet block 1346, via the input port 1302a. The FPGA 1330 may be further operable to transmit the received data to the encoder 1328. In accordance with an embodiment, the encoder 1328 may be operable to transmit the data to the transceiver section 1318.

In accordance with an embodiment, the control data may be received by the Ethernet block 1322, via the control port 1306. The Ethernet block 1322 may be operable to transmit the control data to the CPU 1320. Based on the control data, the CPU 1320 may be operable to extract one or more set of steps from the control data. The CPU 1320 may be further operable to store the control data in the module memory 1326. In accordance with an embodiment, based on the set of steps, the CPU 1320 may be operable to display the input data received by the FPGA 1330 on the module display 1314. The CPU 1320 may be operable to transmit the input data to the host interface 1348. In accordance with an embodiment, the CPU 1320 may be operable to provide the status of the display module 1300 based on the lamp 1308.

In accordance with an embodiment, the graphics engine 1352 may be operable to generate one or more graphics to display the input data. Further, the frame buffer 1350 may be operable to buffer the input data for display. The graphics engine 1352 may be operable to transmit the generated graphics to the display engine 1354. The display engine 1354 may be operable to render the graphics on a predefined region of the module display 1314. In accordance with an embodiment, the one or more graphics generated by the graphics engine 1352 may be configured based on one or more instructions received from a remote location, via the electronic device 102. In the transceiver section 1318, the received input data may be processed in accordance with the method that corresponds to the transceiver section 314 (as shown in FIG. 3B).

Figure 14:
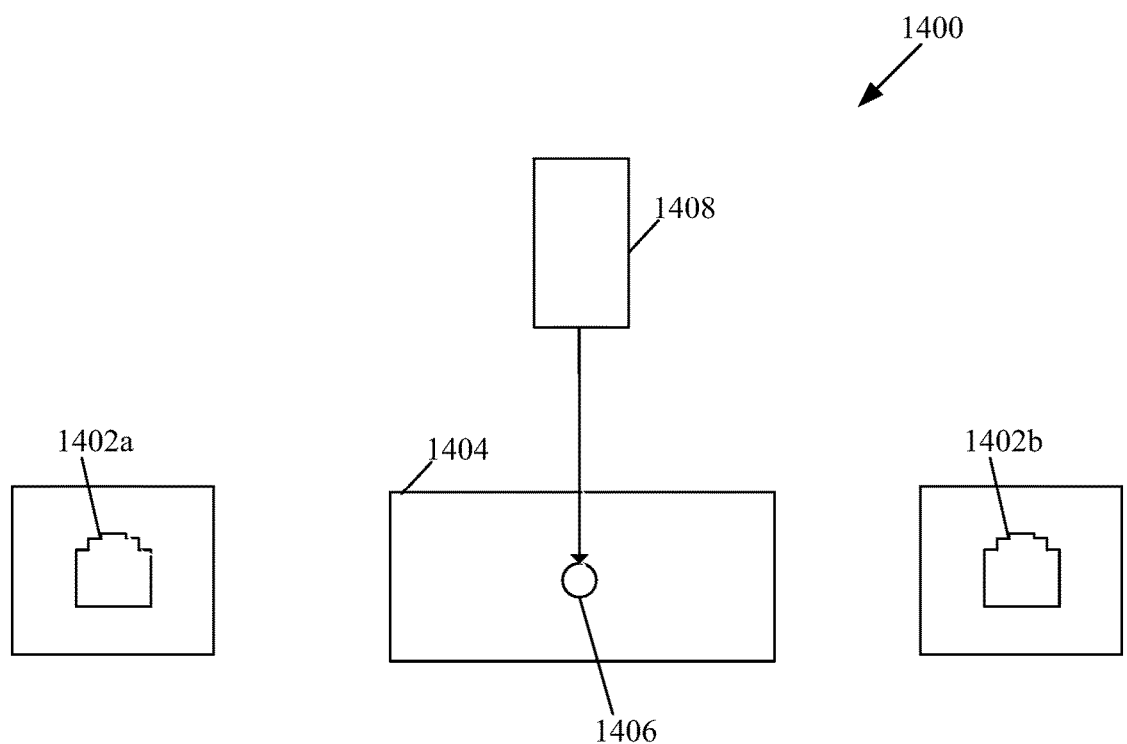
FIG. 14 illustrates a twelfth exemplary electronic module to implement the disclosed method and system for management of an electronic system, in accordance with an embodiment of the disclosure.

FIG. 14 illustrates a twelfth exemplary electronic module to implement the disclosed method and system for management of an electronic system, in accordance with an embodiment of the disclosure. FIG. 14 is described in conjunction with elements of FIGS. 1 to 13B. FIG. 14 is an exemplary structural configuration diagram of the twelfth exemplary electronic module, such as a power module 1400 (not shown).

With reference to FIG. 14, the power module 1400 may be connected to one or more of the plurality of electronic modules 114. The power module 1400 may be operable to provide a power supply to the connected one or more of the plurality of electronic modules 114, based on power over Ethernet (POE). The power module 1400 may be operable to provide power to one or more electronic components of the electronic sub-system 104.

With reference to FIG. 14, the power module 1400 may comprise an input port 1402a, an output port 1402b, a cabinet 1404, and/or a coaxial jack 1406. The power module 1400 may be communicatively coupled to the Ethernet source, via the input port 1400a. The power module 1400 may be further communicatively coupled to a component of the electronic sub-system 104, via the output port 1400b. The power module 1400 may be operable to receive power from a mains power supply, via the coaxial jack 1406.

In accordance with an embodiment, the power module may correspond to the POE device. The power module may be operable to receive Ethernet input via the input port 1402a. The power module 1400 may be operable to provide power supply to one or more electronic components of the electronic sub-system 104, via the output port 1402b. The coaxial jack may be operable to receive a power from a mains supply. In accordance with an embodiment, the mains supply may correspond to a standard alternating current (AC) supply. In accordance with an embodiment, the mains supply may be stepped-down to a value "5 volts" by an external power supply 1408.

Figure 15A:
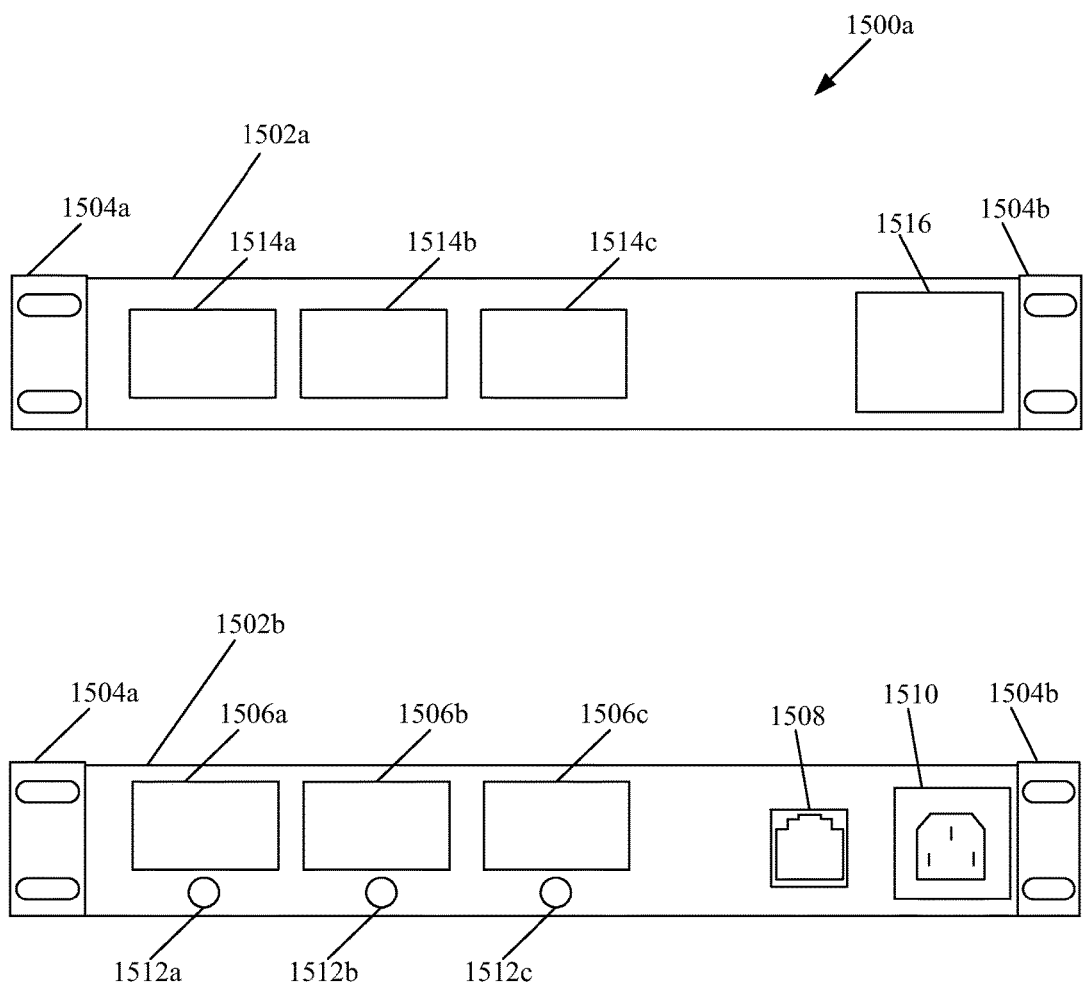
FIGS. 15A and 15B illustrate a thirteenth exemplary electronic module to implement the disclosed method and system for management of an electronic system, in accordance with an embodiment of the disclosure.
Figure 15B:
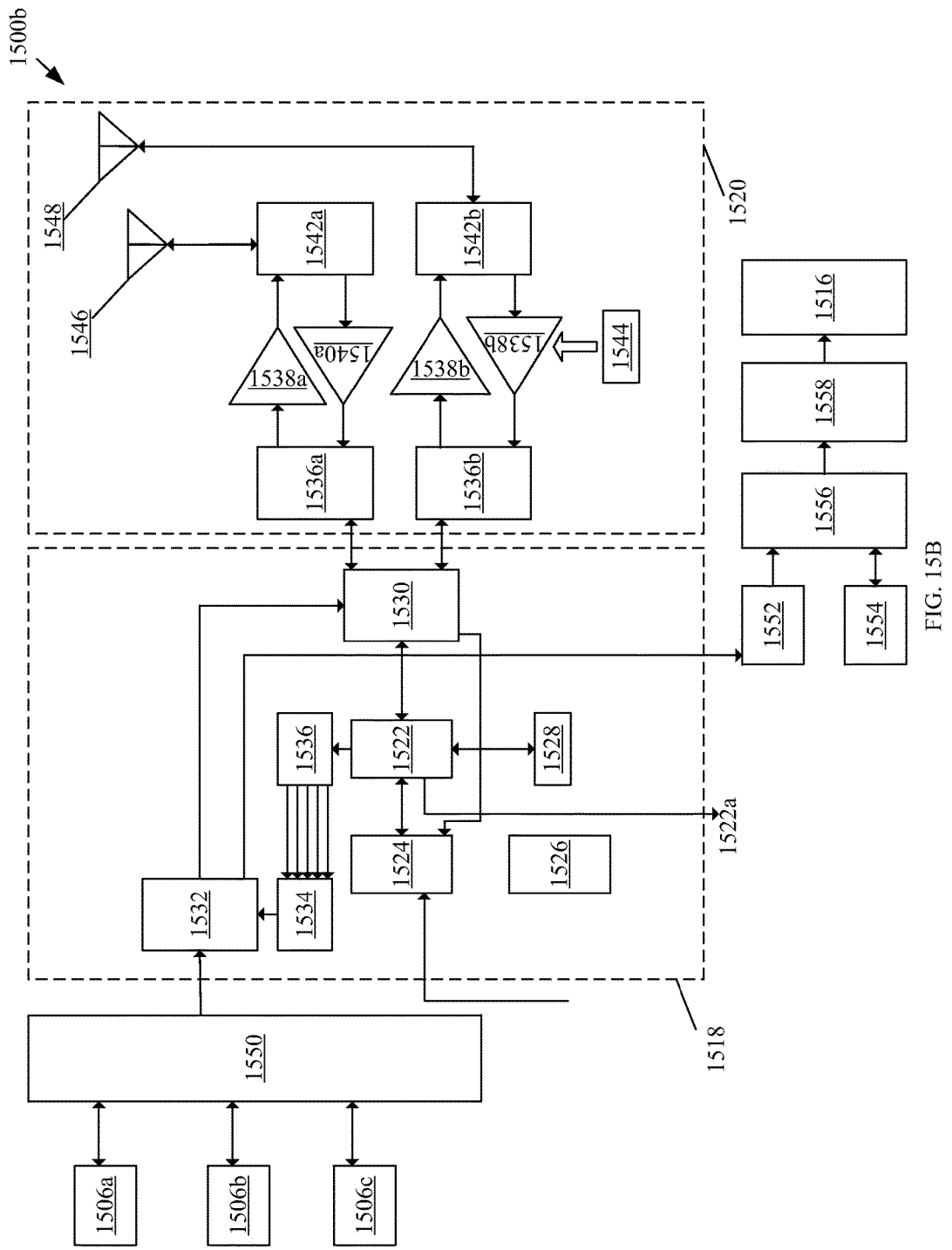

FIGS. 15A and 15B illustrate a thirteenth exemplary electronic module to implement the disclosed method and system for management of an electronic system, in accordance with an embodiment of the disclosure. FIGS. 15A and 15B are described in conjunction with elements of FIGS. 1 to 14. FIG. 15A is an exemplary structural configuration diagram 1500a of the thirteenth exemplary electronic module, such as a module rack kit 1500 (not shown).

With reference to FIG. 15A, the module rack kit 1500 may be connected to one or more electronic components of the electronic sub-system 104. The module rack kit 1500 may be operable to receive plurality of electronic modules in a plurality of slots present in the module rack kit 1500.

With reference to FIG. 15A, the module rack kit 1500 may comprise a front portion 1502a and a back portion 1502b. The module rack kit 1500 may further comprise one or more rack mount brackets, such as 1504a and 1504b. The back portion 1502b of the module rack kit 1500 may comprise a plurality of module slots, such as 1506a, 1506b, and 1506c, each configured to receive an electronic module. The back portion 1502b of the module rack kit may further comprise an Ethernet port 1508, and a power supply port 1510. The back portion may further comprise a plurality of lamps, such as lamp 1512a, 1512b, and 1512c arranged adjacent to the plurality of module slots. The front portion 1502a of the module rack kit 1500 may comprise a plurality of buttons, such as 1514a, 1514b, and 1514c to power on an electronic module. The front portion 1502a may further comprise a rack display 1516. Notwithstanding, the disclosure may not be so limited, the module rack kit 1500 may be communicatively coupled to other module rack kit, and/or network elements, via the Ethernet port 1508, and/or other wireless technologies known in the art, without limiting the scope of the disclosure.

In accordance with an embodiment, each of the plurality of the hardware buttons 1514a, 1514b, and 1514c may correspond to the module slots 1506a, 1506b, and 1506c, respectively. Further, each of the plurality of the lamps 1512a, 1512b, and 1512c may correspond to the module slots 1506a, 1506b, and 1506c, respectively.

In accordance with an embodiment, the module rack kit may be operable to be mounted on a rack based on the rack mount brackets 1504a and 1504b. The power supply port 1510 may be operable to supply power to each electronic module present in the module rack kit 1500. The Ethernet port 1508 may be operable to be communicatively coupled to an internal Ethernet hub, configured to provide Ethernet data to each of the electronic modules present in the module rack kit 1500.

In accordance with an embodiment, the module rack kit 1500 may be operable to receive a plurality of electronic modules, such as the digital video monitor 300, the proximity module 1000, and/or the display module 1300. In accordance with an embodiment, the digital video monitor 300, the proximity module 1000, and the display module 1300 may be placed in the module slots 1506a, 1506b, and 1506c, respectively. The module rack kit 1500 may be operable to provide power based on the POE to each of the connected electronic modules. In accordance with an embodiment, the plurality of electronic modules may be powered on based on the hardware buttons 1514a, 1514b, and 1514c. In accordance with an embodiment, the data that corresponds to the connected modules may be rendered on the rack display. The data may comprise one or more parameters associated with the electronic device, such as the display module 1300. Based on the operational status of the plurality of connected electronic modules, the module rack kit 1500 may be further operable to notify the status of an electronic module based on emission of light from the plurality of lamps 1512a, 1512b, and 1512c. In accordance with an embodiment, the plurality of lamps 1512a, 1512b, and 1512c may correspond to the operation of the lamp 308 (as shown in FIG. 3A).

FIG. 15B is a block diagram that illustrates the thirteenth exemplary electronic module operable to be connected to the one or more electronic components of the electronic sub-system 104, in accordance with an embodiment of the disclosure. FIG. 15B is explained in conjunction with elements from FIGS. 1 to 15A. With reference to FIG. 15B, there is shown a block diagram 1500b. The block diagram 1500b includes the module rack kit 1500 (as described in FIG. 15A). The module rack kit 1500 may comprise a core section 1518 and a transceiver section 1520.

The core section 1518 may comprise a first set of operational blocks, such as a central processing unit (CPU) 1522, an Ethernet block 1524, a power supply 1526, a module memory 1528, an encoder 1530. The CPU 1522 may comprise a plurality of lamps, and/or a reset button which correspond to the operation of the lamps 1512a, 1512b, and 1512c, and a hardware reset button 1522a. The transceiver section 1520 may comprise a second set of operational blocks, such as digital front-end blocks 1536a and 1536b, transmission amplifiers 1538a and 1538b, reception de-amplifiers 1540a and 1540b, duplexers 1542a and 1542b, a dip switch 1544, one or more antennae, such as a Wi-Fi antenna 1546, and/or a Bluetooth antenna 1548. The module rack kit 1500 may further comprise a module selector 1532, one or more panel switches 1534, an Ethernet hub 1550, a host interface 1552, a frame buffer 1554, a graphics engine 1556, and/or a display engine 1558. The functionality of each of the first set of operational blocks in the core section 1518 may correspond to the functionality of the similar operational blocks in the core section 312 (as shown in FIG. 3B). Further, the functionality of each of the second set of operational blocks in the transceiver section 1520 may correspond to the functionality of the similar operational blocks in the transceiver section 314 (as shown in FIG. 3B).

The first set of operational blocks in the core section 1518 may be communicatively coupled to the second set of operational blocks in the transceiver section 1520. In accordance with an embodiment, encoder 1530 in the core section 1518 may be communicatively coupled to the module selector 1532. The module selector 1532 may be further communicatively coupled to the host interface 1552. The host interface 1552 may be further communicatively coupled to the graphics engine 1556. The graphics engine may be communicatively coupled to a frame buffer 1554 and a display engine 1558.

In operation, the plurality of electronic modules, such as the digital video monitor 300, the proximity module 1000, and the display module 1300 may be placed in the module slots 1506a, 1506b, and 1506c. The module rack kit may be operable to detect the plurality of electronic modules placed in the plurality of module slots. Based on the control signal received from the Ethernet block, the CPU 1522 may be operable to transmit switch signals to power on one or more electronic modules, via the panel switches 1534. In accordance with an embodiment, the plurality of electronic modules may be powered-up based on a manual input provided by a user. In accordance with an embodiment, the panel switches 1534 may be operable to transmit the switch signal received from the CPU 1522, to the module selector 1532. The module selector 1532 may be operable to power-up one or more electronic modules connected to the Ethernet hub 1550, which correspond to the switch signal. In accordance with an embodiment, the CPU 1522 may be further operable to receive Ethernet control signals, via the Ethernet block 1524. The CPU 1522 may be further operable to store the data that corresponds to the plurality of electronic modules such as the digital video monitor 300, the proximity module 1000, and the display module 1300 may be placed in the module slots 1506a, 1506b, and 1506c, in the module memory 1528.

In accordance with an embodiment, based on the operational status of the powered-up electronic modules, the CPU 1522 may be operable to transmit a signal to switch on a lamp that corresponds to the powered-up electronic module. In accordance with an embodiment, the plurality of electronic modules may be operable to receive power from the power supply 1526 based on POE.

In accordance with an embodiment, based on the control signal received via the Ethernet block 1524, the host interface may be operable to receive a signal that corresponds to one or more connected electronic modules. The host interface may transmit the received signal to the graphics engine 1556 for preparation of the data to present on the rack display 1514. Based on the received data, the graphics engine 1556 may be operable to generate one or more graphics to display the data on the rack display 1514. Further, the frame buffer 1554 may be operable to buffer the input data for display. The graphics engine 1556 may be operable to transmit the generated graphics to the display engine 1558. In accordance with an embodiment, the one or more graphics generated by the graphics engine 1556 may be configured based on one or more instructions received from a remote location, via the electronic device 102. The display engine 1558 may be operable to render the graphics on a pre-defined region of the rack display 1514. In the transceiver section 1520, the received input data may be processed in accordance with the method that corresponds to the transceiver section 314 (as shown in FIG. 3B).

Figure 16:
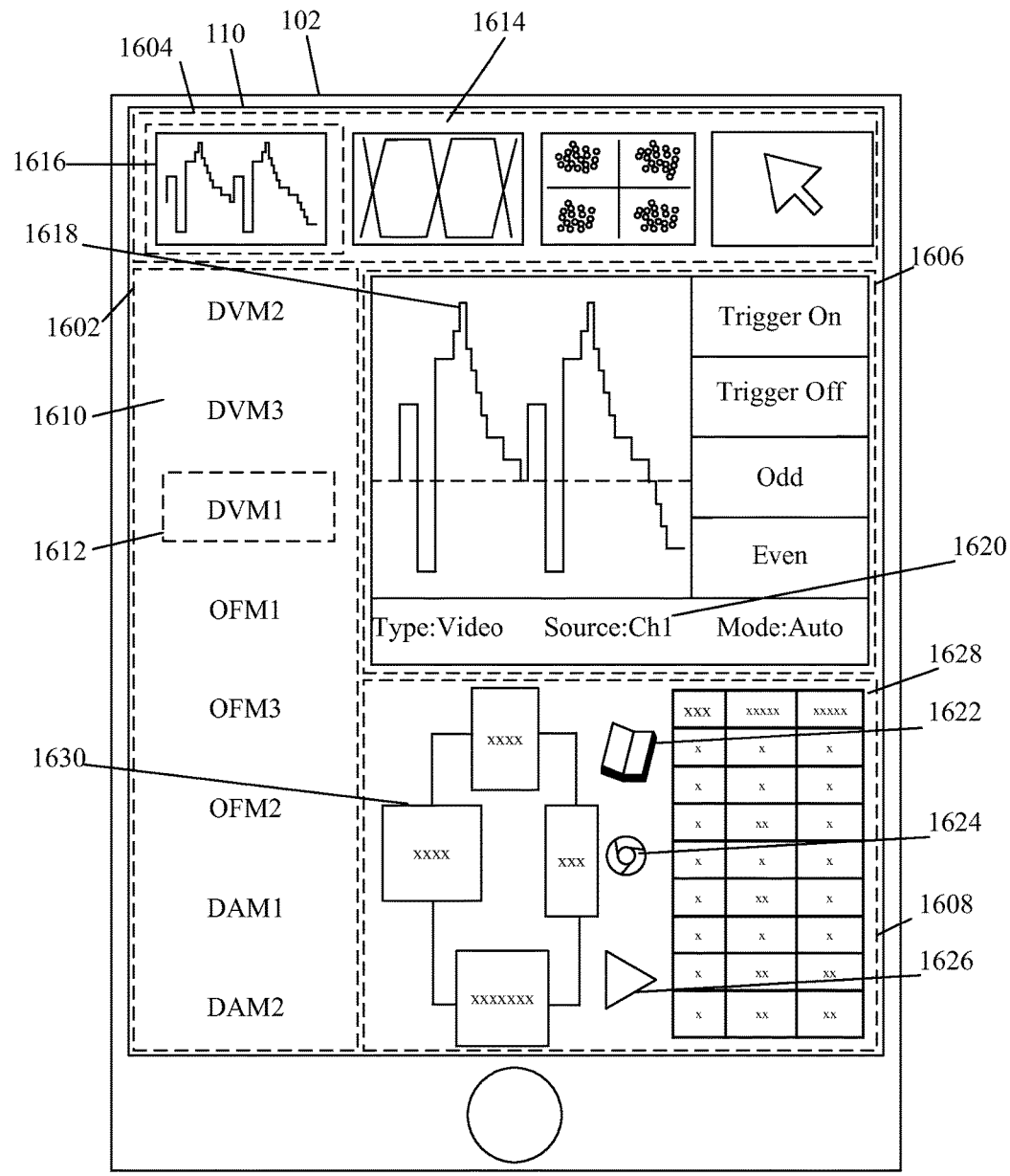
FIG. 16 illustrates an exemplary display on a user interface (UI) associated with the electronic device, in accordance with an embodiment of the disclosure.

FIG. 16 illustrates an exemplary display on a user interface (UI) associated with an exemplary electronic device, in accordance with an embodiment of the disclosure. FIG. 16 is explained in conjunction with elements from FIGS. 1 to 15B. With reference to FIG. 16 there is shown an exemplary electronic device, such as the electronic device 102. The electronic device 102 may comprise the display screen 110 that may render a set of UI objects. The set of UI objects may be grouped in a plurality of regions, such as a first region 1602, a second region 1604, a third region 1606, and/or a fourth region 1608. Each of the plurality of regions may be configured to display one or more service parameters associated with plurality of electronic modules.

The first region 1602 may present a list 1610 that includes detected plurality of electronic modules and a selected UI object 1612. The second region 1604 may present one or more tools 1614 and a waveform monitoring tool 1616. The third region 1606 may present a waveform 1618 and one or more attributes 1620. The third region 1608 may present a user manual icon 1622, a web access icon 1624, a play icon 1626, payload data 1628, and one or more system diagrams 1630.

In an exemplary scenario, the electronic device 102 may detect a plurality of electronic modules configured in a discoverable mode. The list 1610 of the detected electronic modules may be presented in the first region 1602 of the display screen 110 of the electronic module. Based on a user selection of a UI object, such as the UI object 1612 that corresponds to an electronic module, such as, "DVM1", a wireless connection derived from a short-range network, such as an NFC network, may be established between the electronic device 102 and the selected electronic module. The selected UI object 1612 that corresponds to an electronic module, "DVM1", may be highlighted in a color as desired by the user 118.

Further, the electronic device 102 may display one or more related tools 1614 associated with the electronic module, "DVM1", in the second region 1604. The one or more displayed tools 1614 may correspond to an operation to display one or more of an RGB parade, an SDI eye pattern, and/or a video histogram. The one or more displayed tools 1614 may further comprise an option to monitor a waveform to switch on and/or switch off a vector scope cursor, and/or to lock or unlock the display screen 110. The user 118 may further select the waveform monitoring tool 1616.

Based on the selection of the waveform monitoring tool 1616, the waveform 1618 that corresponds to electronic module, "DVM1", may be presented in the third region 1606 of the display screen 110. The one or more attributes 1620 may be displayed along with the waveform 1618. The displayed one or more attributes 1620 may comprise a payload data that includes a frame rate, a pixel count, a sampling structure, an interlaced or a progressive scan, a link number, a bit level, and/or a payload ID of the waveform 1618.

The electronic device 102 may further retrieve a user manual that may correspond to the electronic module, "DVM1", when the user manual icon 1622 is selected by the user 118. The electronic device 102 may retrieve the user manual based on the model number, and/or the manufacturer information associated with the electronic module "DVM1". Further, the electronic device 102 may display the web access icon 1624 to browse for online information. The electronic device 102 may further display a play icon 1626 to play, and/or record the service parameters associated with the electronic module, "DVM1".

The electronic device 102 may further display, in the fourth region 1608, the payload data 1628 that corresponds to the electronic module, "DVM1". The electronic device 102 may further display one or more system diagrams 1630 that correspond to the electronic sub-system associated with the electronic module, "DVM1". The system diagrams 1630 may be displayed in the pre-defined section of the fourth region 1608. The system diagrams 1630 may be retrieved from a repository that corresponds to the electronic system 100.

In accordance with an embodiment, an indexing feature may be configured in the electronic device 102. Based on the indexing feature, the electronic device 102 may map the location of the electronic module, "DVM1", to a matrix in a synoptic diagram associated with the electronic system 100. The display screen 110 may present an option to zoom the synoptic diagram to full screen based on a gesture provided by the user. The synoptic diagram may be overlaid on the waveform 1618 presented in the third region 1606. Further, based on another gesture, the synoptic diagram may be removed from the third region 1606.

Figure 17:
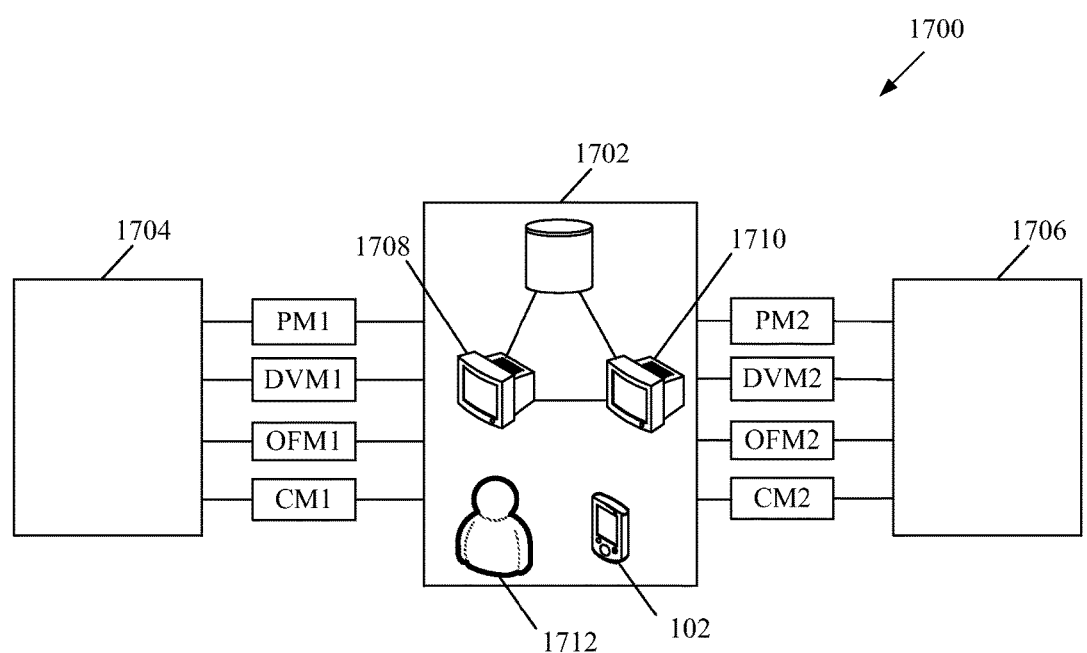
FIG. 17 illustrates a first exemplary scenario to implement the disclosed method and system for management of an electronic system, in accordance with an embodiment of the disclosure.

FIG. 17 illustrates a first exemplary scenario to implement the disclosed method and system for management of an electronic system, in accordance with an embodiment of the disclosure. FIG. 17 is explained in conjunction with elements from FIGS. 1 to 16. With reference to FIG. 17 there is shown a first exemplary scenario 1700 that illustrates an installation maintenance system. The first exemplary scenario 1700 includes a network operation center 1702, and a plurality of electronic sub-systems, such as electronic sub-systems 1704 and 1706, display devices 1708 and 1710, and a user 1712. The display devices 1708 and 1710 may be configured to render and monitor digital media content broadcasted by the electronic sub-systems 1704 and 1706, respectively. The user 1712 may be associated with the electronic device 102 (as shown in FIG. 1).

With reference to FIG. 17, the network operation center 1702 may correspond to a facility infrastructure. The electronic sub-systems 1704 and 1706 may correspond to two video servers that may host digital video content. Each of the electronic sub-systems 1704 and 1706 may be monitored by one or more associated electronic modules. With reference to the exemplary scenario 1700, the electronic sub-system 1704 may be monitored by a first proximity module, "PM1", a first digital video module, "DVM1", a first optical fiber module, "OFM1", and/or a first control module, "CM1". Further, the electronic sub-system 1706 may be monitored by a second proximity module, "PM2", a second digital video module, "DVM2", a second optical fiber module, "OFM2", and/or a second control module, "CM2". The one or more associated electronic modules may be communicatively coupled to each other, via a mesh network. The one or more associated electronic modules may be further communicatively coupled with the electronic device 102 and the electronic sub-systems 1704 and 1706, via a wired and/or a wireless network.

With reference to the exemplary scenario 1700, the electronic sub-systems 1704 and 1706 may be operable to broadcast the digital video content to a remote location (not shown). The electronic sub-systems 1704 and 1706 may be hereinafter referred to as a first video server and a second video server, respectively. The user 1712 may monitor the broadcasted digital video signals, via the display devices 1708 and 1710. In accordance with a scenario, a fault may occur at the first video server that may render a loss of transmission of the digital video signal to the remote location. The user 1712 may detect the loss of the digital video signal, via the display device 1708. The user 1712 may launch an application at the electronic device 102 for management of the installation maintenance system. The electronic device 102 may be operable to detect the one or more electronic modules associated with both the first video server and the second video server. The one or more associated electronic modules may further display the service parameters associated with the electronic modules, based on the input received from the user 1712. Based on the service parameters associated with the first digital video module, "DVM1", the user 1712 may determine that the fault has occurred at the first video server.

In an exemplary scenario, the user 1712 may retrieve a workflow from the data warehouse 106 (as shown in FIG. 1) that may capture the real-time status of the installation maintenance system. The real-time status may be captured based on the mesh network connectivity of the one or more associated electronic modules. The user 1712 may further retrieve online user manuals that may correspond to the first video server, based on a selection of the user manual icon 1622 (as shown in FIG. 16) presented on the electronic device 102. The retrieved user manual may be presented at the display screen 110 of the electronic device 102. The user 1712 may further select an option on the electronic device 102, to retrieve one or more service parameters associated with the first optical fiber module, "OFM1", which corresponds to the first video server. Based on the retrieved one or more service parameters and/or the operational information elements mentioned in the user manual, the user 1712 may further select another option to retrieve the log files associated with the first video server. The retrieved log files may be displayed on the display screen 110. Based on the log files, the user 1712 may determine that the first video server requires repair and/or replacement.

In an exemplary scenario, the user 1712 may determine the location that corresponds to the occurred fault, based on the service parameters associated with the first proximity module, "PM1". The user 1712 may further determine, whether there is any other video server which may resume the broadcast of the digital video content. The user 1712 may select another video server, such as the second video server, from the workflow to resume the broadcast of the digital video signal. The second video server may be configured to replace the non-functional first video server. The user 1712 may retrieve the service parameters associated with the selected second video server, based on the electronic modules which were associated with the first video server. Based on the service parameters, the user 1712 may further select an option on the display screen 110 to update the workflow on the display screen 110 of electronic device 102. The user 1712 may further select an option on the display screen 110 to store the updated workflow on the data warehouse 106 to resume the broadcast of the digital video signal from the selected second video server.

Figure 18:
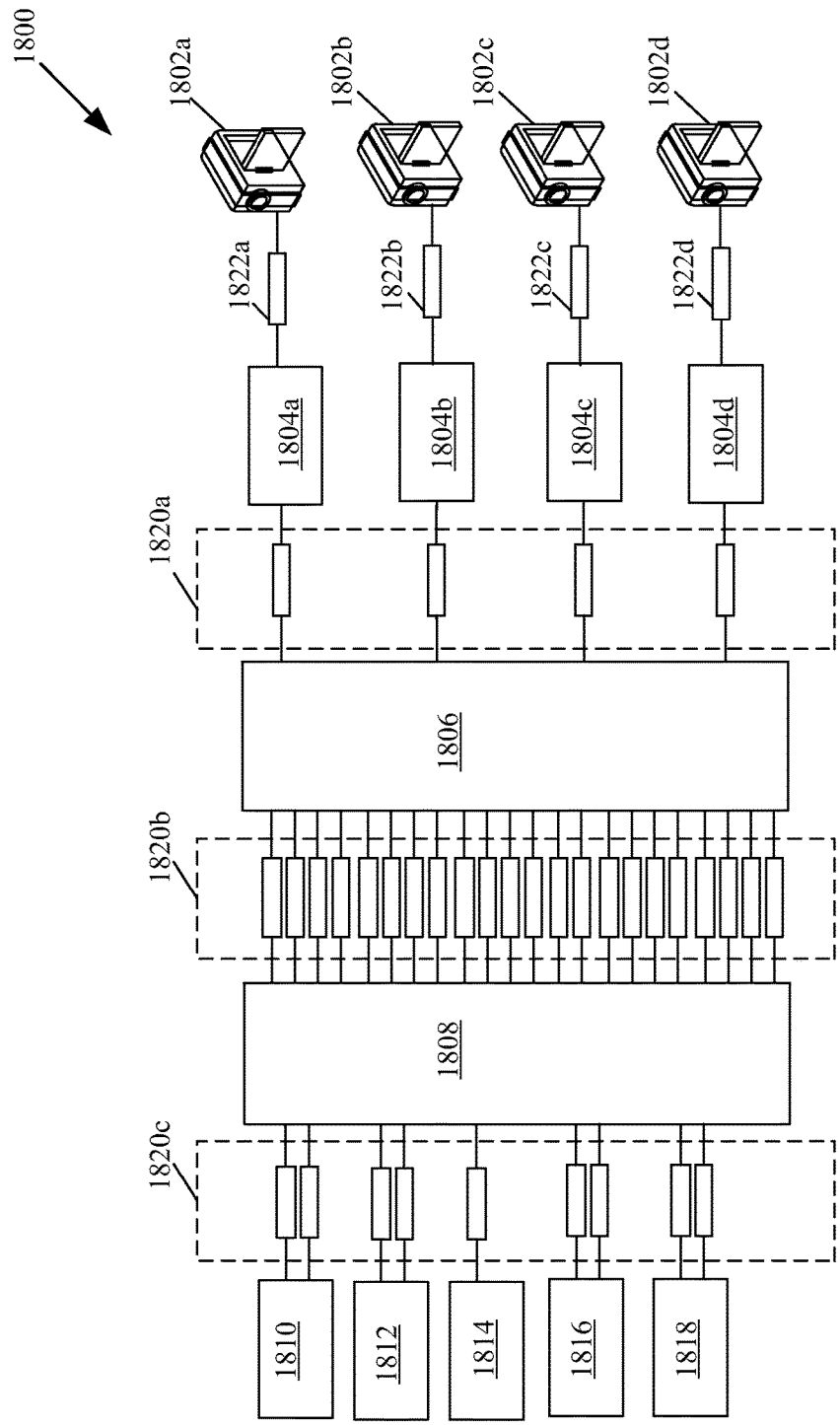
FIG. 18 illustrates a second exemplary scenario to implement the disclosed method and system for management of an electronic system, in accordance with an embodiment of the disclosure.

FIG. 18 illustrates a second exemplary scenario to implement the disclosed method and system for management of an electronic system, in accordance with an embodiment of the disclosure. FIG. 18 is explained in conjunction with elements from FIGS. 1 to 17. With reference to FIG. 18 there is shown a second exemplary scenario 1800 that illustrates a mobile truck for video broadcast at a baseball game. The second exemplary scenario 1800 may include a plurality of video recorders 1802a, 1802b, 1802c, and/or 1802d, communicatively coupled with a plurality of camera control units (CCU) 1804a, 1804b, 1804c, and/or 1804d. The second exemplary scenario 1800 may further include a video router 1806, a switcher 1808, a recording unit 1810, an instant replay unit 1812, a telecommunication unit 1814, a graphics unit 1816, and/or an insertion unit 1818, installed inside the mobile truck.

With reference to FIG. 18, the plurality of video recorders, such as 1802a, 1802b, 1802c, and/or 1802d may be configured to capture live action on a baseball field. The video recorder 1802a may be configured to capture an action at the first base of the baseball field. Similarly, the video recorders 1802b, 1802c, and 1802d may be configured to capture the action at second base, third base, and outfield, respectively. The captured action may be transmitted to the recording unit 1810, the instant replay unit 1812, the telecommunication unit 1814, the graphics unit 1816, and/or the insertion unit 1818, via the video router 1806. The output of the plurality of video recorders 1802a, 1802b, 1802c, and/or 1802d may be monitored by the plurality of SMPTE fiber monitors, such as 1822a, 1822b, 1822c, and 1822d, respectively. In accordance with an embodiment, the SMPTE fiber monitors 1822a, 1822b, 1822c, and 1822d, may be inter-connected in a mesh network configuration. Further, the output of the video router 1806, the switcher 1808, and/or the recording unit 1810 may be monitored by a network of digital video monitors 1820a, 1820b, and 1820c, respectively. In accordance with an embodiment, each of the networks of digital video monitors 1820a, 1820b, and 1820c, may comprise a plurality of digital video modules inter-connected in a mesh network configuration.

In accordance with the second exemplary scenario, a loss of output signal that corresponds to the first base video recorder 1802a may be detected by the user 118. The user 118 may establish a connection with the SMPTE fiber monitors 1822a. In an instance, the SMPTE fiber monitor 1822a may be installed at a remote location that may be beyond the network range of the communication network used by the electronic device. In another exemplary scenario, the SMPTE fiber monitor 1822a may operate in a non-discoverable mode. In such a case, the user 118 may communicate with the SMPTE fiber monitor 1822a via the mesh network configuration of the inter-connected SMPTE fiber monitors 1822b, 1822c, and/or 1822d. The user 118 may issue a command to the SMPTE fiber monitor 1822a to measure the service parameters associated with the first base video recorder 1802a. In an exemplary scenario, the user 118 may confirm that the operation of the first base video recorder 1802a is in accordance with the operational parameters defined in an associated user manual. The user 118 may further establish a connection with a digital video monitor of the network of digital video monitors 1820a to measure the service parameters associated with the CCU 1804a. Based on the service parameters associated with the CCU 1804a, the user 118 may confirm that a fault has occurred at the CCU 1804a.

Figure 19:
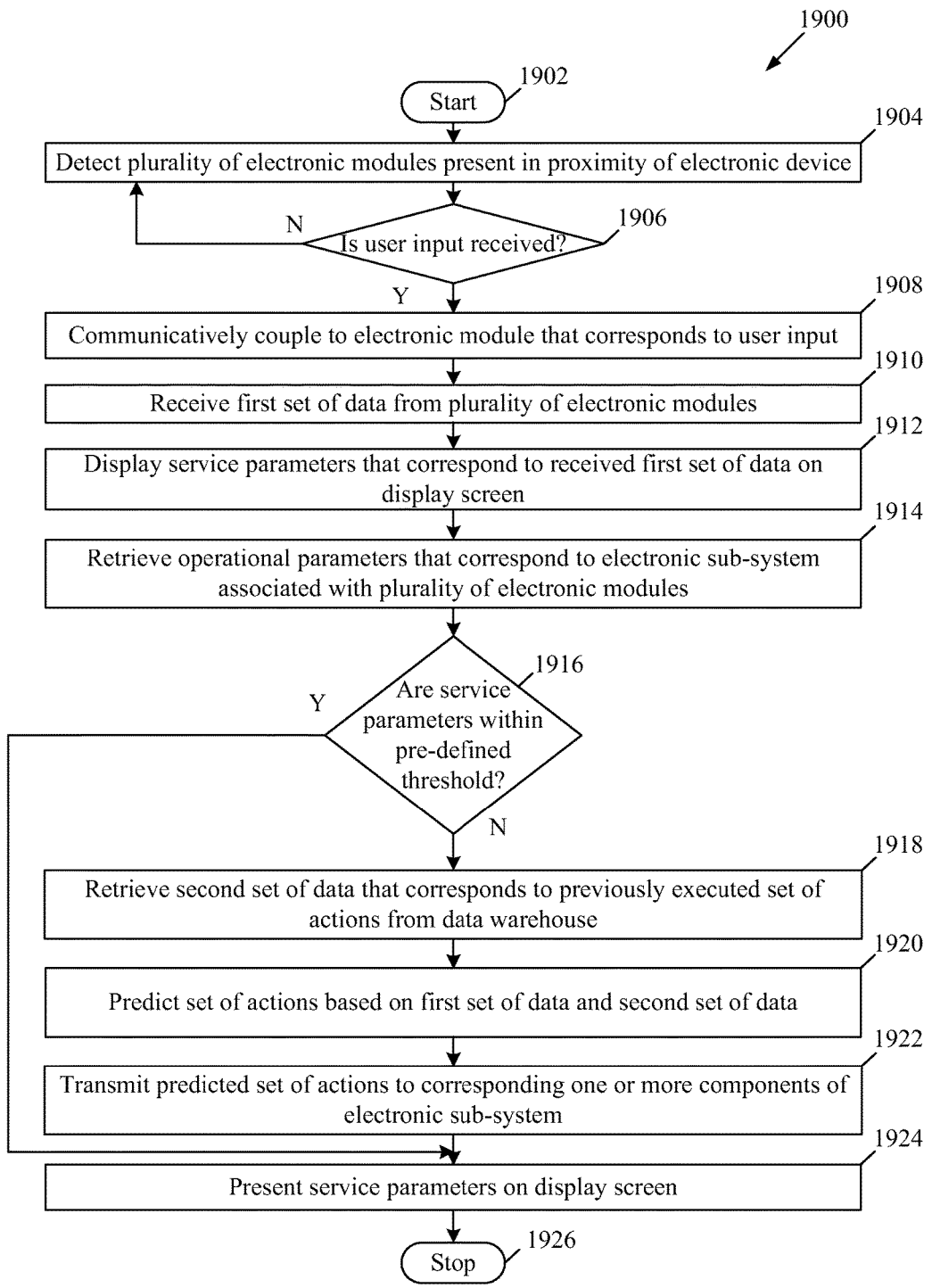
FIG. 19 is a flowchart that illustrates a method for management of an electronic system, in accordance with an embodiment of the disclosure.

FIG. 19 is a flow chart that illustrates a method for management of an electronic system, in accordance with an embodiment of the disclosure. With reference to FIG. 19, there is shown a flow chart 1900. The flow chart 1900 is described in conjunction with FIGS. 1 to 18. The method starts at step 1902 and proceeds to 1904.

At step 1904, the plurality of electronic modules 114 present in the proximity of the electronic device 102, may be detected. At step 1906, it may be determined whether a user input that corresponds to a selection of one or more electronic modules from the detected plurality of electronic modules 114 is received. In instances, when the user input is not received, the control passes back to step 1904. In instances, when the user input is received, the control passes to step 1908. At step 1908, the selected one or more electronic modules may be communicatively coupled to the electronic device 102.

At step 1910, a first set of data may be received from the selected one or more electronic modules. The first set of data may correspond to the electronic sub-systems associated with the selected one or more electronic modules. At step 1912, the service parameters that correspond to the received first set of data may be displayed on the display screen 110. At step 1914, the operational parameters that correspond to the electronic sub-systems associated with the selected one or more electronic modules, may be retrieved. The operational parameters may be retrieved from the data warehouse 106 or an online user manual.

At step 1916, it may be determined whether the service parameters that correspond to the received first set of data are within the pre-defined threshold values. In instances when the service parameters are within the pre-defined threshold values, the control passes to step 1924. In instances when the service parameters deviate from the pre-defined threshold values, the control passes to step 1918. In such a case, the deviation may indicate a fault in one or more electronic components of the electronic sub-systems. At step 1918, the second set of data may be retrieved from the data warehouse 106. The second set of data may correspond to a previously executed set of actions for similar instances when the service parameters for the second set of data deviated from the pre-defined threshold values in the past. At step 1920, a set of actions may be predicted by the electronic device 102, based on the first set of data and the second set of data. In accordance with an embodiment, the set of actions may be predicted based on a flowchart and/or a workflow provided by the user 118. In accordance with an embodiment, the set of actions may be predicted based on the operational values retrieved from the pre-stored second set of data and/or online user manuals. At step the 1922, the predicted set of actions may be transmitted to the corresponding one or more electronic components of the electronic sub-systems for corrective measures. At step 1924, the service parameters may be presented at the display screen 110 of the electronic device 102. Control passes to end step 1926.

In accordance with an embodiment of the disclosure, the system management of an electronic system may comprise the electronic device 102 (as shown in FIG. 1). The electronic device 102 may comprise one or more processors, such as the application processor 202 (as shown in FIG. 2), operable to detect a plurality of electronic modules configured in a discoverable mode. The plurality of electronic modules may be associated with one or more electronic sub-systems of the electronic system. The application processor 202 may be further operable to receive a first set of data from plurality of electronic modules. The application processor 202 may be further operable to dynamically predict a set of actions based on the received first set of data and second set of data. The second set of data may correspond to a previously executed set of actions.

Various embodiments of the disclosure may provide a non-transitory computer readable medium and/or storage medium, and/or a non-transitory machine readable medium and/or storage medium, having stored thereon a machine code and/or a computer program with at least one code section executable by a machine and/or a computer for management of an electronic system. The at least one code section in an electronic device may cause the machine and/or computer to perform the steps that comprise detection of a plurality of electronic modules configured in a discoverable mode. The plurality of electronic modules may be associated with one or more electronic sub-systems of the electronic system. A first set of data may be received from plurality of electronic modules. Based on the received first set of data and a second set of data, a set of actions may be dynamically predicted. The second set of data may correspond to a previously executed set of actions.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted for carrying out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features enabling the implementation of the methods described herein, and which when loaded in a computer system is able to carry out these methods. Computer program, in the present context, means any expression, in any language, code or notation, of a set of instructions intended to cause a system having an information processing capability to perform a particular function either directly, or after either or both of the following: a) conversion to another language, code or notation; b) reproduction in a different material form.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A method, comprising:
   in an electronic device comprising circuitry:
   detecting, by said circuitry, a plurality of electronic monitoring devices based on key information associated with each of said plurality of electronic monitoring devices, wherein said key information is broadcast by said plurality of electronic monitoring devices that are in a discoverable mode, and wherein said plurality of electronic monitoring devices are associated with at least one electronic sub-system of an electronic system;
   receiving, by said circuitry, a first set of data from said detected said plurality of electronic monitoring devices based on a fault detected in said at least one electronic sub-system;
   displaying a list of said detected said plurality of electronic monitoring devices in a first region of a user interface of said electronic device;
   displaying an option to measure said first set of data of a selected electronic monitoring device of said plurality of electronic monitoring devices in a second region of said user interface;
   setting, by said circuitry, at least one threshold value that is associated with said measured said first set of data;
   determining, by said circuitry, a first set of actions based on a deviation of said measured said first set of data from said at least one threshold value and based on a second set of data, wherein said second set of data corresponds to previously executed set of actions to resolve said fault;
   determining, by said circuitry, at least one recommendation based on said determined said first set of actions, wherein said at least one recommendation corresponds to resolution of said fault in said at least one electronic sub-system; and
   controlling, by said circuitry, transmission of said at least one recommendation to said plurality of electronic monitoring devices.

2. The method according to claim 1, wherein said electronic device is at least one of a laptop, a desktop computer, a server, a tablet computer, a smartphone, or a personal digital assistant (PDA) device.

3. The method according to claim 1, wherein said plurality of electronic monitoring devices comprise at least one of a signal measurement circuit, a signal detection circuit, or a control circuit.

4. The method according to claim 1, wherein each of said plurality of electronic monitoring devices in said discoverable mode periodically broadcasts said key information.

5. The method according to claim 4, wherein said broadcasted key information comprises at least one of a bar code, a Quick Response (QR) code, an optical character recognition (OCR) tag, an internet protocol (IP) address, electronic module type information, hardware version information, or firmware version information, associated with said each of said plurality of electronic monitoring devices.

6. The method according to claim 1, wherein each of said first set of data and said second set of data corresponds to at least one of at least one service parameter corresponding to said at least one electronic sub-system, at least one comment associated with said at least one electronic sub-system, at least one label associated with said at least one electronic sub-system, diagnostic information associated with said at least one electronic sub-system, or a configuration setting associated with said at least one electronic sub-system, and
   wherein said configuration setting is retrieved from at least one of a stored user manual or an online user manual.

7. The method according to claim 6, wherein said at least one service parameter comprises at least one of an eye pattern display, serial data interface (SDI) payload data, a sample frequency, user data, a cyclic redundancy code (CRC) flag, a camera head main voltage, a camera head main current, a fiber optic power, a temperature value, simple network management protocol (SNMP) data, at least one network packet, or environmental measurement data.

8. The method according to claim 6, further comprising selecting, by said circuitry, said at least one service parameter to retrieve a set of attributes, wherein said set of attributes comprises at least one of a data value, a frequency, an amplitude, or a phase associated with said at least one service parameter.

9. The method according to claim 6, further comprising displaying, on a defined region of said user interface (UI) of said electronic device, at least one of payload data associated with said at least one service parameter, a universal resource locator (URL) of said at least one of said stored user manual or said online user manual, or a set of diagrams associated with said at least one electronic sub-system.

10. The method according to claim 6, further comprising defining, by said circuitry, said at least one threshold value corresponding to said at least one service parameter.

11. The method according to claim 10, wherein said defined said at least one threshold value is based on operational information associated with said at least one electronic sub-system, and wherein said operational information is retrieved from said at least one of said stored user manual or said online user manual.

12. The method according to claim 1, further comprising controlling, by said circuitry, said transmission of said at least one recommendation to a user device based on said determined said first set of actions.

13. The method according to claim 12, wherein said at least one recommendation comprises at least one of implementing an optimized configuration setting or a test pattern implementable at said at least one electronic sub-system.

14. The method according to claim 1, wherein said plurality of electronic monitoring devices measures said first set of data associated with each of said at least one electronic sub-system.

15. The method according to claim 1, further comprising displaying an option to purchase at least one new electronic monitoring device associated with said plurality of electronic monitoring devices.

16. The method according to claim 1, further comprising analyzing each of said first set of data associated with said plurality of electronic monitoring devices.

17. The method according to claim 1, wherein said first set of data is displayed on said user interface of said electronic device based on selection of at least one service parameter associated with said first set of data.

18. The method according to claim 1, further comprising uploading, by said circuitry, to said detected said plurality of electronic monitoring devices, at least one of a label, a comment, or data.

19. The method according to claim 18, wherein said uploaded said comment comprises at least one of a set of details or a second set of actions to resolve said fault detected in said at least one electronic sub-system, and wherein said set of details corresponds to said fault.

20. The method according to claim 1, further comprising determining, by said circuitry, said first set of actions based on user input of a flowchart.

21. The method according to claim 20, wherein said flowchart comprises at least one of a set of alarms or control actions.

22. The method according to claim 1, further comprising tracking by said circuitry, a physical location of said at least one electronic sub-system based on at least one of a unique value associated with said at least one electronic sub-system, a strength of a signal received from said at least one electronic sub-system, or a delay in reception of said signal.

23. The method according to claim 1, further comprising synchronizing a first electronic monitoring device of said plurality of electronic monitoring devices with a second electronic monitoring device of said plurality of electronic monitoring devices.

24. A system, comprising:
an electronic device that includes a Central Processing Unit (CPU), wherein said CPU is configured to:
detect a plurality of electronic monitoring devices based on key information, wherein said key information is broadcast by said plurality of electronic monitoring devices that are in a discoverable mode, and wherein said plurality of electronic monitoring devices are associated with at least one electronic sub-system of an electronic system;
receive a first set of data from said detected said plurality of electronic monitoring devices based on at least a fault detected in said at least one electronic sub-system;
display a list of said detected said plurality of electronic monitoring devices in a first region of a user interface of said electronic device;
display an option to measure said first set of data of a selected electronic monitoring device of said plurality of electronic monitoring devices in a second region of said user interface;
set at least one threshold value associated with said measured said first set of data;
determine a set of actions based on a deviation of said measured said first set of data from said at least one threshold value and based on a second set of data, wherein said second set of data corresponds to previously executed set of actions to resolve said fault;
determine at least one recommendation based on said determined said set of actions, wherein said at least one recommendation corresponds to resolution of said fault in said at least one electronic sub-system; and
control transmission of said at least one recommendation to said plurality of electronic monitoring devices.

25. A non-transitory computer-readable medium having stored thereon computer-executable instructions, which when executed by a computer, cause said computer to execute operations, said operations comprising:
detecting a plurality of electronic monitoring devices based on key information, wherein said key information is broadcasted by said plurality of electronic monitoring devices that are in a discoverable mode, and wherein said plurality of electronic monitoring devices are associated with at least one electronic sub-system of an electronic system;
receiving a first set of data from said detected said plurality of electronic monitoring devices based on at least a fault detected in said at least one electronic sub-system;
displaying a list of said detected said plurality of electronic monitoring devices in a first region of a user interface of an electronic device;

displaying an option to measure said first set of data of a selected electronic monitoring device of said plurality of electronic monitoring devices in a second region of said user interface;

setting at least one threshold value associated with said measured said first set of data;

determining a set of actions based on a deviation of said measured said first set of data from said at least one threshold value and based on a second set of data, wherein said second set of data corresponds to previously executed set of actions to resolve said fault;

determining at least one recommendation based on said determined said set of actions, wherein said at least one recommendation corresponds to resolution of said fault in said at least one electronic sub-system; and controlling transmission of said at least one recommendation to said plurality of electronic monitoring devices.

* * * * *